(12) United States Patent
Siefert

(10) Patent No.: US 6,502,096 B1
(45) Date of Patent: Dec. 31, 2002

(54) COMPUTERIZED ASSET MANAGEMENT SYSTEM

(75) Inventor: David M. Siefert, Englewood, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/643,604

(22) Filed: Aug. 22, 2000

Related U.S. Application Data

(63) Continuation of application No. 08/217,063, filed on Mar. 24, 1994.

(51) Int. Cl.[7] .............................................. G06F 17/30
(52) U.S. Cl. ........................ 707/10; 705/27; 707/104.1
(58) Field of Search ....................... 705/26, 27; 707/10, 707/104.1

(56) References Cited

U.S. PATENT DOCUMENTS

| | | | | |
|---|---|---|---|---|
| 4,992,940 A | * | 2/1991 | Dworkin ....................... | 705/26 |
| 5,319,542 A | * | 6/1994 | King, Jr. et al. ............... | 705/27 |
| 5,666,493 A | * | 9/1997 | Wojcik et al. ................. | 705/26 |
| 5,694,551 A | * | 12/1997 | Doyle et al. .................. | 705/26 |

OTHER PUBLICATIONS

"Harvest User's Manual" by Darren R. Hardy & Michael F. Schwartz, Version 1.0 Oct. 1994. Last revised on Nov. 3, 1994.
"Essence: A Resource Discovery System Based on Semantic File Indexing" by Darren R. Hardy & Michael F. Schwartz—University of Colorado, Boulder. 1993 Winter USENIX—Jan. 25–29, 1993 San Diego, CA pp. 361–374.
"Harvest Effective Use of Internet Information," The Harvest Information Discovery and Access System. No Date.
"The Harvest Information Discovery and Access System" by C. Mic Bowman, Peter B. Danzig, Darren R. Hardy, Ndi Manber & Michael F. Schwartz 1994. No Month.
Technical Discussion of the Harvest System. No Date.
Harvest Demonstration Brokers. Feb. 1996.
Instructions for the Harvest distribution: Version 1.3. No Date.
Frequently Asked Questions (and Answers) about Harvest Version 1.4 patchlevel 2. 13 pages. Feb. 1996.

(List continued on next page.)

*Primary Examiner*—Jack M. Choules
(74) *Attorney, Agent, or Firm*—Greg Welte

(57) ABSTRACT

The invention concerns a system for managing resources, which can take the form of (a) computer-compatible information, such as data files and programs, and (b) non-computer-compatible information, such as data contained on microfiche, and (c) physical objects. The resources are located at geographically diverse sites.

The invention contains a descriptive profile for each resource, and allows any user to search all profiles, and to search the profiles according to "fields" (a database term), such as by location of the resources, or by category of the resources. The user can order delivery of a selected resource, and the system causes delivery of the resource to be executed, irrespective of the form (eg, physical object) of the resource.

The invention allows a provider of a new resource to limit access to the resource, by identifying users who are authorized to obtain access to the resource. Non-authorized users cannot obtain access to the profiles of these resources.

9 Claims, 101 Drawing Sheets

OTHER PUBLICATIONS

"Customized Information Extraction as A Basis for Resource Discovery," by Darren R. Hardy and Michael F. Schwartz, Department of Computer Science, University of Colorado, Boulder. Mar. 1994.

"Debugging Autonomously Managed Distributed Systems & The Harvest Cache and Directory Replicator," by Peter B. Danzig Computer Science Department, University of Southern California, Nov. 2, 1994.

Harvest: A Scalable, Customizable Discovery and Access System, IRTF–RD: Mic Bowman (co–PI, Transarc), Pater Danizig (co–PI, USC), Darren Hardy (PRA, U Colorado), Udi Manber (co–PI, U Arizona), Mike Schwartz (PI, U Colorado). 1994.

"Internet Resource Discovery Services," by Katia Obraczka, Peter B. Danzig and Shih–Hao Li, University of Southern California, 8153 Computer, 26 (1993) Sep., No. 9, Los Alamitos, CA, US.

"The Internet Gopher: A Distributed Server Information System," by Mark Cahill, University of Minnesota. No Date.

"The Internet Gopher Protocol a distributed document search and retrieval protocol" Network Working Group, Request for Comments: 1436. 15 pages. Mar. 1993.

Exploring the Power of the Internet Gopher, UIUCnet V6–1, Jan. 1993.

"The Whole Internet" User's Guide & Catalog, Second Edition, by Ed Krol 384.648, 161 Kr 1994.

Internet Passport, Northwestnet's Guide To Our World Online, Mar. 1993, Fourth Edition. pp. 259–344.

"archie—An Electronic Directory Service for the Internet," by Alan Emtage, McGill University, Montreal, Canaca, Peter Deutsch, McGill University, Montreal, Canada, USENIX—Winter 1992.

"Distributed Indexing A Scalable Mechanism for Distributed Information Retrieval," by Peter B. Danzig, Jongsuk Ahn, John Noll, Katia Obraczka, Computer Science Department, University of Southern California, Los Angeles, California. ACM SIGIR Conference 1991, pp. 220–229.

"Internet Resource Discovery at the University of Colorado," by Michael F. Schwartz, Department of Computer Science, University of Colorado, Boulder Colorado, Oct. 1992.

"Research Problems for Scalable Internet Resource Discovery," by C. Mic Bowman, Peter B. Danzig, Michael F. Schwartz, University of Colorado at Boulder, Technical Report CU–CS–643–93, Mar. 1993.

"Fields of Files," by Ruth Halpern, LAN Technology, Sep. 1991, vol. 7, No. 9, pp. 48–62.

"Test Drive—Inside the Document Den," by Ruth Halpern, Lan Magazine, Dec. 1992, vol. 7, No. 12, pp. 170–178.

Automating Document Managewment, Office Administration and Automation, vol. XLVI, No. 4, Apr. 1985, pp. 51–86.

"A Network Under Control," by Ed Perratore, Dec. 17, 1991, PC Magazine, pp. 287–330.

"Evolution of the Internet Gopher," by Mark P. McCahill & Farhad X. Anklesaria, J. UCS, vol. 1, Issue 4. 1995.

Road Map to A/UX, Release 3.0 pp. 1–1 thru 1–21. No Date.

Apple Inside Macintosh vol. III pp. III–9 through III–10 Nov. 1990.

Brady "Inside the Apple Macintosh," by Jim Held & Pater Norton. pp. 590–591 © 1989.

Macintosh Bible, second edition, edited by Arthur Naiman. pp. 34–44. No Date.

Claris for Macintosh, ClarisWorks User's Guide. pp. 1–18 and 1–19 pp. 2–1 through 2–10. No Date.

Guide to Macintosh System 7.5, Don Crabb. © 1994.

Macintosh User's Guide for desktop Macintosh computers, Part I–IV. © 1993.

"The System 7 Book", by Craig Danuloff, Second Edition for 7.0 & 7.1. © 1994.

"Desktop Design Series," the Ventana Press. © 1993. No Date.

An Overview of A/UX Release 3.0, Chapters 1 & 2. No Date.

Mastering Windows 3.1, Robert Corvart. © 1992.

What Is Microsoft Workgroup Add–On for Windows? No Date.

Microsoft Windows User's Guide Operating System Version 3.1. 1994.

Concepts, Novell NetWare 4, Network Computing Products. No Date.

\* cited by examiner

FIG. 41

Resource Administration

File  Help

- Public
- Organization
- Team

Access Level:

Resource Title:

Date Added:   Date Updated:

Product ID:   Media:

Cost:   Format:

Price:   Point of Contact:

Information Category:   Alternate Administrator:

Information Filename:   Bitmap>>

Repository:

Resource Description:

Remarks

Ok  Cancel  New  Modify  Delete  Clear All  Help

Please select either New, Modify or Cancel.

FIG. 42

Resource Administration

File  Help

Access Level:  ☐ Public  ☐ IPD only  ☐ Team

Resource Title:

Date Added:    Date Updated: / /

Product ID:

Cost:

Price

Information Category:

Information Filename:

Repository:  Customer / Marketing / Product / Supplier / Technology / Other / Partnership Bitmap>>

Media:
Format:
Point of Contact:
Alternate Administrator:

Resource Description:

Remarks

Ok
Cancel
New
Modify
Delete
Clear All
Help

Please enter new data at this time and click on OK.

FIG. 43

Resource Administration

File  Help

Access Level:
- Public
- IPD only
- Team

Resource Title:

Date Added:  Date Updated:  / /

Product ID:

Cost:  Media:

Price:  Format:

Information Category:  Point of Contact:

Information Filename:  Alternate Administrator:

Repository:  Bitmap>>
- Product
- Supplier
- Technology
- Other
- Partnership
- CORE IP
- CLS-TEAM NOTES Resource Description:

Remarks

Ok
Cancel
New
Modify
Delete
Clear All
Help

Please enter new data at this time and click on OK.

FIG. 44

Resource Administration

File  Help

Access Level:
☐ Public
☐ IPD only
☐ Team

Resource Title:

Date Added:  Date Updated: / /

Product ID:  Media:

Cost:  Format:

Price  Point of Contact:

Information Category:  Alternate Administrator:

Information Filename:  [Bitmap>>]

Repository:

Resource Description:

Remarks

[Ok] [Cancel] [New] [Modify] [Delete] [Clear All] [Help]

Please enter new data at this time and click on OK.

Resource Administration

File  Help

Access Level: ☒ Public ☐ IPD only ☐ Team

Resource Title: CLS - Test resource for training

Date Added: [ ]  Date Updated: / /

Product ID: [ ]

Cost: [ ]

Price: [ ]

Information Category: General

Information Filename: \public\tab\test\test1.txt

Repository: Continuous Learning System

Media: On Line

Format: Notepad

Point of Contact: McCollum, Tab

Alternate Administrator: Cowan, Vickie

[Bitmap>>]  C:\WINDOWS\CLS1.BM

Resource Description: [ ]

Remarks: [ ]

Please enter new data at this time and click on OK.

[Ok] [Cancel]  [New] [Modify] [Delete] [Clear All]  [Help]

Resource Administration

File  Help

Access Level:
- ☒ Public
- ☐ IPD only
- ☐ Team

Resource Title: CLS - Test resource for training

Date Added:　　Date Updated: / /

Product ID:

Cost:

Price:

Information Category: General

Information Filename: \public\table\test1.txt

Repository: Continuous Learning System

Media: On Line

Format: Notepad

Point of Contact: McCollum, Tab

Alternate Administrator: Cowan, Vickie

Bitmap>>  C:\WINDOWS\CLS1.BM

Resource Description:

Remarks

[Ok] [Cancel] [New] [Modify] [Delete] [Clear All] [Help]

CLS - TEST RESOURCE FOR TRAINING was successfully added to the CLS database.

FIG. 66

The next few slides deal with the TEAM security of CLS. Only Information Administrators can create, modify or delete new teams. Once a team has been assigned to a user, the user can assign resources to that particular team and only those members will see the resource. We have tried to depict a small scenario to give you a better feel for TEAMS. An information administrator has been logged on to show this illustration.

FIG. 70

CLS- Provide or Distribute

CLS User Administration

- User ID: 272
- Last Name:
- First Name:
- E-MAIL Address:
- Mail Drop:
- City:
- State:
- County:
- Title:

- Zip Code:
- FRC Number:
- ACCT Number:
- Phone Number:
- Date Added:
- Date Updated:
- Type of User:
- User Environment:
- CLS Login:

SIP Customer Number

Reset User Password

Help
Ok
Cancel

Double click to add, modify or delete new members to the Continuous Learning System.

FIG. 77

Resource Administration

File  Help

Access Level:
- [ ] Public
- [ ] IPD only
- [x] Team

CLS ADMIN USERS
CLS TEST TEAM

Resource Title: CONFIDENTIAL REPORT ON CLS SECURITY REQUIREMENTS

Date Added:

Date Updated: / /

Product ID:

Cost:

Price

Information Category: General

Information Filename: \team\secur.doc

Repository: Continuous Learning System

Media: On Line

Format: Microsoft Word

Point of Contact: McCollum, Tab

Alternate Administrator: Siefert, Dave

Bitmap>>

Resource description cannot exceed 255 characters. 82

Resource Description: This is a test resource entry to check the security validation in the TEAM concept Remarks Ok
Cancel
New
Modify
Delete
Clear All
Help Please enter new data at this time and click on OK.

FIG. 78

Resource Administration

File  Help

Access Level:
☐ Public
☐ IPD only
☒ CLS ADMIN USERS

Resource Title: CONFIDENTIAL REPORT ON CLS SECURITY REQUIREMENTS

Date Added:

Date Updated: / /

Product ID:

Cost:  Media: On Line

Price:  Format: Microsoft Word

Information Category: General  Point of Contact: McCollum, Tab

Information Filename: \team\secur.doc  Alternate Administrator: Siefert, Dave

Repository: Continuous Learning System  Bitmap>>

Resource Description: This is a test resource entry to check the security validation in the TEAM concept Remarks:

Please enter new data at this time and click on OK.

Ok  Cancel  New  Modify  Delete  Clear All  Help

FIG. 80

Next few slides show another user named VCOWAN logged in who is not assigned to the CLS ADMIN USERS team to show that the new resource can only be seen by those persons selected earlier.

FIG. 95

FROM SCREEN
"PROVIDE OR DISTRIBUTE"
(SEE FLOWCHART PG. 5)

This screen allows the administrative users to add, delete and modify members (ie: personal profiles) from the CLS network. This controls who can log on to the CLS network. Note that this screen is only available to qualified users (eg: the CLS Administrator).
  This screen also provides access to the "User Administrator" and "Teams" screens.

••• Flowchart details are not provided. •••

See Illustrations 68 through 75. The files MEMBERSHIP.OBV and MEMBERSHIP.OBS are not included. However, see USERADM.OBS and USERADM.OBV for the "User Administration" screen.

COMPUTERIZED ASSET MANAGEMENT SYSTEM

CROSS-REFERENCE TO RELATED APPLICATIONS

This application is a continuation of copending application Ser. No. 08/217,063 filed on Mar. 24, 1994.

This Application is related to:

Application Ser. No. 08/217,065, entitled, "Automated Resource Management System," filed concurrently herewith by Siefert et al., and assigned to the Assignee hereof.

Application Ser. No. 08/217,066, entitled, "Future Boolean Searching of Multiple Repositories of Resources," filed concurrently herewith by Siefert et al., and assigned to the Assignee hereof.

Application Ser. No. 08/217,067, entitled, "Security Aspects of Computer Resource Repositories," filed concurrently herewith by Siefert et al., and assigned to the Assignee hereof.

Application Ser. No. 08/217,062, entitled, "Ordering and Downloading Resources from Computerized Repositories," filed concurrently herewith by Siefert et al., and assigned to the Assignee hereof.

Application Ser. No. 08/217,422, entitled, "Launching Computer Program upon Download of Data Created by Program," filed concurrently herewith by Siefert et al., and assigned to the Assignee hereof.

Application Ser. No. 08/218,024, entitled, "Multiple Repositories of Computer Resources, Transparent to User," filed concurrently herewith by Siefert et al., and assigned to the Assignee hereof.

Application Ser. No. 08/217,476, entitled, "Computer System for Management of Resources," filed concurrently herewith by Siefert et al., and assigned to the Assignee hereof.

MICROFICHE APPENDIX

A microfiche appendix, containing 3 microfiche and 207 total frames is filed herewith.

The invention concerns management of RESOURCEs, which take the form of (a) downloadable computer data and programs and (b) physical objects, which are located at multiple REPOSITORIEs, at different sites. The RESOURCEs appear to a user, at any given site, as though the RESOURCEs were actually present at the user's site.

BACKGROUND OF THE INVENTION

A database is somewhat analogous to a card catalog of a library. The card catalog cross-indexes books in several ways.

For example, an "author" card exists. This card is located in the catalog at the alphabetical position of the author's surname.

In addition, a "title" card exists, located in the alphabetical position of the book's title. Also, a "subject" card generally exists, which describes the subject of the book, and which is located in the alphabetical position of the subject, such as "pressed flower collecting," for example. Of course, other cards can exist for a given book (for example, books having multiple authors generally have an author card for each).

In database terms, these cards represent "fields" within the database. For example, in a library, to find all of the books written by Ernest Hemingway, one looks up "Hemingway" in the card catalog. All of the library's books written by any Hemingway are identified by respective author cards. In a computer database, a similar search could be done, upon the "author" field.

Similar searches can be done on the title fields, as well as on the subject fields.

Computer databases, in general, have more fields than does the card catalog. For example, if the card catalog were contained within a computer database, there would probably exist a "date" field. To search using the "date" field, one specifies a date, or range of dates, and the database responds by listing all books having a copyright which complies with the specified date, or range.

Presently existing databases have limitations. For example, many databases require that a user undergo significant training in order to learn how to use the data base. Some databases use arcane commands which the user must memorize.

Some databases contain only that information which is owned by the database owner. Returning to the library analogy, if a public library were to computerize its card catalog, by entering all of the information contained within the card catalog into the database program, the database program would, of course, only contain the card catalog information. A user could not, for example, gain access to the card catalog of a second library, in order to locate a book not owned by the first library. The user must go to the second library.

OBJECTS OF THE INVENTION

An object of the invention is to provide a system for storing information in a manner in which retrieval is simple.

Another object of the invention is to provide a system for storing information, in which entering information, as well as retrieving the information, is self-explanatory, and requires no resort to external instructions.

Another object of the invention is to provide a system for storing information, which can communicate with other systems which store information, and make available all of the information stored by all systems.

Another object of the invention is to provide a system which allows a user to search all information contained, in multiple databases, according to key words.

Another object of the invention is to provide a system which allows a user to establish a standing search, which searches, by key words, new information, at specified intervals in the future.

SUMMARY OF THE INVENTION

In one form of the invention, physical objects are stored at multiple different locations, and a profile is maintained for each physical object. The profiles contain descriptions of the physical objects, including location, and are key-word searchable. A user is allowed to issue a query containing key words, and the profiles containing the key words are identified and presented to the user. The user may order delivery of a physical object described in the delivered profiles, whereupon a notice is issued to a transportation agent, who picks up the physical objects and delivers them to the user. The order is used to facilitate record keeping by a custodian of the physical object. The profiles need not be stored at the same location, but can be distributed, as are the physical objects.

BRIEF DESCRIPTION OF THE DRAWINGS

FIGS. 40–54 illustrate creation of a PROFILE associated with a RESOURCE.

FIGS. 66–76 illustrate how an ADMINISTRATOR can change membership of teams, and thereby control the TEAMs' access to RESOURCEs.

FIGS. 77 and 78 illustrate identification, on a PROFILE, of TEAMS which may gain access to the RESOURCEs corresponding to the PROFILE.

FIG. 80 describes following Figures.

FIG. 83 shows the RESOURCEs to which this person has access, and the list is different from that of FIG. 79.

FIGS. 84–96 illustrate a flow chart which describes the logic flow of the program contained in the microfiche appendix.

DETAILED DESCRIPTION OF THE INVENTION

Overview

Server Holds RESOURCEs

Figure 1:
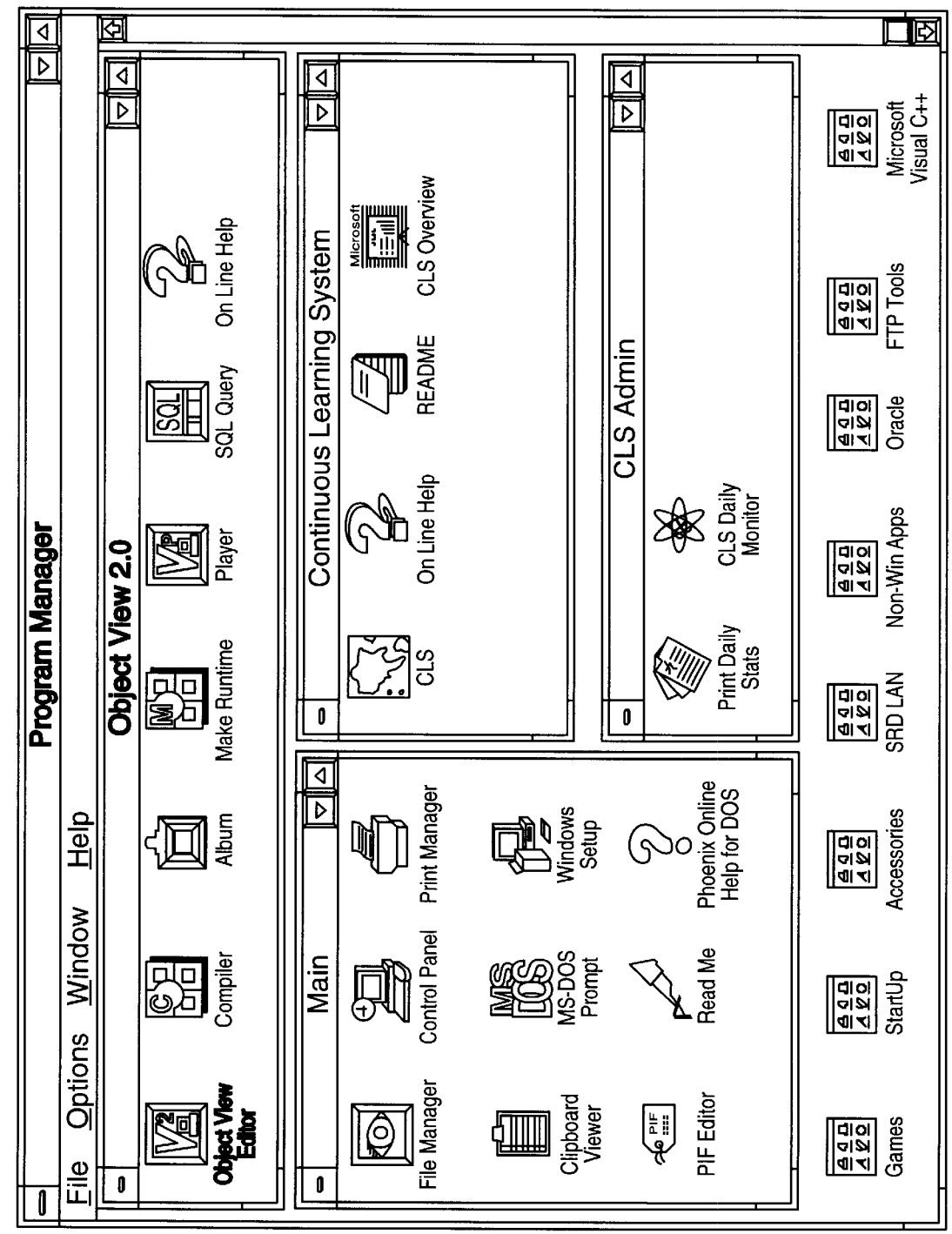
FIGS. 1–4 illustrate screens which the invention causes to be displayed on a user's PC, during a log-on process. Most of the icons shown are specific to the user's computer, and relate to software owned by the user. Those contained within the box labeled "Continuous Learning System" are related to programs used by the invention.
Figure 1A:
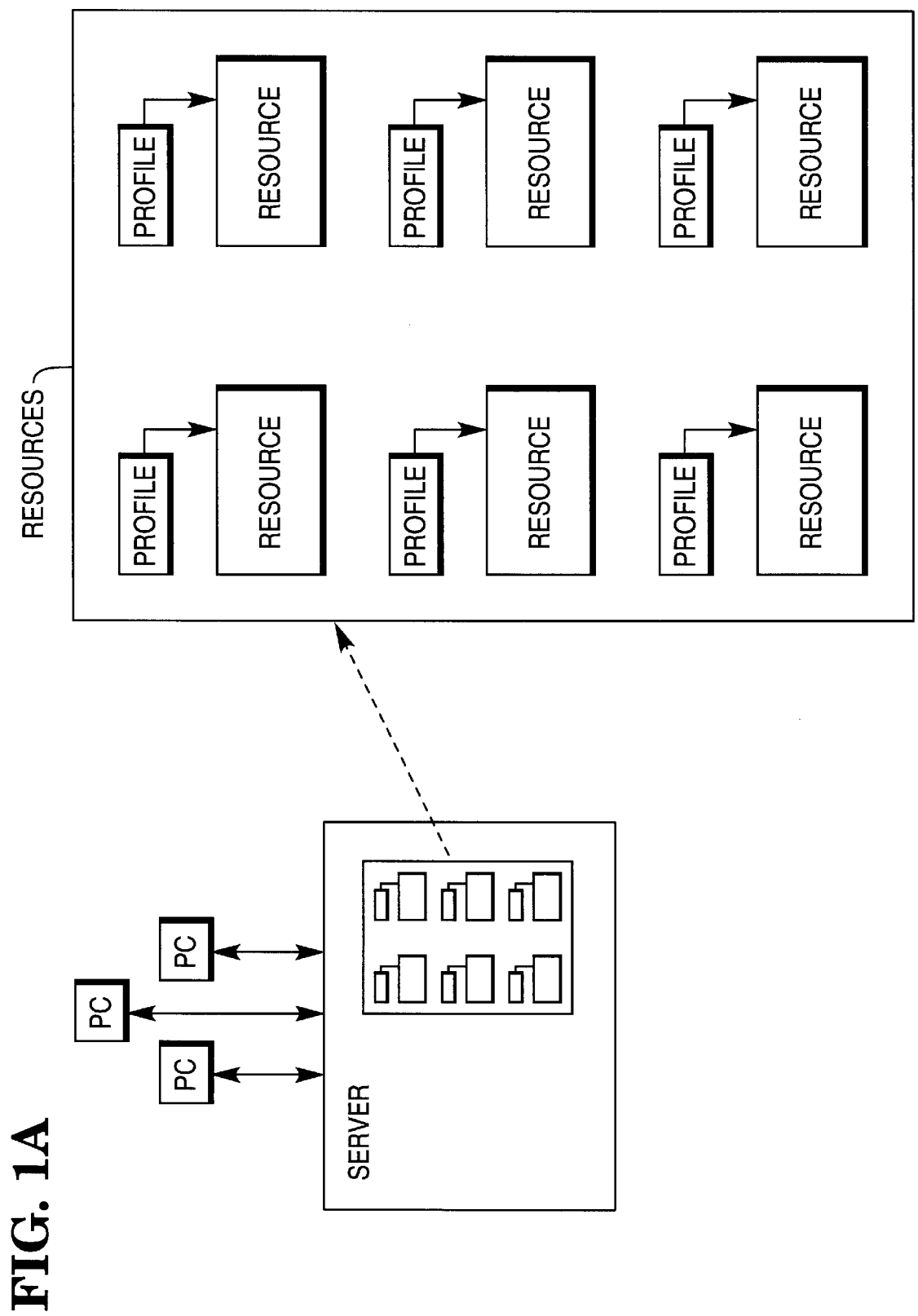
FIG. 1A illustrates the concept of storing RESOURCEs within a SERVER, and the association of a PROFILE with each RESOURCE.

FIG. 1A illustrates a SERVER, which is a computer, or equivalent, which acts as a REPOSITORY, by holding a collection of RESOURCEs, for the benefit of microcomputers, labeled PC's. The PC's are the clients of the SERVER.

At present, for ease of explanation, the RESOURCEs can be viewed as computer files. However, as will be seen shortly, the RESOURCEs actually include a vastly larger, and more diverse, collection of objects than mere computer files. RESOURCEs include (a) data, (b) information, and (c) knowledge, both as these terms are generally defined, and also as defined by computer scientists. This data, information, and knowledge can take the form of computer-downloadable data, or other forms, such as printed matter. Each RESOURCE has an associated PROFILE, which contains descriptive information about the RESOURCE. FIG. 48 illustrates an exemplary PROFILE. The user of a PC uses the PROFILEs to locates RESOURCEs of interest by searching through the PROFILEs.

For example, each PROFILE contains a descriptive title. If a user is a manufacturer of golf equipment, and is developing a new golf ball having improved aerodynamic dimples, the user may search the RESOURCEs by looking for phrases such as "golf ball" or "aerodynamic" in combination with "golf ball"

within the PROFILEs. (This searching is standard Boolean key-word searching.) The invention will locate the PROFILEs, and thus the RESOURCEs, containing titles which match the search criteria.

Location of PROFILEs

Figure 1B:
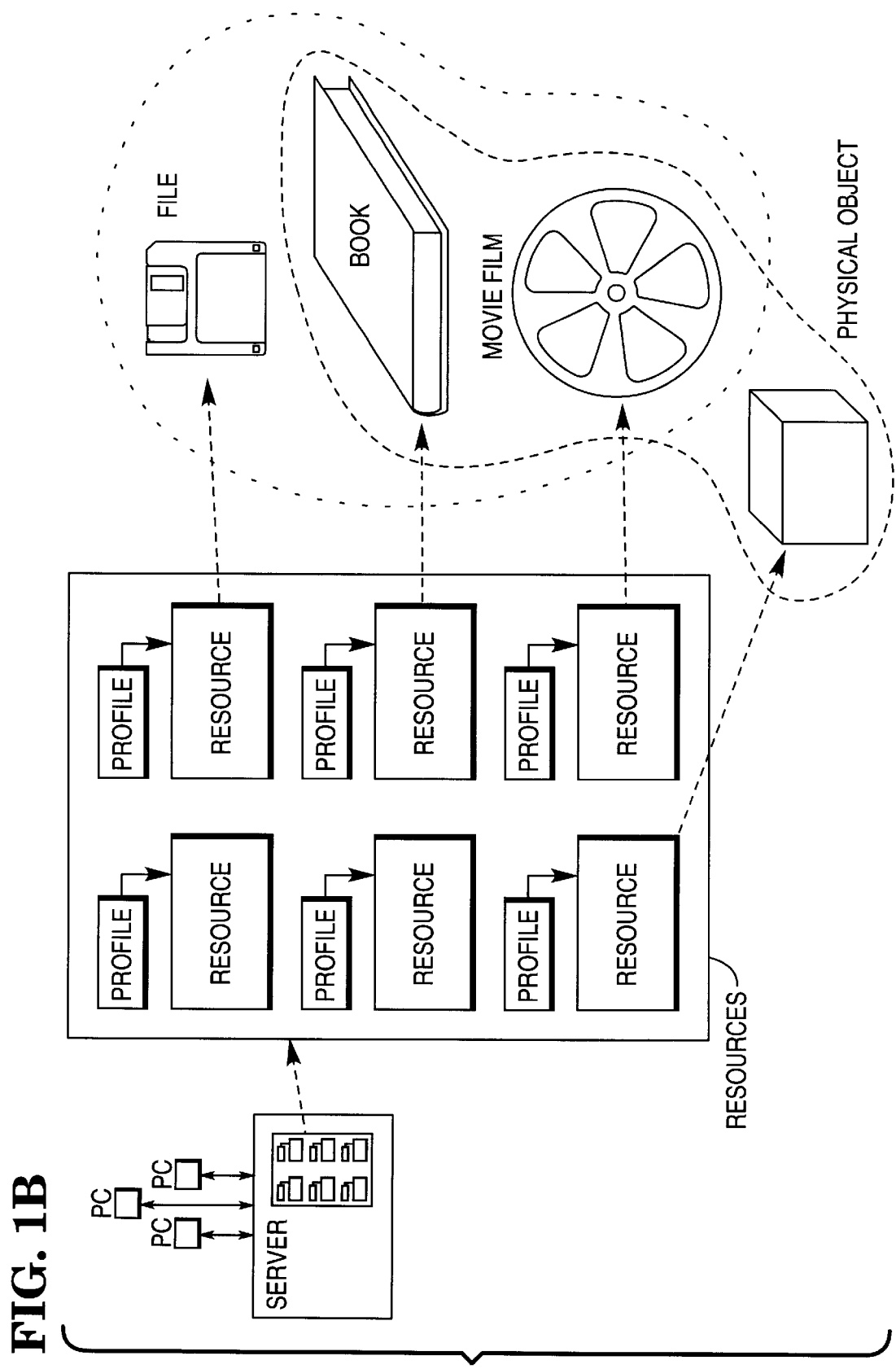
FIG. 1B illustrates how RESOURCEs can be divided, according to two different criteria. That is, RESOURCEs can be classified as either containing information or not. RESOURCEs can also be classified as being downloadable or not.
Figure 1C:
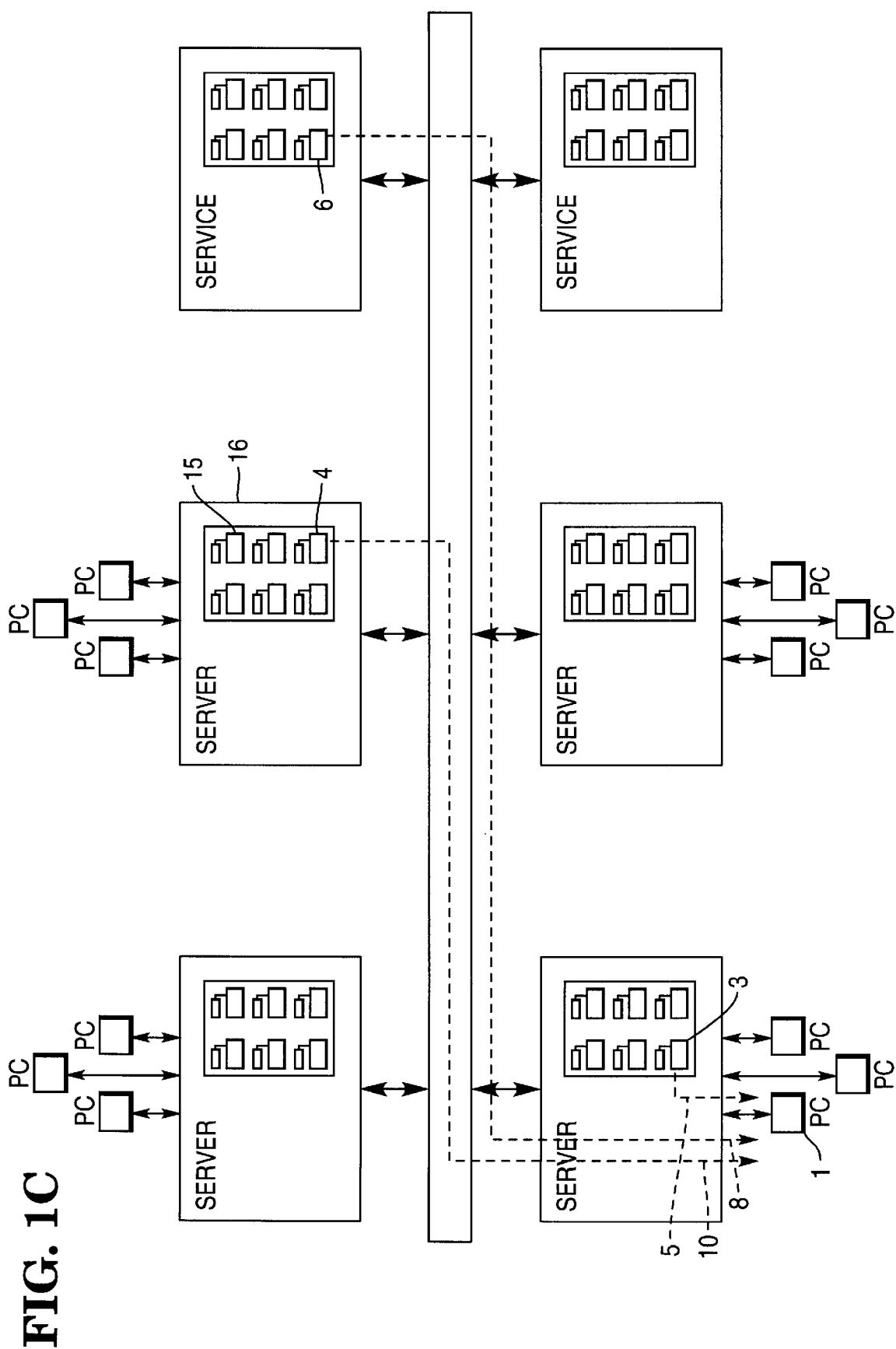
FIG. 1C illustrates how a client of a SERVER can gain access to RESOURCEs contained within the client's SERVER, as well as RESOURCEs contained within other SERVERs.
Figure 1D:
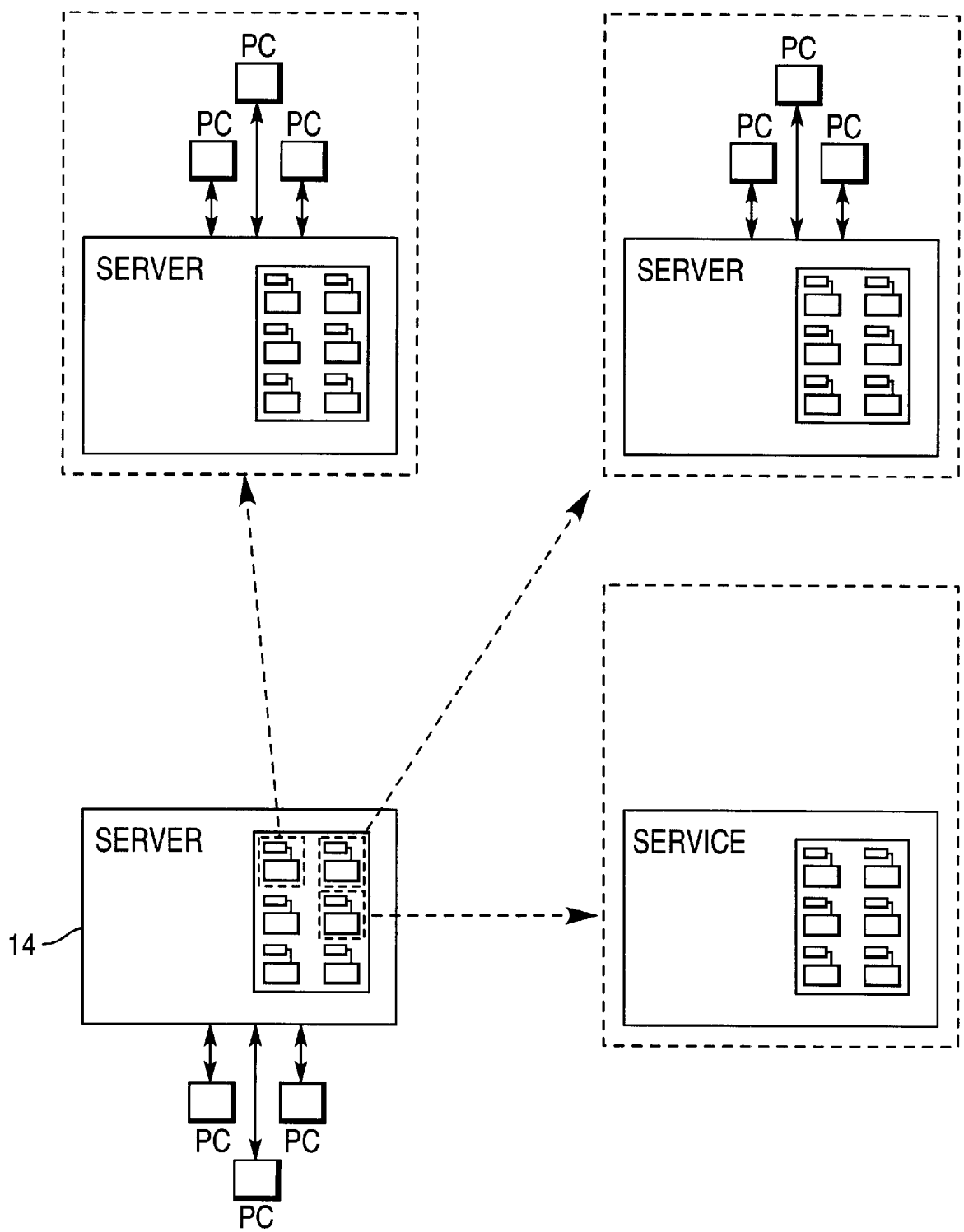
FIG. 1D illustrates how a SERVER can be viewed as a RESOURCE.
Figure 1E:
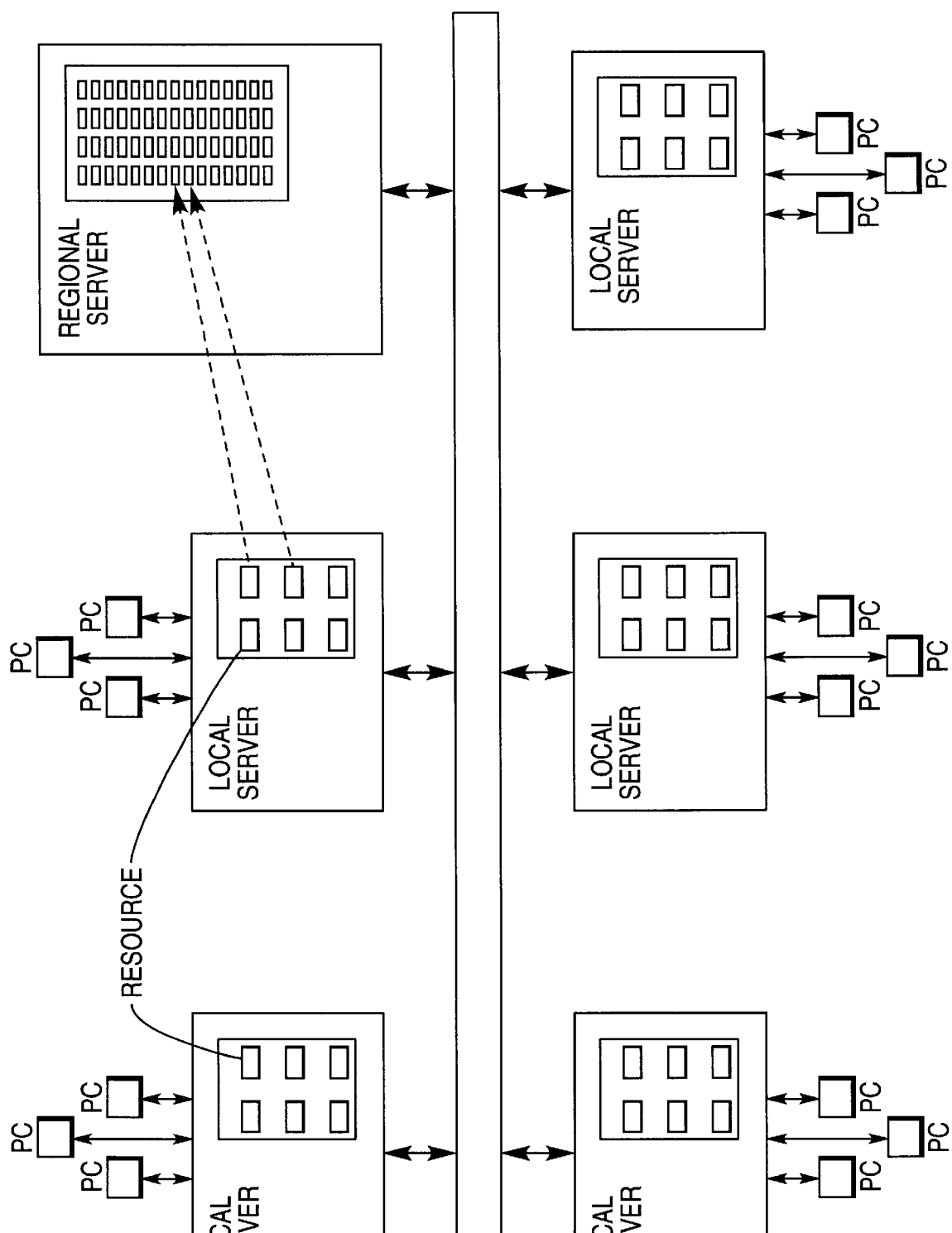
FIG. 1E illustrates storage of PROFILES within REGIONAL SERVERs and storage of RESOURCEs within LOCAL SERVERs.

FIG. 1A, as well as FIGS. 1B through 1D, indicate, for ease of explanation, that the PROFILEs are stored in the same SERVER as the RESOURCEs. However, the preferred method of storage is shown in FIG. 1E. Two types of SERVER exist, namely, LOCAL SERVERs and REGIONAL SERVERs. The PROFILEs are stored in the REGIONAL SERVERs. The RESOURCEs are stored in the LOCAL SERVERs.

REGIONAL SERVERs, as the name implies, serve a region, and hold the PROFILEs for RESOURCEs associated with multiple LOCAL SERVERs located within the region. Both types of SERVER (LOCAL and REGIONAL) have ADMINISTRATORs, as that term is explained later. (Of course, the same person can act as ADMINISTRATOR for more than one SERVER, and for both LOCAL and REGIONAL SERVERs.)

RESOURCEs Not Limited to Computer-Type Data

The RESOURCEs are not limited to computer-type data, or files. FIG. 1B provides an example. That Figure shows four different types of RESOURCEs, namely, a computer FILE (or data), a BOOK, a reel of MOVIE FILM, and a PHYSICAL OBJECT. The PHYSICAL OBJECT can take the form of any physical object, such as a computer disc drive, or a diesel-electric railroad locomotive. Of course, these four RESOURCEs are exemplary only; numerous different types of RESOURCEs can exist.

These RESOURCEs can be divided into two pairs of classes, based on two different criteria, as indicated by the two dashed loops. One class pair is based on the fact that the BOOK, MOVIE FILM, and FILE all contain information, although stored on different media (paper, celluloid, and magnetic or optical media, respectively). As information, the RESOURCEs can be transmitted over a data link, such as a telephone communication channel, provided they are first translated into the proper format, such as digitized data. The PHYSICAL OBJECT, in general, does not contain information.

The second class pair is based on the fact that the BOOK, MOVIE FILM, and PHYSICAL OBJECT are all tangible material objects, while the FILE (when stored within the mass storage of the SERVER) is not. As material objects, the objects themselves cannot be transmitted in the same way as the information which they contain. The objects require physical transportation for a user to obtain them.

All RESOURCEs, in Certain Respects, are Treated Identically

The invention, in certain respects, treats all RESOURCEs identically, irrespective of their classification as data or material object. For example, every RESOURCE, irrespective of its classification, is associated with a PROFILE. All PROFILEs, without regard to classification, are stored, processed, and made available to the user of a client-PC, without regard to classification.

Several examples are the following:

The user can obtain a complete list of all PROFILEs, arranged alphabetically by title. The PROFILEs, in general, will cover RESOURCEs in both classes.

The user can obtain a complete list of PROFILEs having titles which contain only certain combination of words, by calling for a "boolean key-word search." The search is performed without regard to classification (unless classification is deliberately made part of the search, as by requesting a search be done only of RESOURCEs held in the form of video tape).

The user can obtain a list of all PROFILEs within a specified category.

Figure 19:
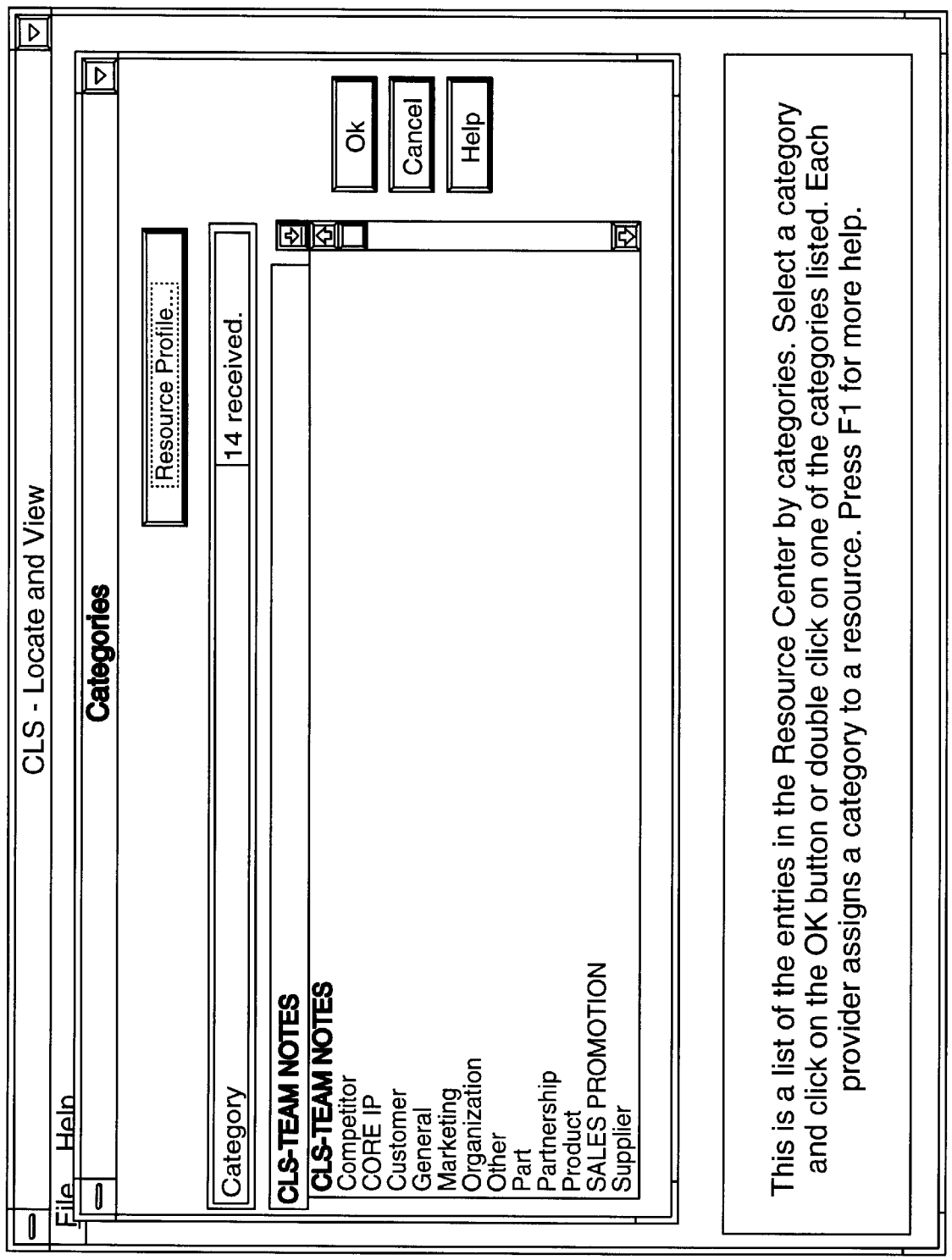

Categories are discussed below. Each PROFILE, when created, is assigned a category. (If the creator of the PROFILE does not find a suitable, pre-existing category, then the creator can establish a new category, which is added to the system.) The categories are different from the "classifications" described above. FIG. 19 illustrates exemplary categories.

Security Aspects

This discussion has presumed that the user has access to all PROFILEs and all RESOURCEs. However, in general, a user will not have such broad access, but only access to those PROFILEs and RESOURCEs for which the user has authorization. When a user performs a search, only the PROFILEs to which the user has access are displayed.

As explained later, the access is controlled by the owner of the RESOURCE. When the owner deposits a RESOURCE into a REPOSITORY, the owner can, of desired, restrict access to the RESOURCE, by designating certain classes of users who are allowed to see the RESOURCE. (The access restriction is accomplished by placing the restrictions into the PROFILE, as later discussed.)

Access can also be limited by the ADMINISTRATOR of a system.

Multiple REPOSITORIES All Appear as Single REPOSITORY to User

The preceding discussion has been framed in terms of a single SERVER. The invention allows multiple SERVERs (ie, multiple REPOSITORIEs) to be linked together, as shown in FIG. 1C. The linking is done by commercially available telecommunication channels.

By the linking, all RESOURCEs, contained in all SERVERs, become available to all PC's. However, the linked structure shown in FIG. 1C is virtually invisible to the user of a given PC. To that user, all RESOURCEs, wherever located, appear as though contained within the user's own SERVER (although the user can ascertain the location of a given RESOURCE, if desired).

For example, the user of PC 1 can obtain access to the following RESOURCEs:

RESOURCE 3, as indicated by dashed path 5;
RESOURCE 4, as indicated by dashed path 10; and
RESOURCE 6, as indicated by dashed path 8.

The user obtains this access without additional steps or procedures. That is, the fact that the RESOURCEs are located within different SERVERs (ie, REPOSITORIES), which may be located in different cities, imposes no requirements of additional procedures. The user sees all RESOURCEs as though they were located in the user's own SERVER.

RESOURCEs can Include SERVICEs, in Addition to REPOSITORIES

The last RESOURCE, number 6, is different from the other two RESOURCEs in the following respect. The REPOSITORY holding RESOURCE 6 is not a SERVER which runs the software of the invention. Instead, this REPOSITORY is a commercially available data SERVICE. In 1994, three such commercially available SERVICEs are Compuserve, GEnie, and Paradox. (The Inventors are not endorsing these particular three SERVICEs, but only pointing to them as providing definitions of the term "SERVICE.")

The SERVICEs use their own software to maintain their RESOURCEs. Nevertheless, the invention allows a user to obtain access to the RESOURCEs within the SERVICEs. (License fees and other considerations are matters to be handled between the users themselves and the SERVICEs. The invention does not provide the user rights to obtain entry into, or connection with, the SERVICEs.)

RESOURCEs can be Viewed as REPOSITORIES

FIG. 1C can, conceptually, be viewed as shown in FIG. 1D. Other SERVERs, and the SERVICEs, are tantamount to RESOURCEs themselves. That is, the user of a PC which is a client of SERVER 14 sees no significant differences between a RESOURCE located in SERVER 14 and a RESOURCE located within another SERVER.

Any User can Place a RESOURCE within any REPOSITORY

A user can create a RESOURCE, such as a computer document, within any REPOSITORY. For example, the user of PC 1 in FIG. 1C can place RESOURCE 15 within SERVER 16. (Provided, of course, that the ADMINISTRATOR of SERVER 16 has given this user permission to do so. Also, SERVICEs, as opposed to SERVERs, may impose restrictions upon a user's ability to place RESOURCEs within them.) This user, called a PROVIDER, can restrict access to the RESOURCE. For example, the PROVIDER can specify that only certain groups (or TEAMs) of other users can obtain access.

As another type of restriction to access, it is here noted that ADMINISTRATORs can, in effect, restrict access in a similar way, by at least two different mechanisms. One, the ADMINISTRATORs determine who gains access to the SERVER under control of the ADMINISTRATOR. Two, the ADMINISTRATOR can assign users of the SERVER into the TEAMs discussed in the previous paragraph.

User can Establish a Standing Search Order

Any user can request that the PROFILEs of newly added RESOURCEs be searched for items of interest to the user. For example, the user can request that the "aerodynamic dimple" search, mentioned above, be performed upon every new PROFILE which is added to every REPOSITORY. When a phrase is found, in a PROFILE, which matches the search criteria ("aerodynamic", "golf ball" etc.), the user is notified.

The standing search is done periodically, at intervals (such as once daily) specified by the user at the time the standing search is established. Then, at every interval, the invention automatically performs the search. The inventors point out that the standing search is not done upon each new PROFILE when it is added to the invention, but at the intervals specified by the user.

Continuity Aspects

The invention, as just described, has several aspects of continuity.

The REPOSITORIES are continually being updated.

The network of connected SERVERs (ie, REPOSITORIES) shown in FIG. 1C is expected to continually expand into a larger network, containing ever-increasing SERVERs.

The users can issue standing search orders which continually search the ever-increasing collection of RESOURCEs.

Because of this continuity, the invention has been given the name "Continuous Learning System", or CLS. The CLS can be further explained by analogy to a library.

Analogy: Virtual Library

The CLS makes available to a user all of the types of materials (books, newspapers, microfilm, video tapes, etc.) which an ordinary library makes available to a user. (In addition, as discussed above, the CLS makes available the PHYSICAL OBJECTs shown in FIG. 1B).

However, the CLS provides a "virtual" aspect to this library. The term "virtual" means that the CLS provides many, if not all, of the functions of an actual library, but without requiring the physical presence of many of the accessories of a physical library.

For example, in an actual library, when a patron borrows a book, the book becomes unavailable to other patrons. In contrast, under the CLS, many of the RESOURCEs (which are analogous to the library books) take the form of downloadable data. Multiple copies can be distributed to multiple users, so that possession by one user does not deprive another user of access to the RESOURCE.

As another example, an actual library contains a card catalog. There is at least one card for each book within the library's collection. By analogy, the CLS contains a PROFILE for each RESOURCE. The PROFILEs give important information about each RESOURCE, such as a descriptive title, the location of the RESOURCE, etc.

As yet another example, an actual library contains another type of listing of its books, namely, a "shelf list." The shelf list enumerates all of the books, but in order of ascending library call number, instead of alphabetically. The shelf list tells the physical location of the books, since the books, on their shelves, are arranged in numerical order, according to call number.

Of course, a more macroscopic "shelf list" is the map, found in every library, which explains the locations of different groups of call numbers.

As still another analogy, an actual library categorizes the books according to subjects, in at least two different ways. One, the card catalog contains cards, in alphabetical order, for various subjects. Two, the Dewey Decimal System places books on similar topics at physically neighboring places.

Therefore, viewing library books as RESOURCEs, the invention possesses some of the characteristics of a library. In addition, the invention adds a virtual aspect to the library, as discussed above.

Further, the invention allows a user to order a RESOURCE held by a REPOSITORY, and the RESOURCE will be delivered. If the RESOURCE is of the downloadable type, it will be down-loaded to the user. Otherwise, a message is sent to the custodian of the RESOURCE, requesting physical delivery.

This discussion will now explain, step-by-step, how a user operates the invention.

Exemplary Sequence of Operation

The invention is designed to run in conjunction with a Graphical User Interface (GUI) such as Windows, available from Microsoft Corporation, Redmond, Wash., or the OS/2 operating system, available from IBM Corporation, located in Armonk, N.Y.

FIG. 1 illustrates a typical display which the GUI generates after the computer's power-up sequence has been executed. To launch the invention into operation, a user actuates the icon labeled "CLS," in the usual manner. ("CLS" is an acronym for the phrase "Continuous Learning System," as stated above.)

Figure 2:
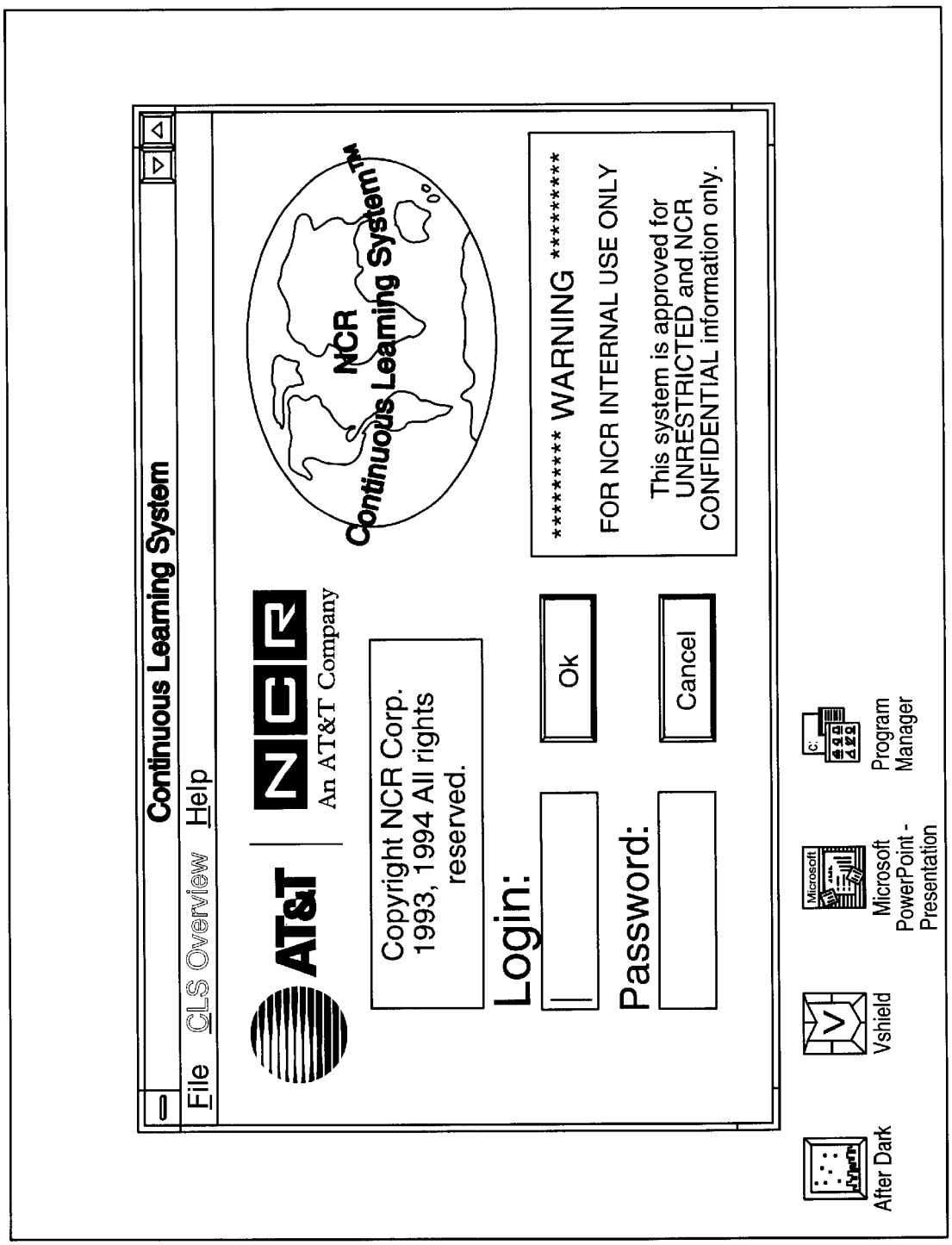
Figure 3:
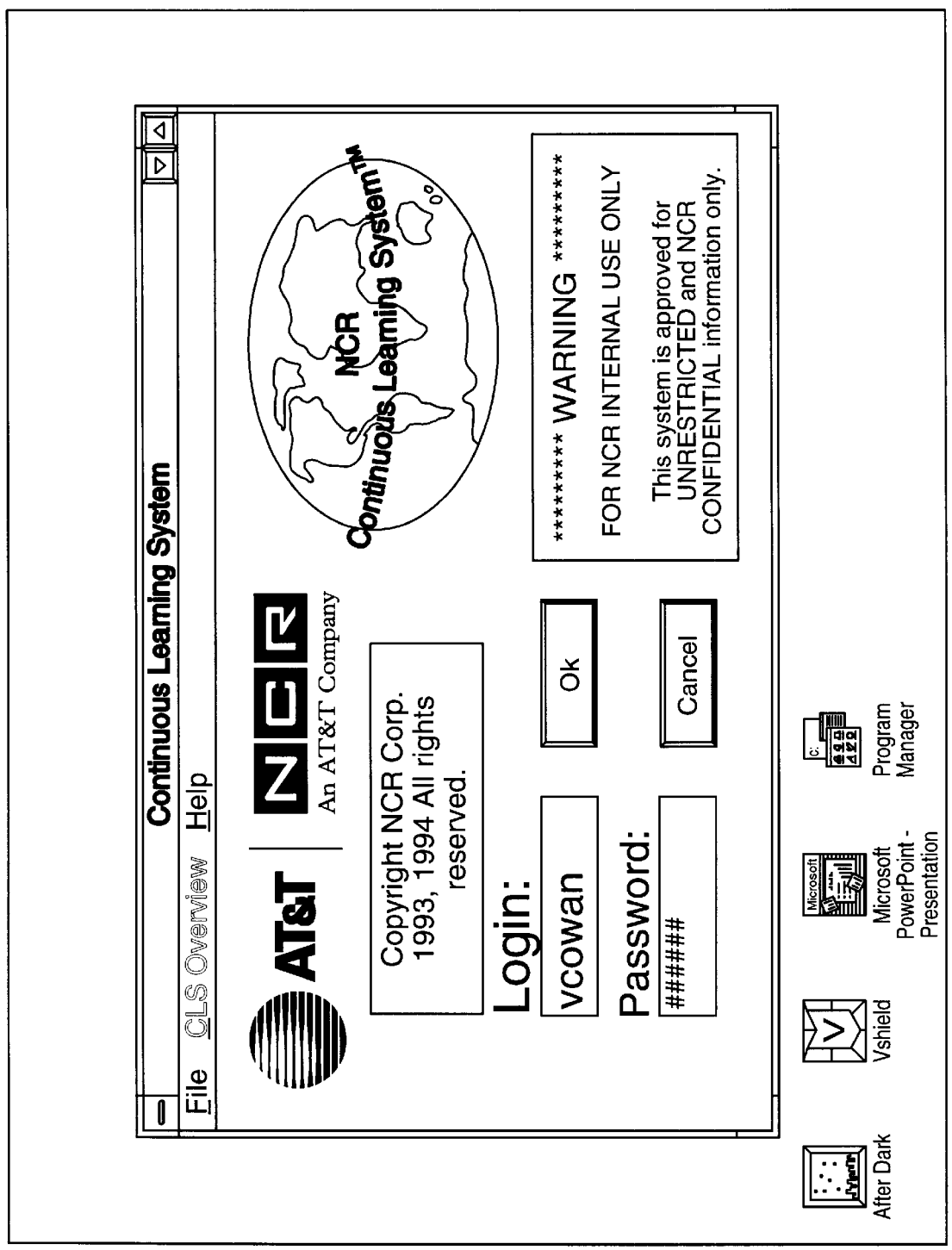

The invention responds by displaying the screen shown in FIG. 2. This screen prompts the user to enter the user's LOGIN, which is the user's account number for computer usage. The screen also prompts the user to enter the user's PASSWORD. Exemplary LOGINs and PASSWORDs are shown in FIG. 3. (The PASSWORD is represented by cross-hatchings, because the PASSWORD is to be kept confidential. The cross-hatchings prevent a nearby observer from stealing the user's PASSWORD.)

The LOGIN and PASSWORD are assigned to the user by the administrator of the CLS, as explained later.

Figure 4:
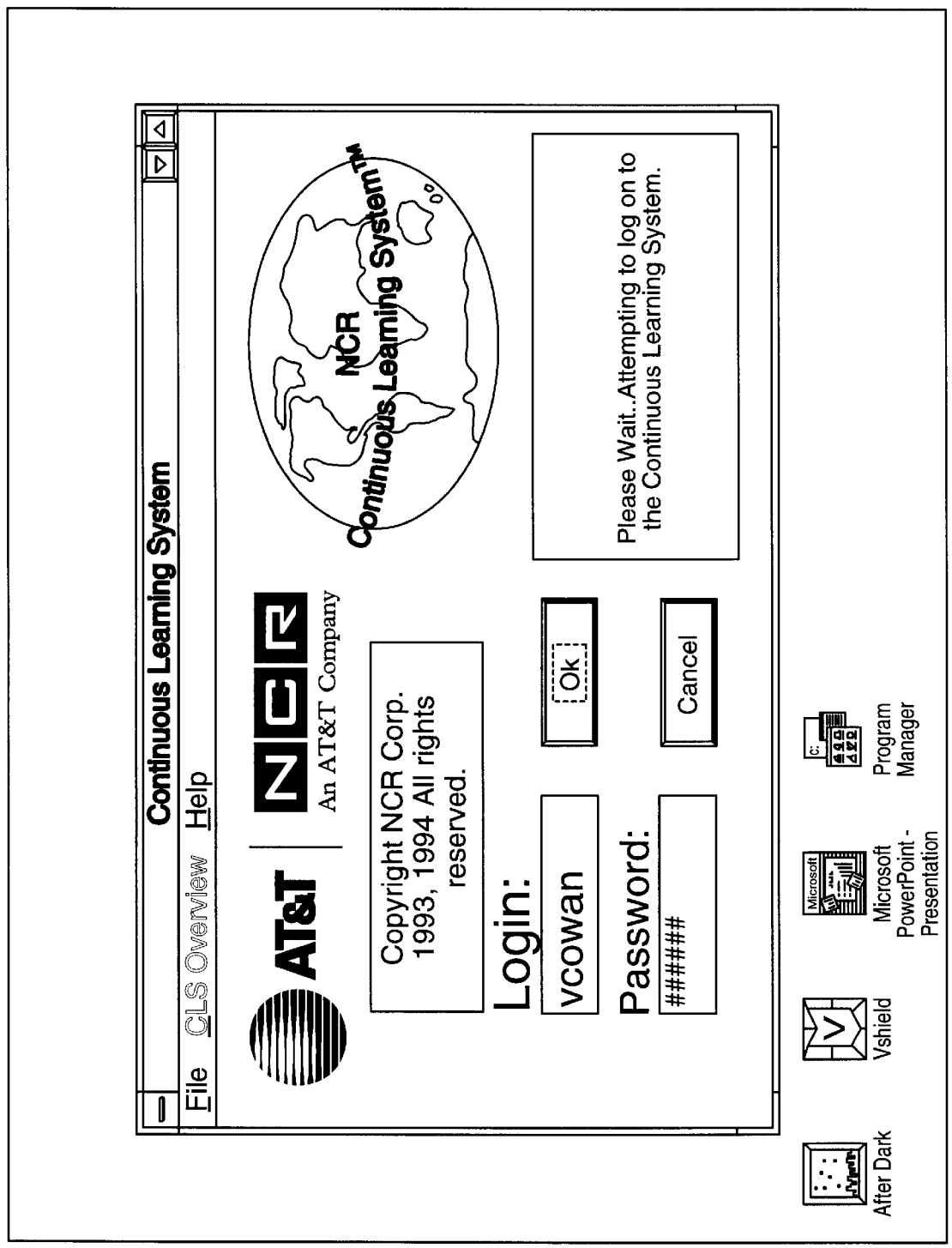

After entry of the PASSWORD, the invention displays the screen shown in FIG. 4, which informs the user that the process of logging on has commenced. When the log-on is successful, the screen shown in FIG. 5 appears, which can be taken as illustrating Level 1.

Figure 5:
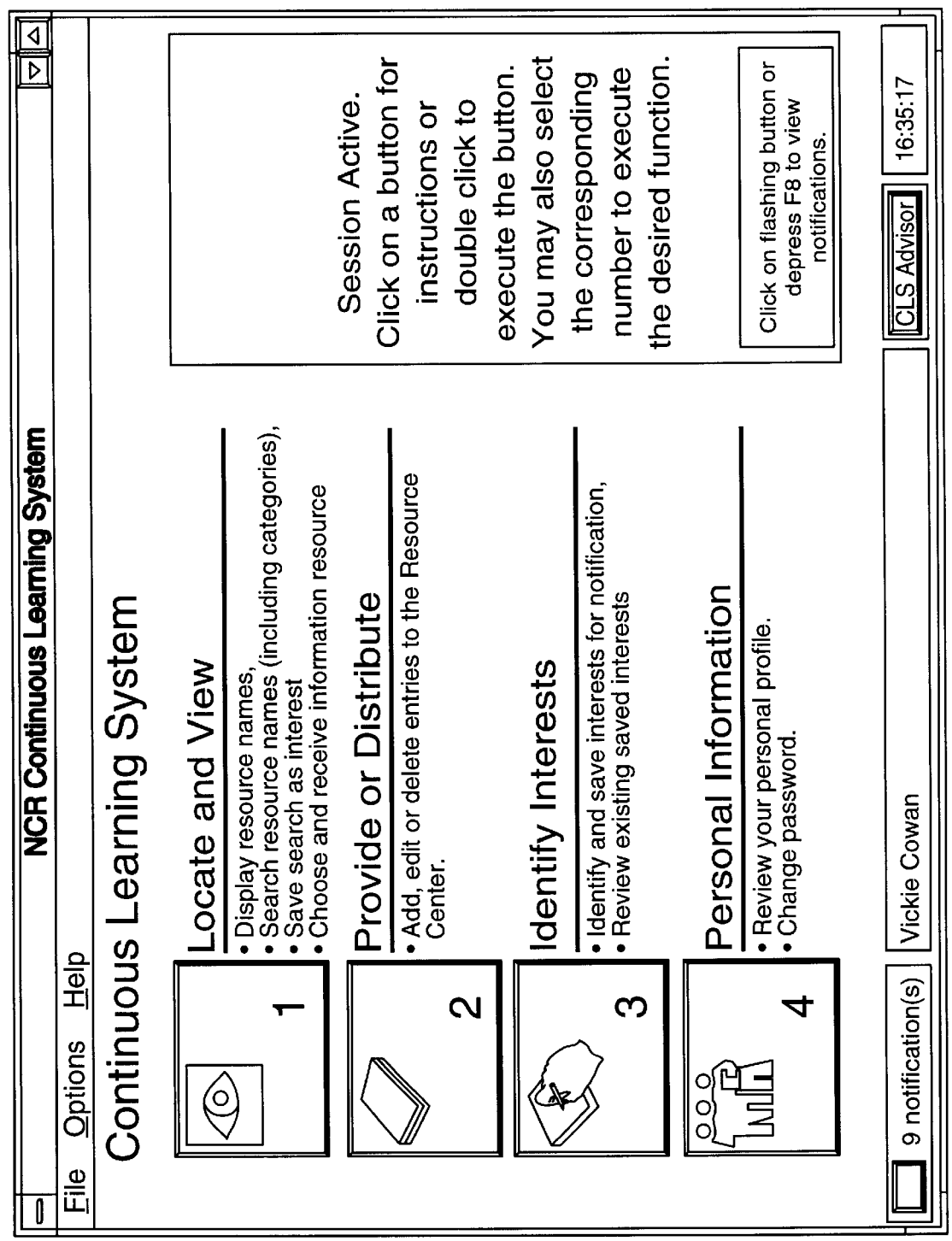
FIGS. 5 and 6 illustrate screens at Level 1, which provide options for the user to select.

This screen provides the user with four options, as indicated by the four buttons labeled 1 through 4. These four options actually encompass a much larger range of available options, but the screen of FIG. 5 presents four options for convenience of the user. In brief, these four options allow the user to perform the following actions:

1. Locate and View

The CLS system, as a whole, can be viewed as a repository of RESOURCEs. In a general sense, the CLS can be viewed as a virtual library. That is, all of the types of materials which are found in a library are made available by the CLS. However, much of the material is stored, and made available to the user, in downloadable computer format. These materials are termed RESOURCEs, and the "library" is termed a REPOSITORY.

RESOURCEs include items which are customarily stored within computer databases, such as computer programs and data. In addition, RESOURCEs include items which are not stored in computer-downloadable format. Examples of these latter RESOURCEs are newspapers, video tapes, 35 millimeter films, books, microfilm, maps, and all other media which are used to carry information. Further, the concept of a RESOURCE extends to non-informational subject matter, such as physical objects.

Every RESOURCE carries with it a PROFILE. Each PROFILE contains important information about the RESOURCE, such as a description of the RESOURCE, where it is located, etc. The LOCATE AND VIEW option allows a user to view the PROFILEs.

2. Provide or Distribute

This option allows a user to add RESOURCEs to the CLS.

3. Identify Interests

The CLS allows a user to search the collection of repositories for RESOURCEs in which the user is interested. Some distinctions between "LOCATE AND VIEW" and "IDENTIFY INTERESTS" are significant.

The "LOCATE AND VIEW" option allows a user to order a search, according to specific criteria, as discussed above. The search is done once, at the time it is made.

The "IDENTIFY INTERESTS" option allows the user to establish a search which will be done at periodic intervals in the future. The intervals are specified by the user. CLS automatically performs the searches, at the specified intervals, and informs the user of the results.

4. Personal Information

This option allows a user to view and modify information associated with the user's PROFILE.

This discussion will give several examples of use of these options.

EXAMPLE 1

Locate and View

Figure 6:
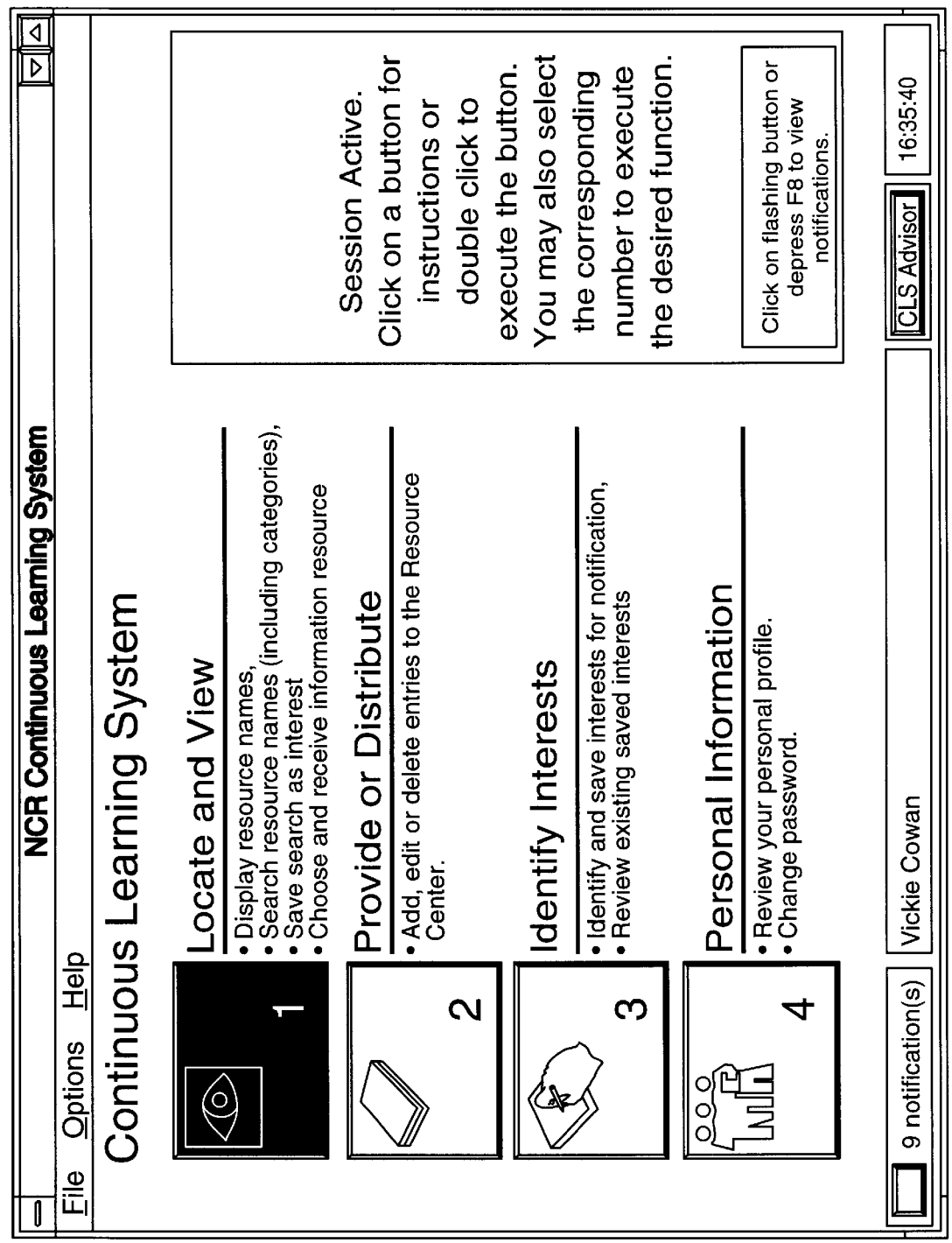
Figure 26:
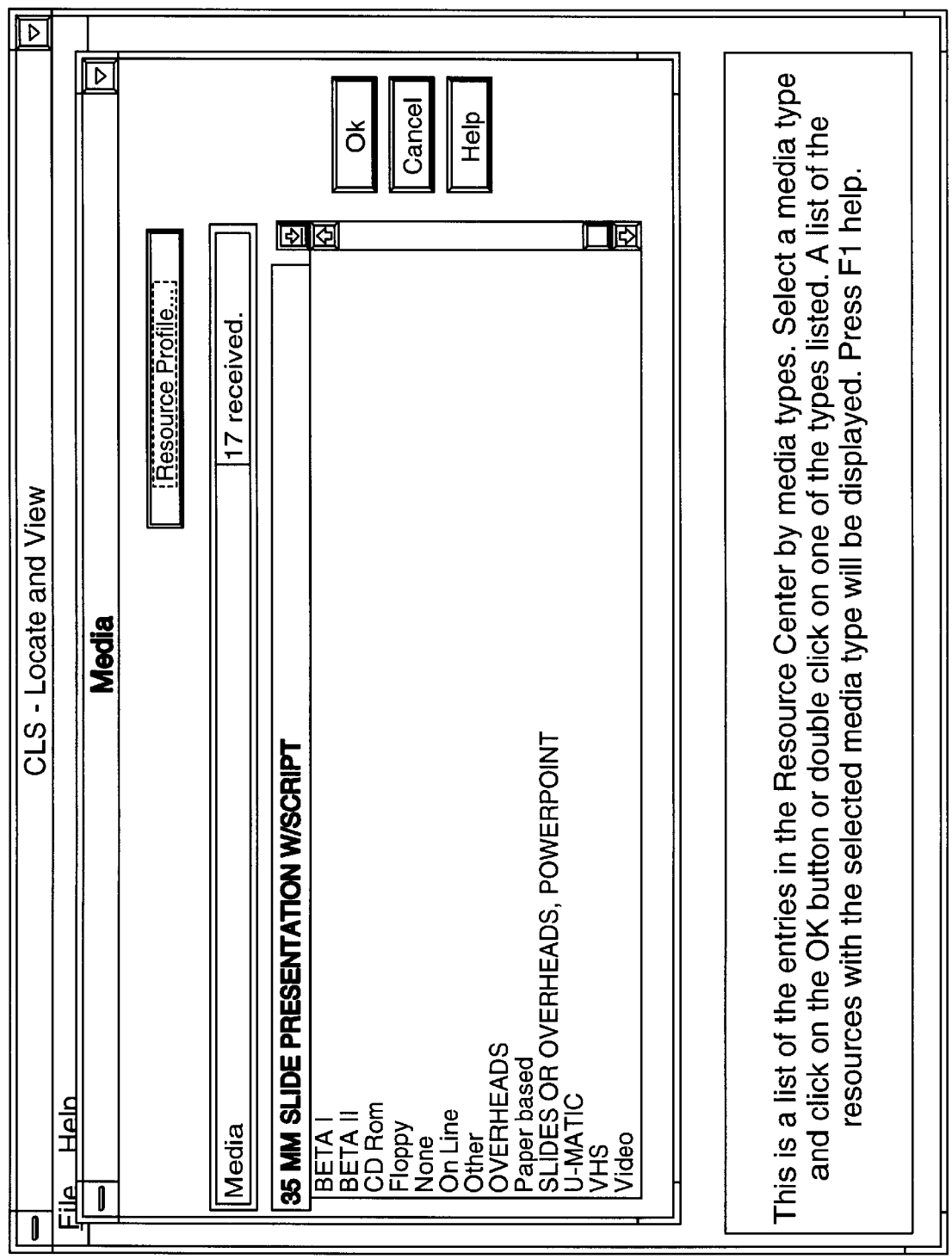

Assume that the user actuates the LOCATE AND VIEW button, number 1, as in FIG. 6. The CLS responds by displaying the screen shown in FIG. 7. This screen offers the user eight options:

1. ALL RESOURCES. This option displays the titles of all RESOURCEs which are available to the user.
2. GENERAL SEARCH. This option allows a user to search the PROFILEs of all RESOURCEs in pursuit of a particular phrase. The GENERAL SEARCH allows Boolean Key-Word searching of the PROFILEs.
3. CATEGORY. This option allows a user to search the PROFILEs by CATEGORY. For example, assume that the user is a women's fashion designer. The CLS can contain a collection of drawings and photographs of interest to the fashion industry. The PROFILES can be divided into CATEGORIES such as "Hats," "Shoes," "Evening Wear," Winter Wear," etc.
4. MEDIA. This option allows a user to obtain access to PROFILEs, based on the media type. For example, one media type is video tape. Another is paper. FIG. 26 gives further examples of types of media. Media types include down-loadable computer files and data, video tapes, photographic film, books, audio tape, CD-ROM, and so on. Media type refers, generally, to the physical characteristics of the medium which carries the data.
5. REPOSITORIES. This option allows a user to view the RESOURCEs according to the REPOSITORY which holds them. For example, assume that the Library of Congress is one REPOSITORY, and the New York City Public Library is another. The user can elect to view all PROFILEs of RESOURCEs of either library, by selecting the REPOSITORY.
6. SYSTEMS. This option is similar to REPOSITORIEs. This option allows a user to obtain access to commercially available SERVICEs, as that term is defined above. These SERVICEs are also called "On-Line Databases." By selecting this option, a user can gain access to one of these services, through the CLS.
7. SAVE SEARCH AS INTEREST. This option allows a user to establish a standing search, wherein PROFILEs are searched as they are created. For example, if the aerodynamic golf ball maker, described above, chooses this option for the search, then every new PROFILE which is added to the system is searched for the terms "aerodynamic" etc. The user is notified when a PROFILE matching the search criteria is found.

EXAMPLE CONTINUED

Figure 7:
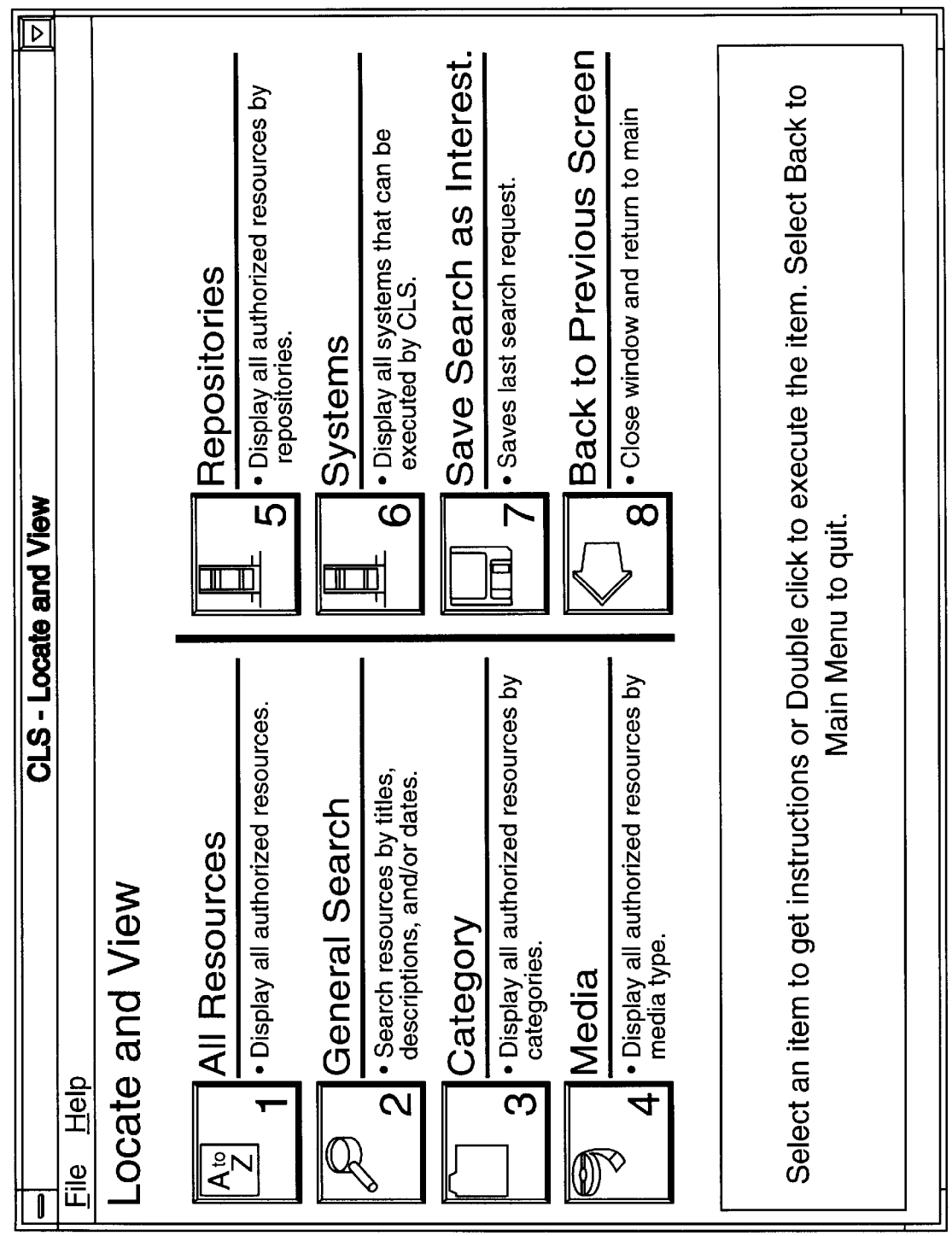
FIGS. 7 and 8 illustrate screens displayed, at Level 2, in response to selection of the "Locate and View" option of FIGS. 5 and 6.
Figure 8:
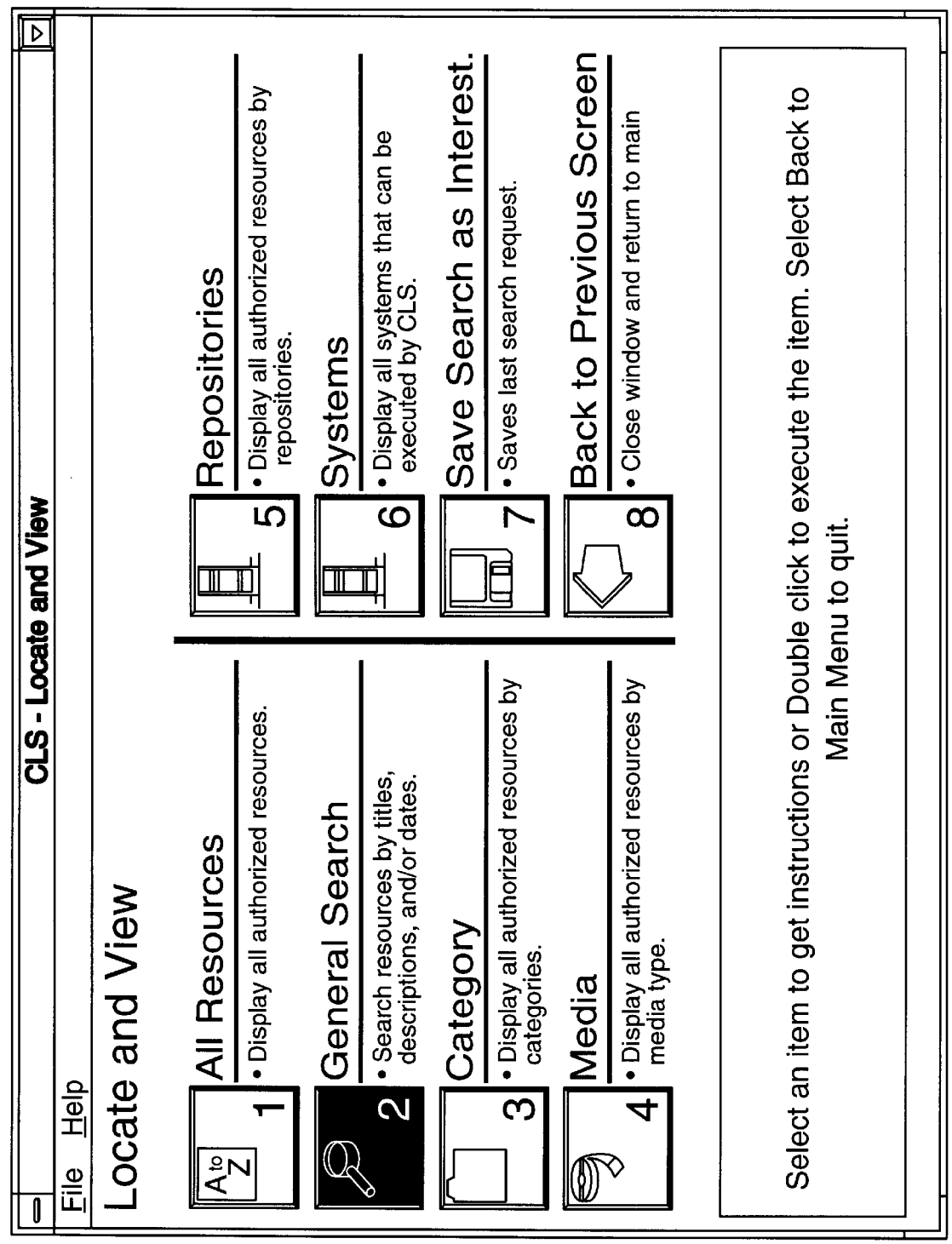
Figure 9:
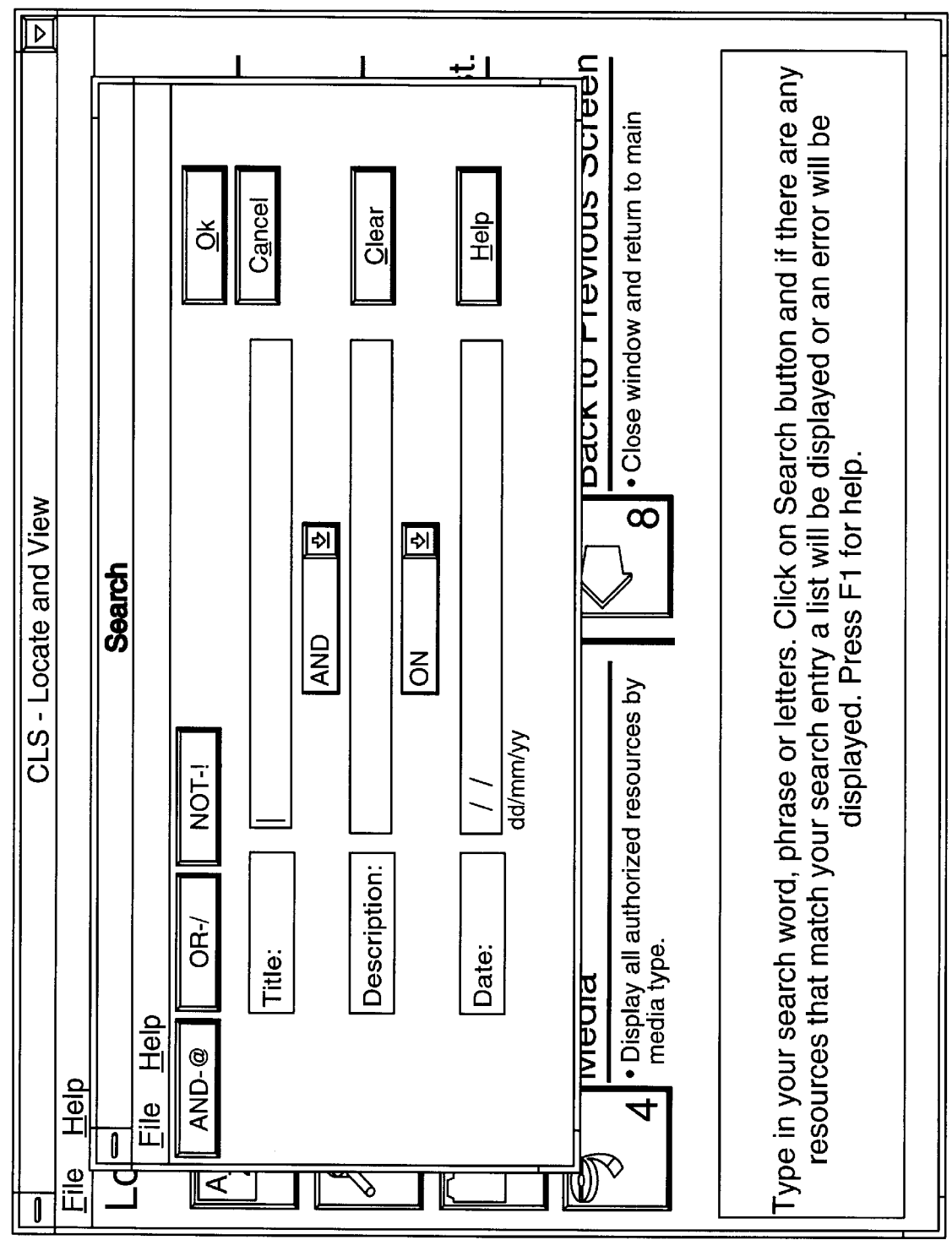
FIGS. 9–11 illustrate how a user undertakes a Boolean key-word search.

Assume that the user selects button 2 in FIG. 7, GENERAL SEARCH, as indicated by the highlighted button in FIG. 8. The CLS responds by displaying the screen shown in FIG. 9. This display prompts the user to request a search based on three criteria (or less).

Figure 10:
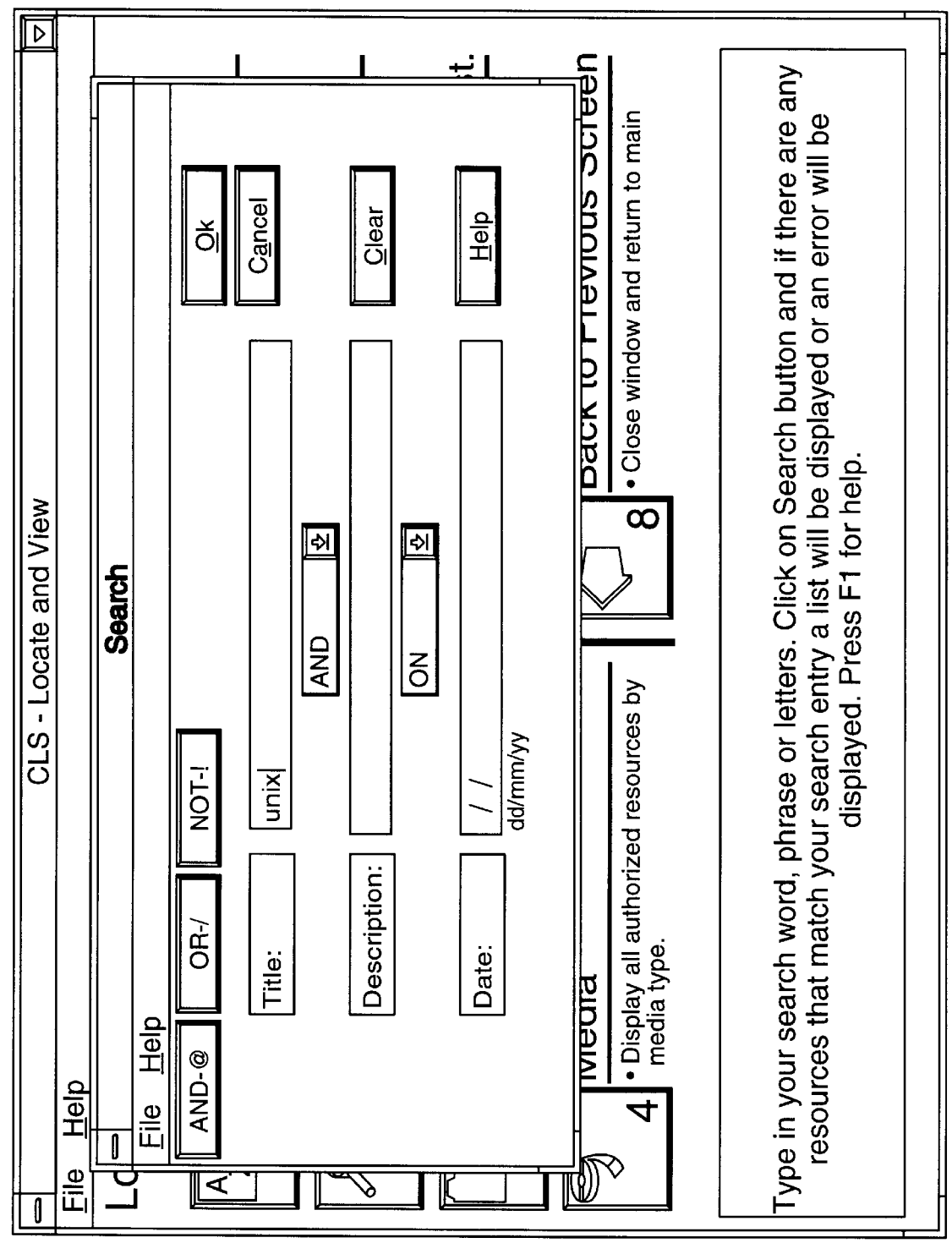
Figure 11:
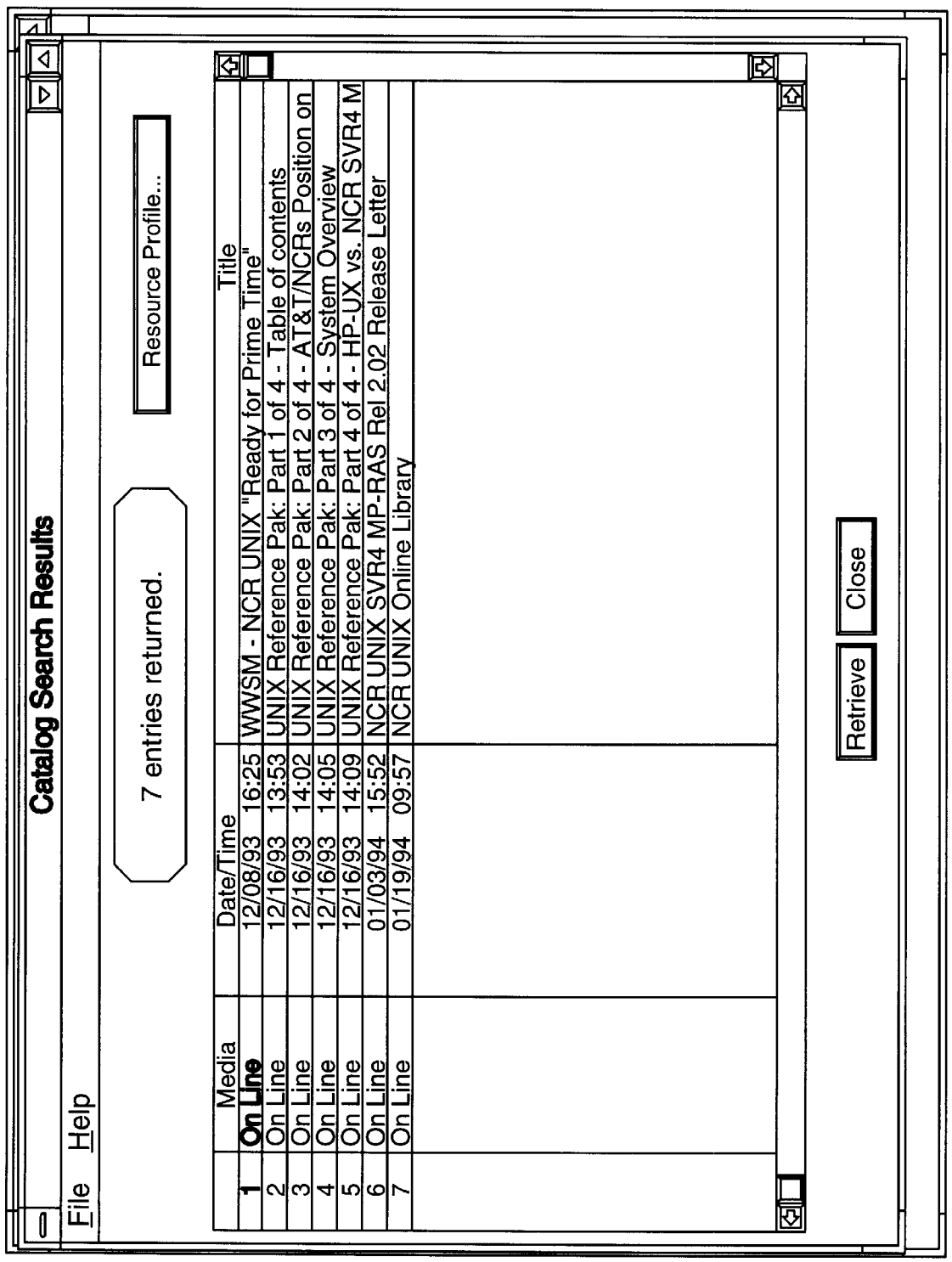

For example, assume that the user is interested in RESOURCEs having the word "UNIX" in the titles of their PROFILEs. The user enters the word "UNIX," as indicated in FIG. 10. The CLS performs a search of all REPOSITORIEs, and locates all PROFILEs having the word "UNIX" in their titles. FIG. 11 illustrates an exemplary result of the search.

The search provides three pieces of information about each RESOURCE identified by the search. One, the media type, as indicated in the column headed "Media." The phrase "On Line" indicates that the RESOURCE is "On-Line," or in a computer-down-loadable format (as opposed to being on paper or 35 mm film). If a RESOURCE takes a non-downloadable form, such as a 35 mm film, then the "Media" column so indicates.

The "Date/Time" column indicates the date and time when the PROFILE corresponding to a RESOURCE was created.

The "Title" refers to the title carried by the PROFILE corresponding to each RESOURCE.

Significantly, the screen does not indicate the location of each RESOURCE. To the user, all RESOURCEs appear as though residing at a common location, even though they may be scattered over a vast geographic area. Of course, if the user wished to identify the locations of these RESOURCEs, the user could do so, using other options described herein.

User Retrieves Resource

Assume that the user wishes to obtain item number 7 in FIG. 11. The user highlights this item, using a mouse (or keyboard, or other actuation device, such as a voice sensor), causing the display to appear as in FIG. 12. Then, the user actuates the button labeled "RETRIEVE," causing the display to take the appearance shown in FIG. 13. The icon bearing the sub-title "CLS Download," located at the bottom of the Figure, indicates that a down-loading operation is taking place.

Figure 14:
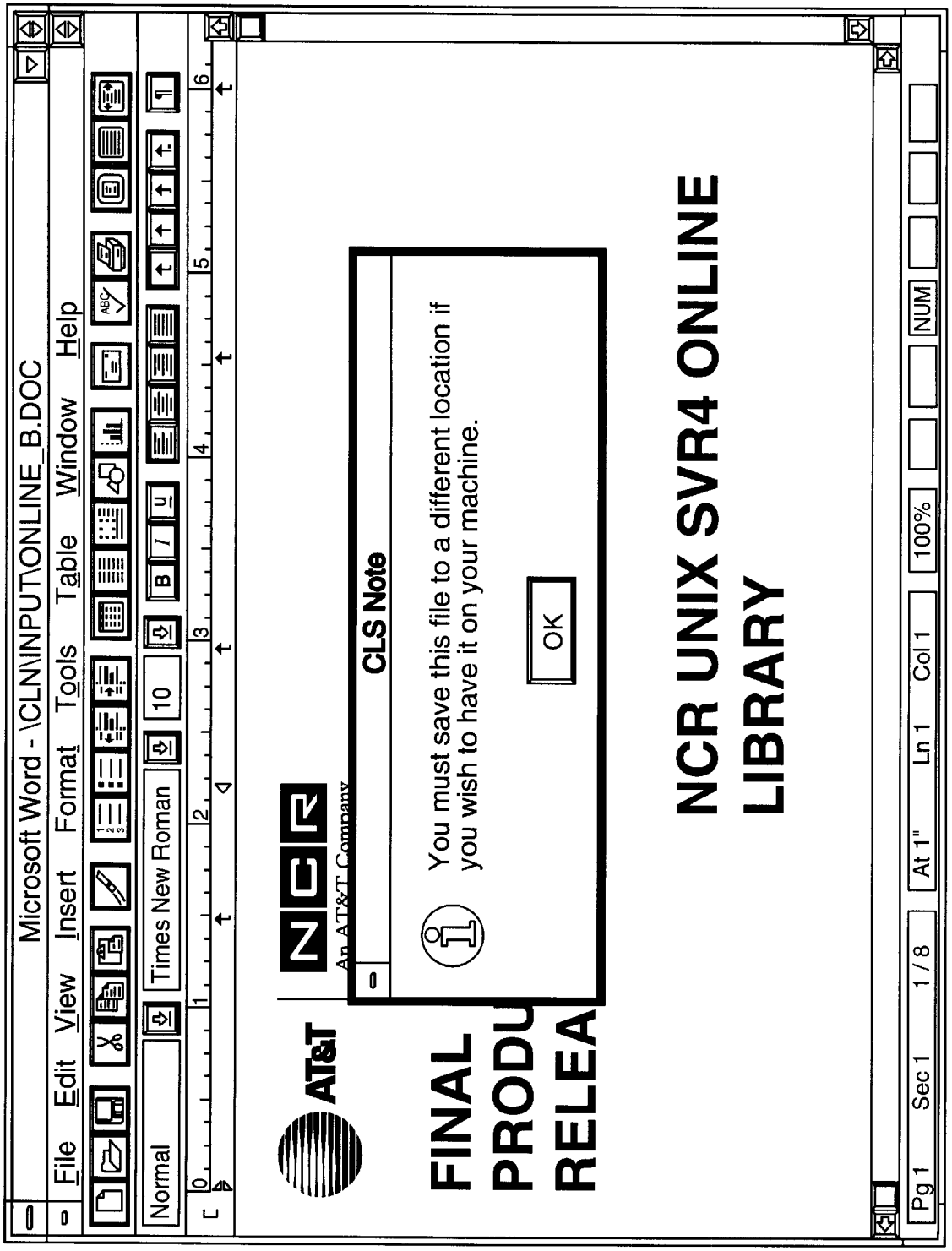

After the downloading is complete, the screen shown in FIG. 14 is generated. This screen indicates three important facts. One fact is indicated by the background of the screen, and the heading at the top of the screen. The background and the heading indicate that a computer program was launched.

CLS examined the RESOURCE which was downloaded, and looked for indicia which identified a computer program which was used to create the RESOURCE. In this example, the RESOURCE was a file which was generated by a word-processing program, namely, Microsoft Word™.

Having identified the word processing program, the CLS searched for the program, and launched it when CLS found it. The heading in the display shown in FIG. 14 indicates that this program has been launched.

The second fact is that CLS caused the word processing program to load the RESOURCE which was downloaded, namely, that which was located during the search for the UNIX title.

The third fact is that the screen shown in FIG. 14 informs the user that the RESOURCE which has been downloaded does not exist elsewhere in the user's computer, and, to be saved, must be saved by a specific action taken by the user. (Of course, the RESOURCE maintains its existence in the REPOSITORY from which it was retrieved). The prompt in FIG. 14 reminds the user to save the RESOURCE when the user exits the word processing program; otherwise the RESOURCE will be lost.

Figure 15:
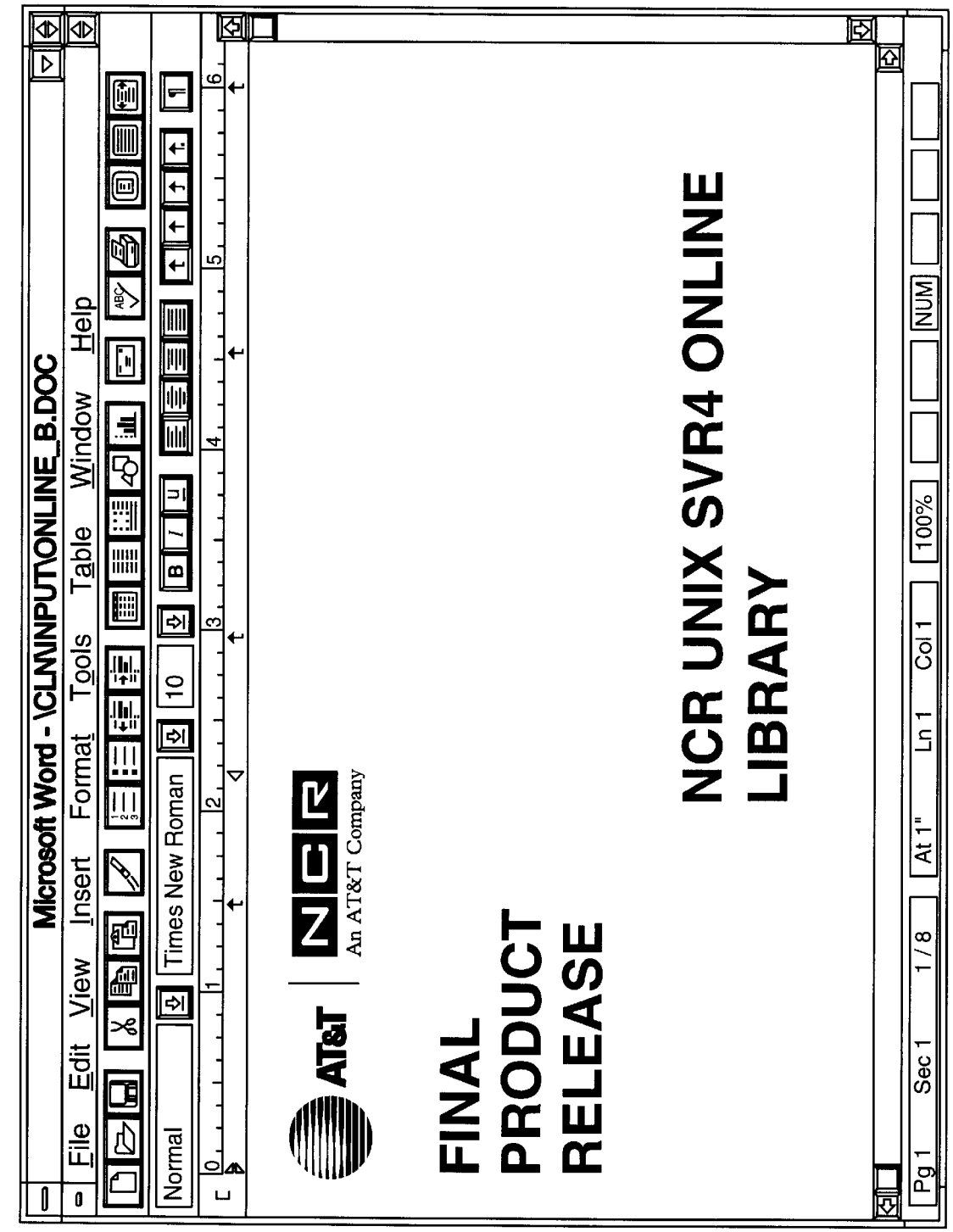
FIG. 15 illustrates display of the downloaded RESOURCE, by means of launching of a program which generated the RESOURCE.

FIG. 15 illustrates the display generated by the CLS after the user responds to the prompt of FIG. 14. The RESOURCE is displayed by the same type of word processing program which generated the RESOURCE.

Figure 12:
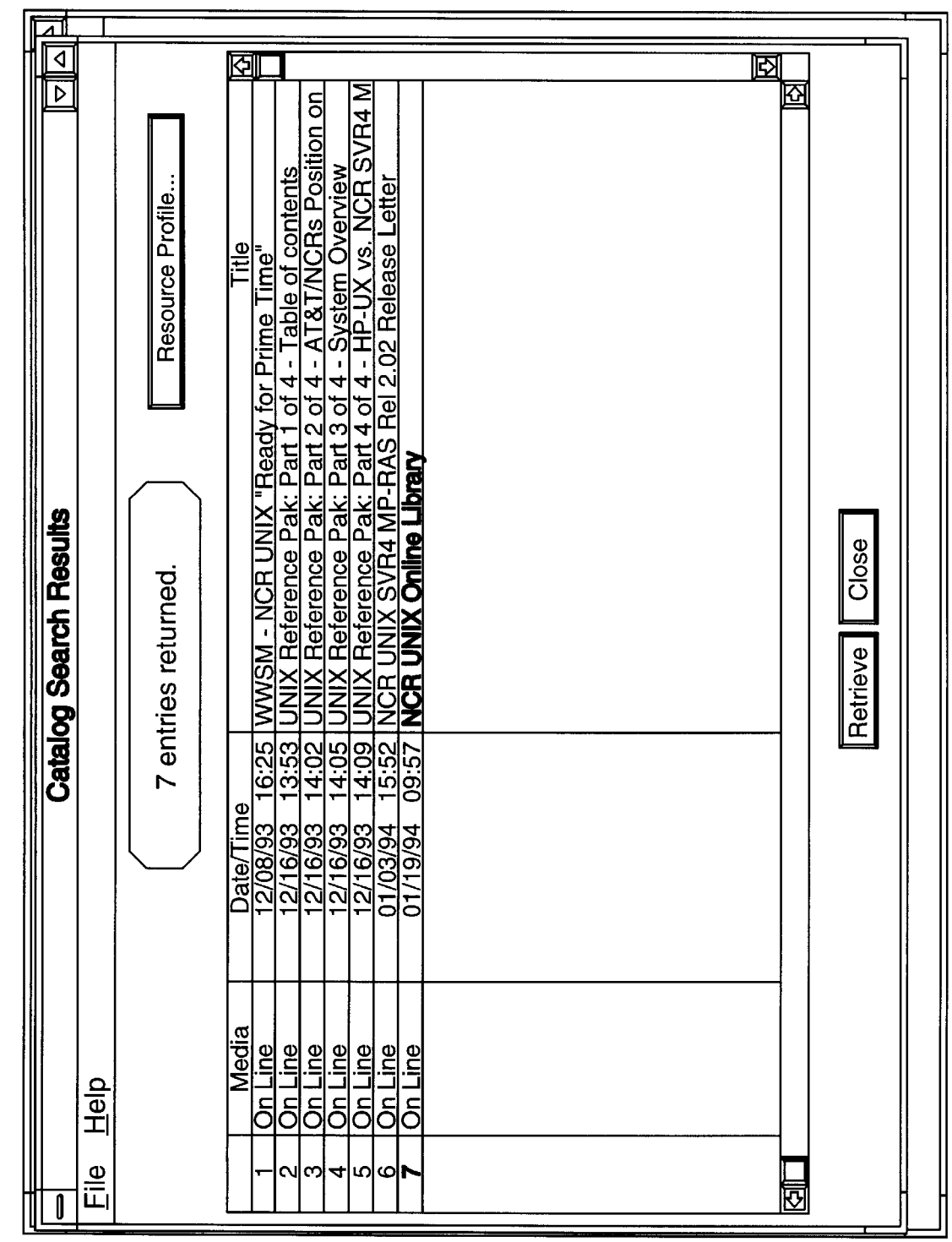
FIGS. 12–14 illustrate screens displayed when a user downloads a RESOURCE located during a search.
Figure 13:
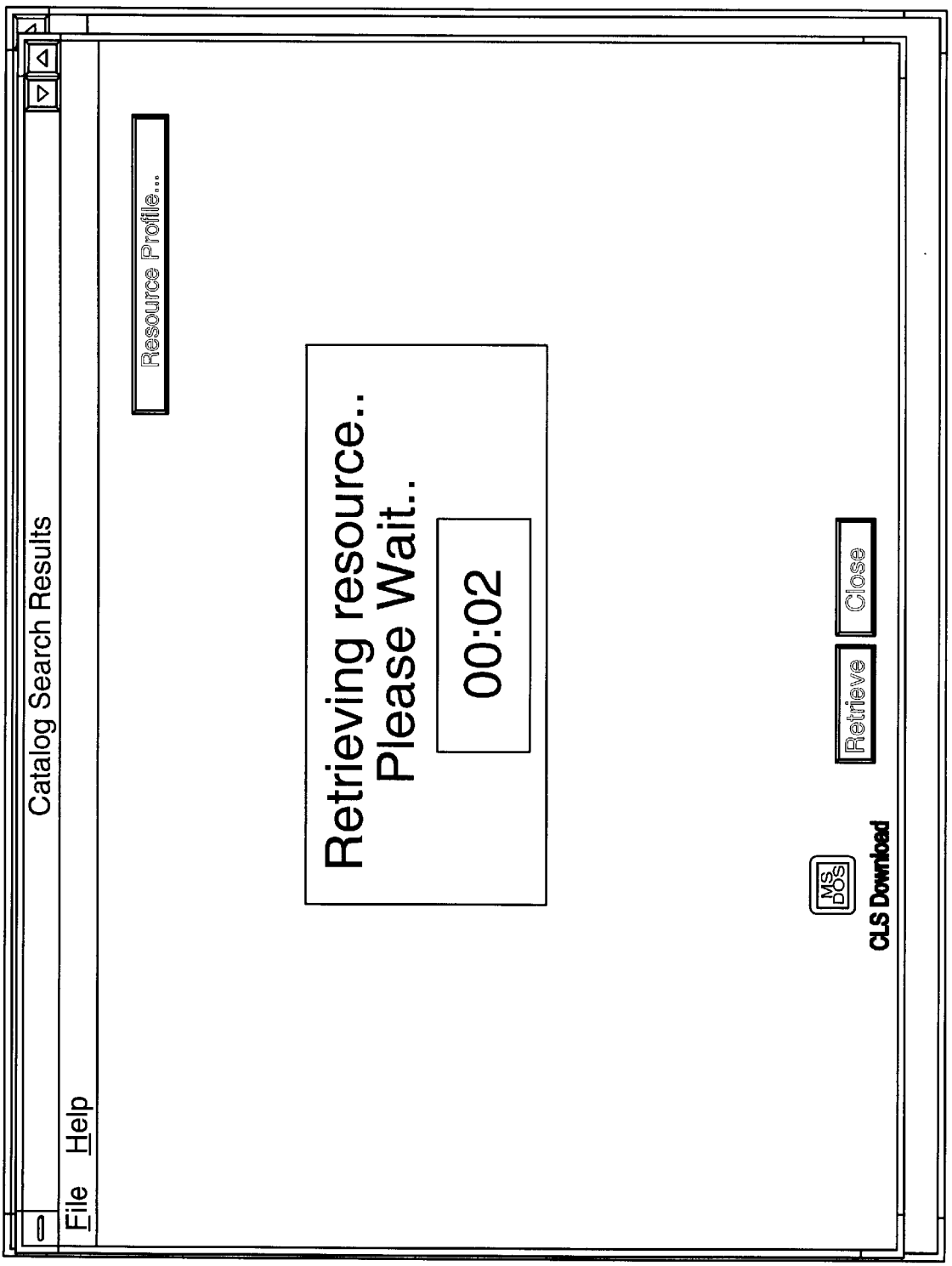
Figure 16:
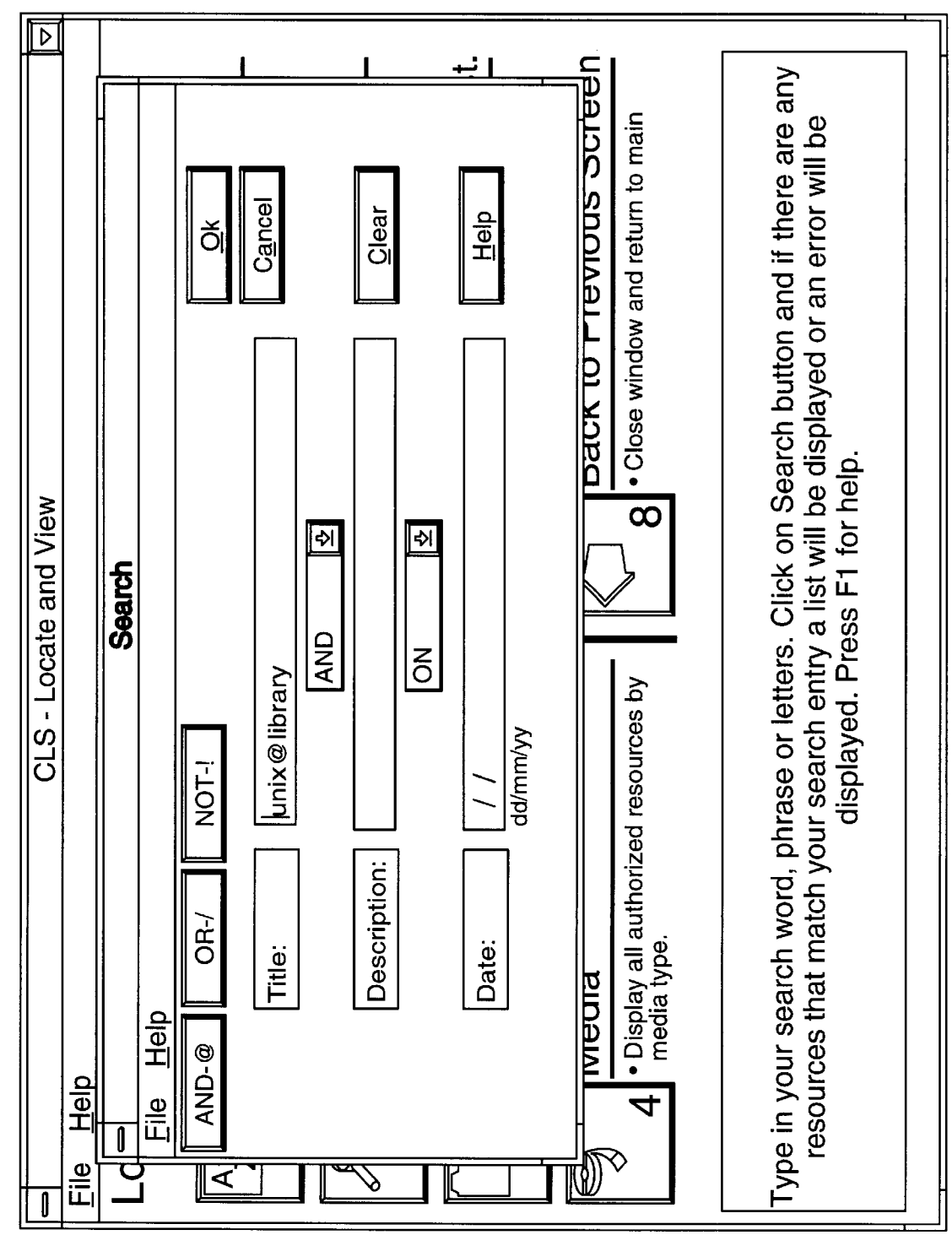
FIGS. 16 and 17 illustrate modification of the search described in FIGS. 9–11.
Figure 17:
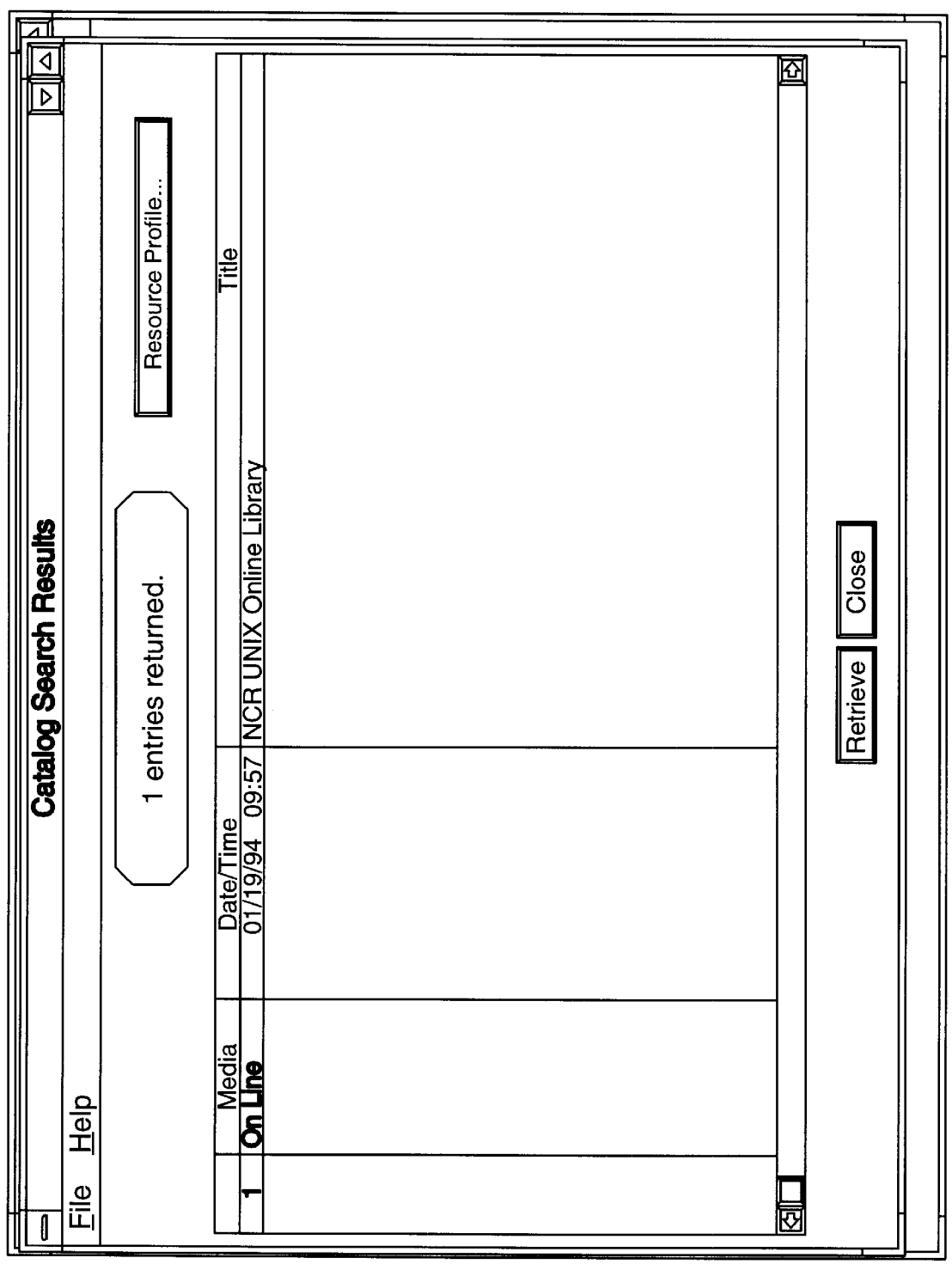

As another searching example, assume that the user orders the search shown in FIG. 16. The user orders that the CLS retrieve all PROFILES having both the word "unix" and the word "library" in their titles. The result of the search is shown in FIG. 17. The result is a single title which, coincidentally, is the same as that selected for downloading as indicated in FIG. 12.

Level 2: Locate and View by Category

Assume that the user is at level 2 within CLS. That is, the user selected option 1 in FIG. 5, which represents Level 1.

Figure 18:
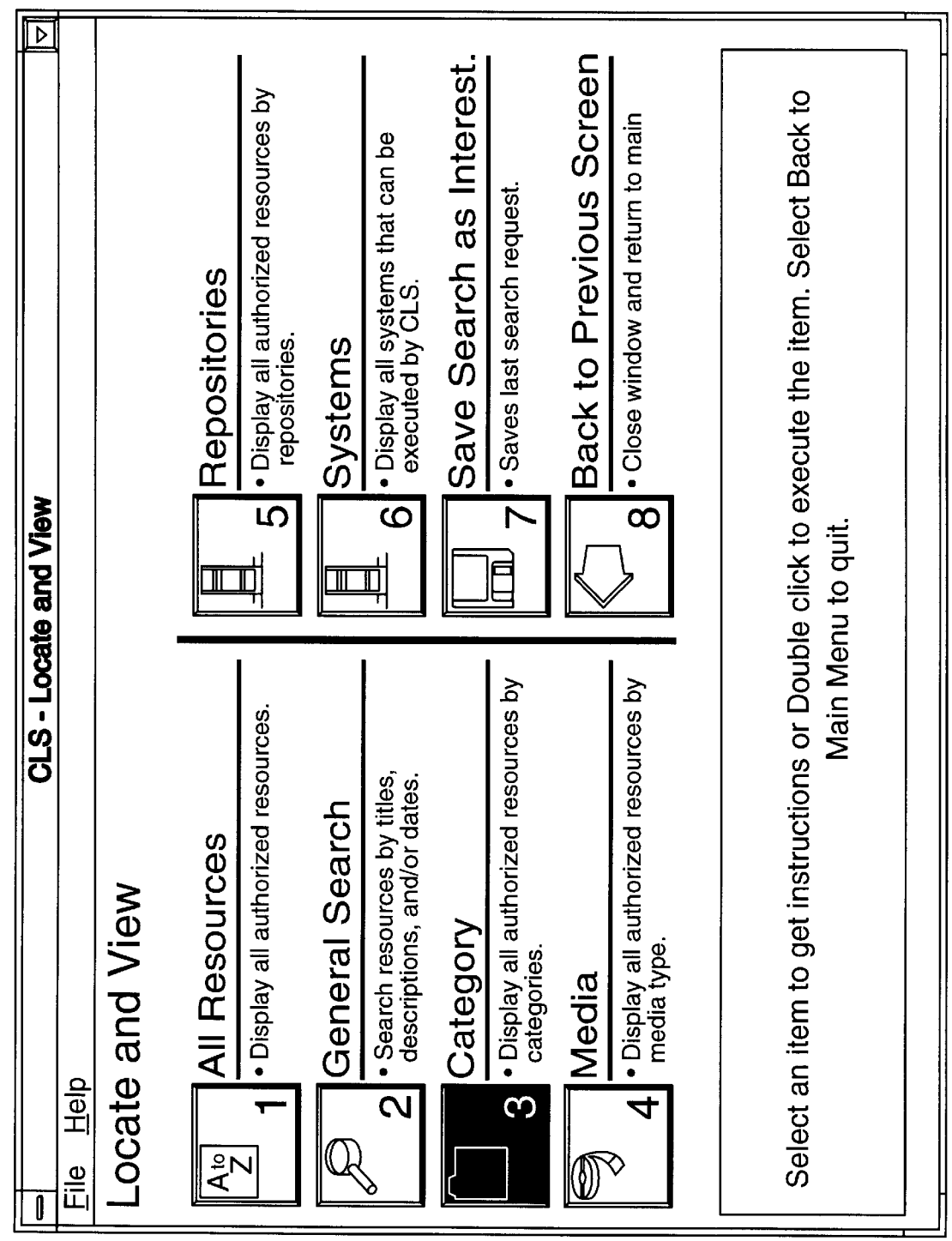
FIGS. 18–24 illustrate locating RESOURCEs based on the category in which the RESOURCEs are classified.

In Level 2, the user wishes to Locate and View by CATEGORY, as indicated by the button actuated in FIG. 18. The CLS responds by presenting a list of the CATEGORIEs of RESOURCEs which are available, as shown in FIG. 19.

This list, in general, includes RESOURCEs from multiple REPOSITORIEs. That is, the list is global in scope, because the REPOSITORIEs are, physically, located at multiple locations throughout the world.

However, the global aspect of the list is transparent to the user: to the user, the list is simply a list of locally available RESOURCEs. The location of the RESOURCEs is not emphasized to the user partly because the location does not affect access: downloadable RESOURCEs are available immediately, while non-DOWNLOADABLE RESOURCEs are available as fast as modern transport can deliver them, typically within one day.

Figure 20:
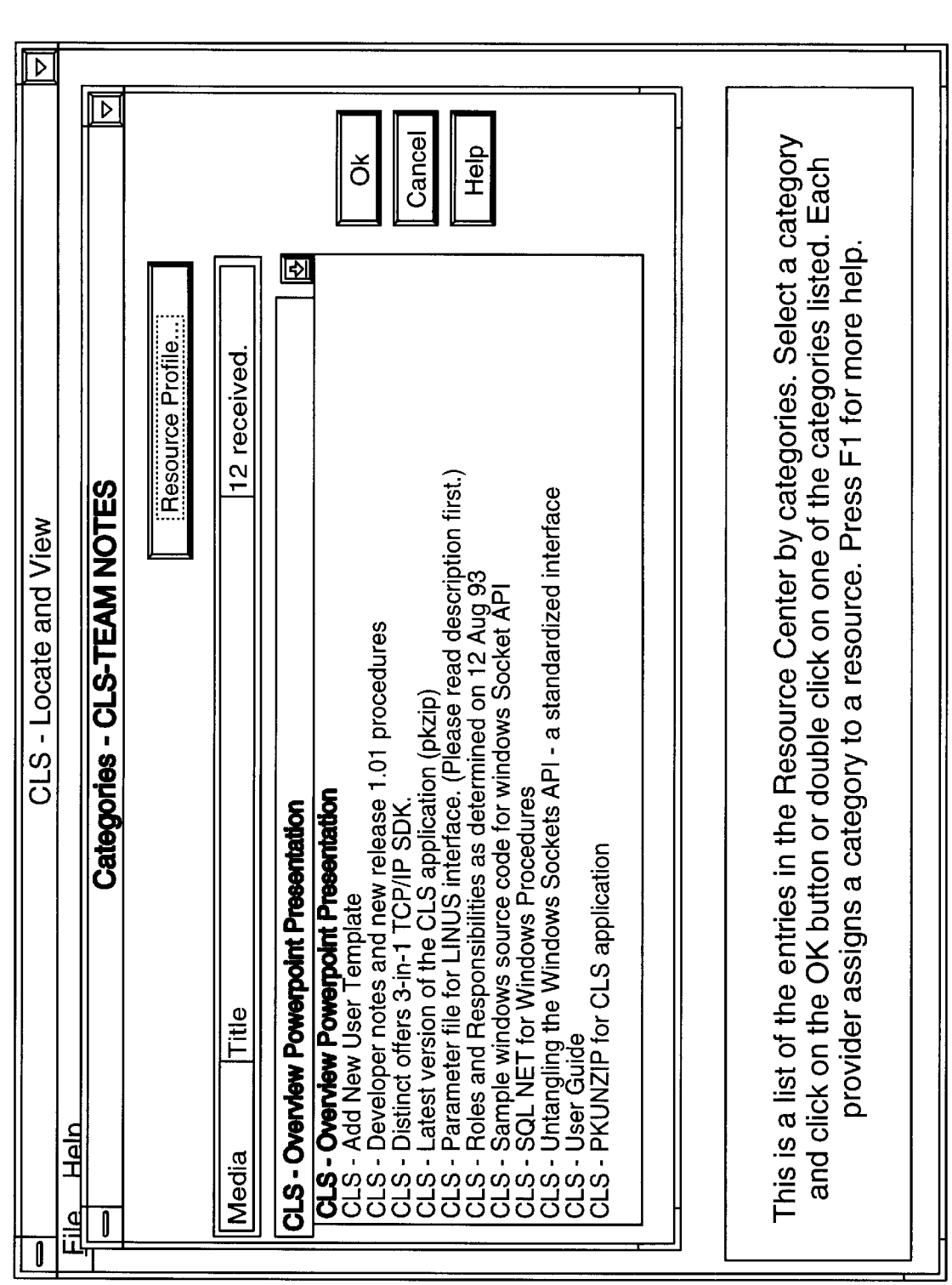
Figure 21:
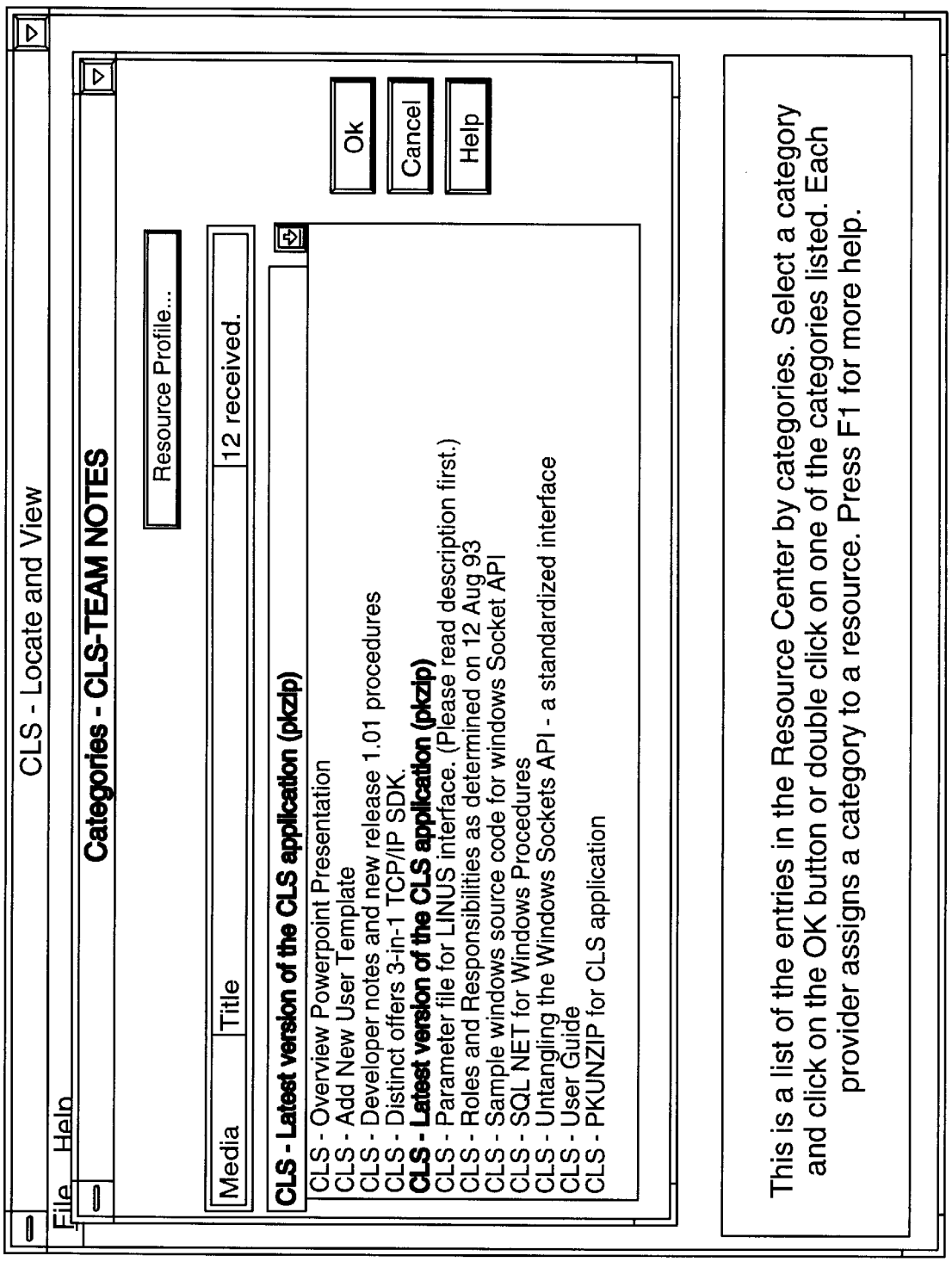

If the user selects a CATEGORY, as indicated by the highlighted CATEGORY "CLS-TEAM NOTES," then the CLS responds by displaying a list of the RESOURCEs contained within the CATEGORY, as shown in FIGS. 20 and 21.

This list is conceptually similar to the list of RESOURCEs shown in FIG. 12. In that Figure, the RESOURCEs listed shared a common feature, namely: they all contained phrases in their PROFILE titles which match a search string issued in FIG. 10. Similarly, in FIG. 20, all RESOURCEs listed share the common feature of residing the same category.

Restated: the RESOURCEs are grouped according to fixed categories, such as those shown in FIG. 19. The RESOURCEs can also be grouped into categories by a search call.

Assume that the user wishes to obtain the RESOURCE which is highlighted in FIG. 21. The user actuates the proper button on the screen, using a mouse, and the CLS retrieves the RESOURCE. In this case, the RESOURCE takes the form of downloadable data, so that the CLS is able to obtain the RESOURCE, by telephone, or other data channel, from the RESOURCE's REPOSITORY.

Figure 22:
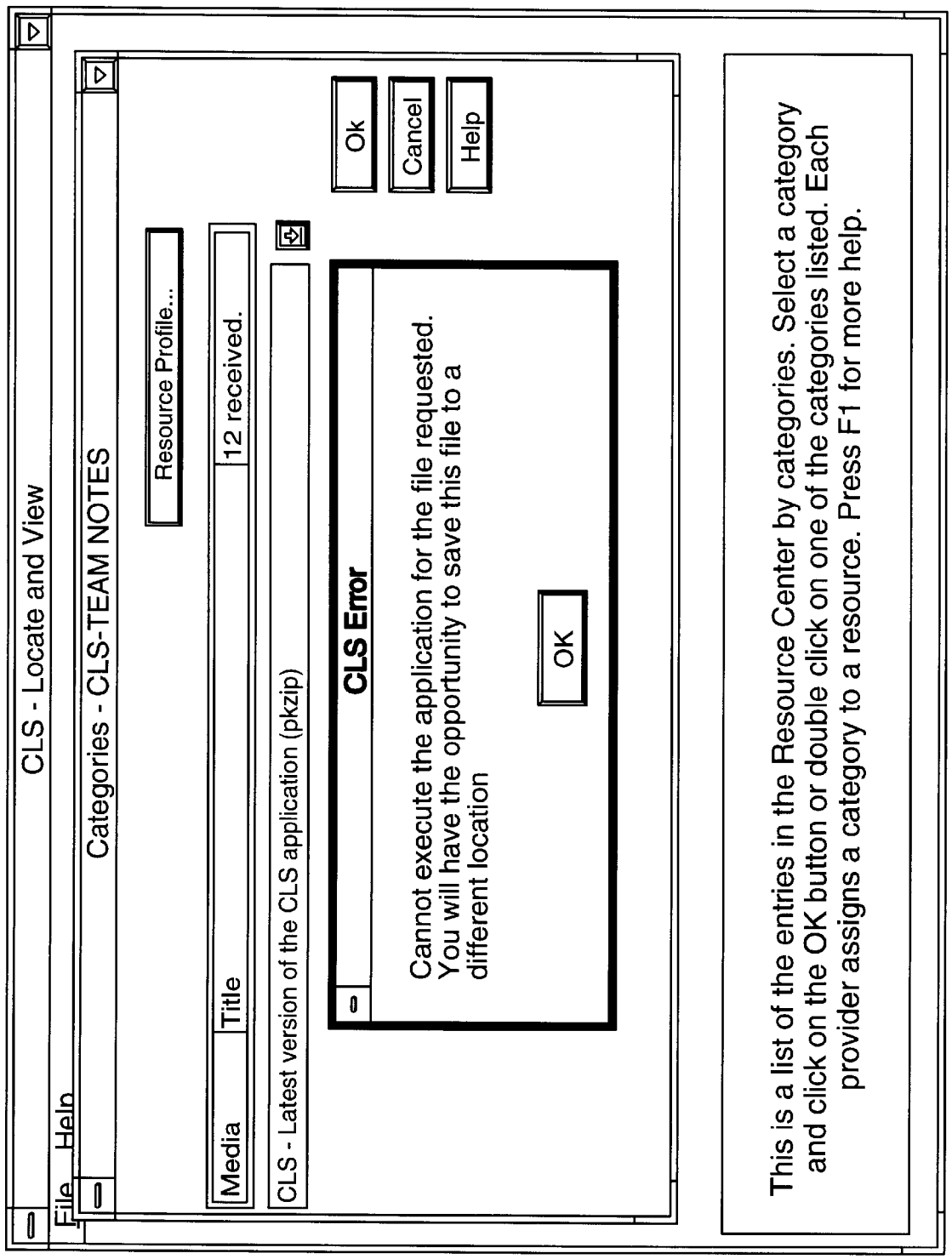

The CLS examines the RESOURCE, in order to ascertain whether a computer program is required to display the resource in its intended manner. In the present example, the CLS found that such a program is required, but also found, in attempting to launch that program, that the program was unavailable, or otherwise unsuitable for displaying the RESOURCE. Thus, the CLS displays the screen shown in FIG. 22.

This screen informs the user that the program is unavailable, and reminds the user that, to save the downloaded RESOURCE, the user must take active steps. Otherwise, the RESOURCE will be lost, and, to be obtained again, must be retrieved from the REPOSITORY.

Figure 23:
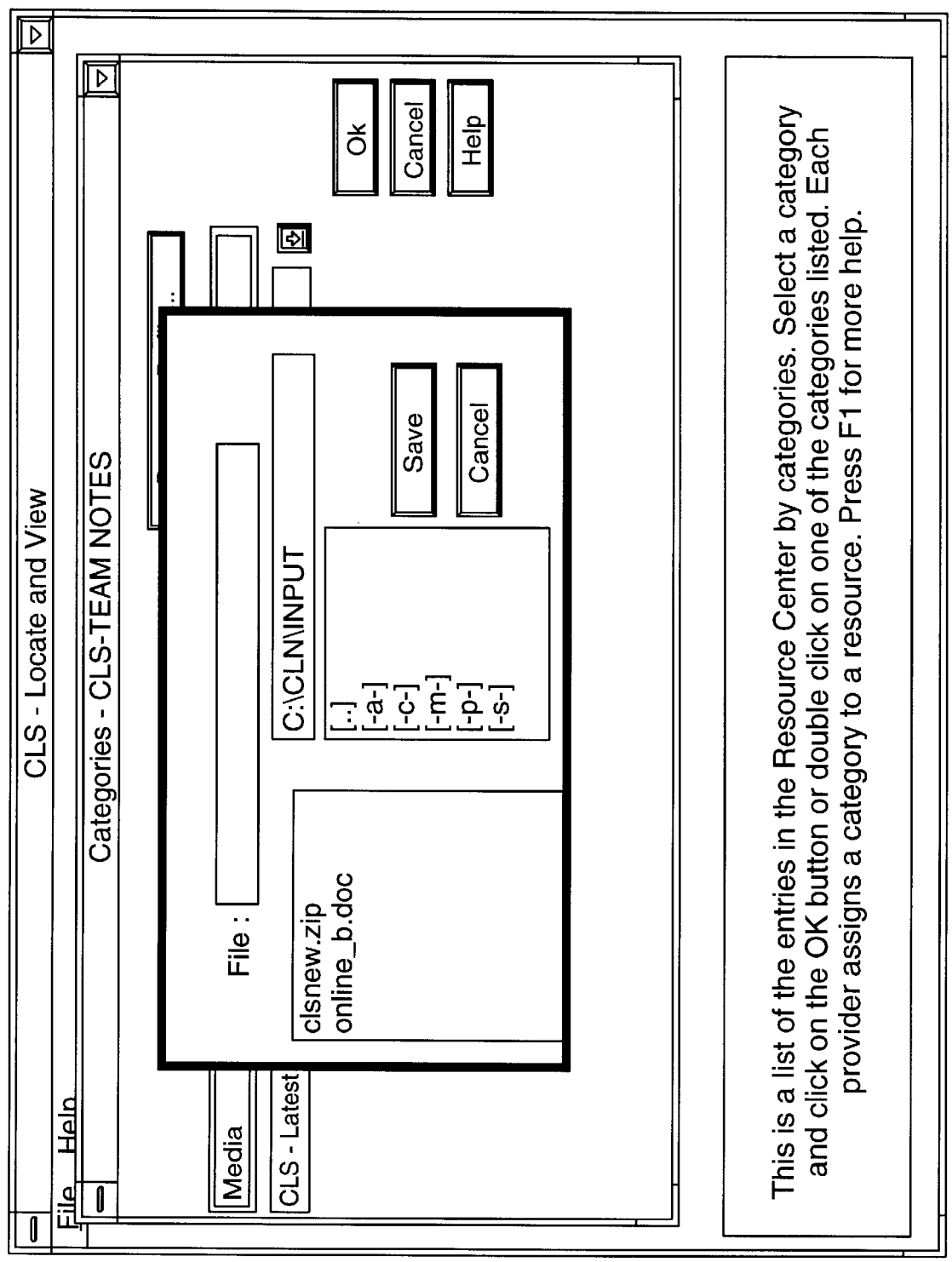
Figure 24:
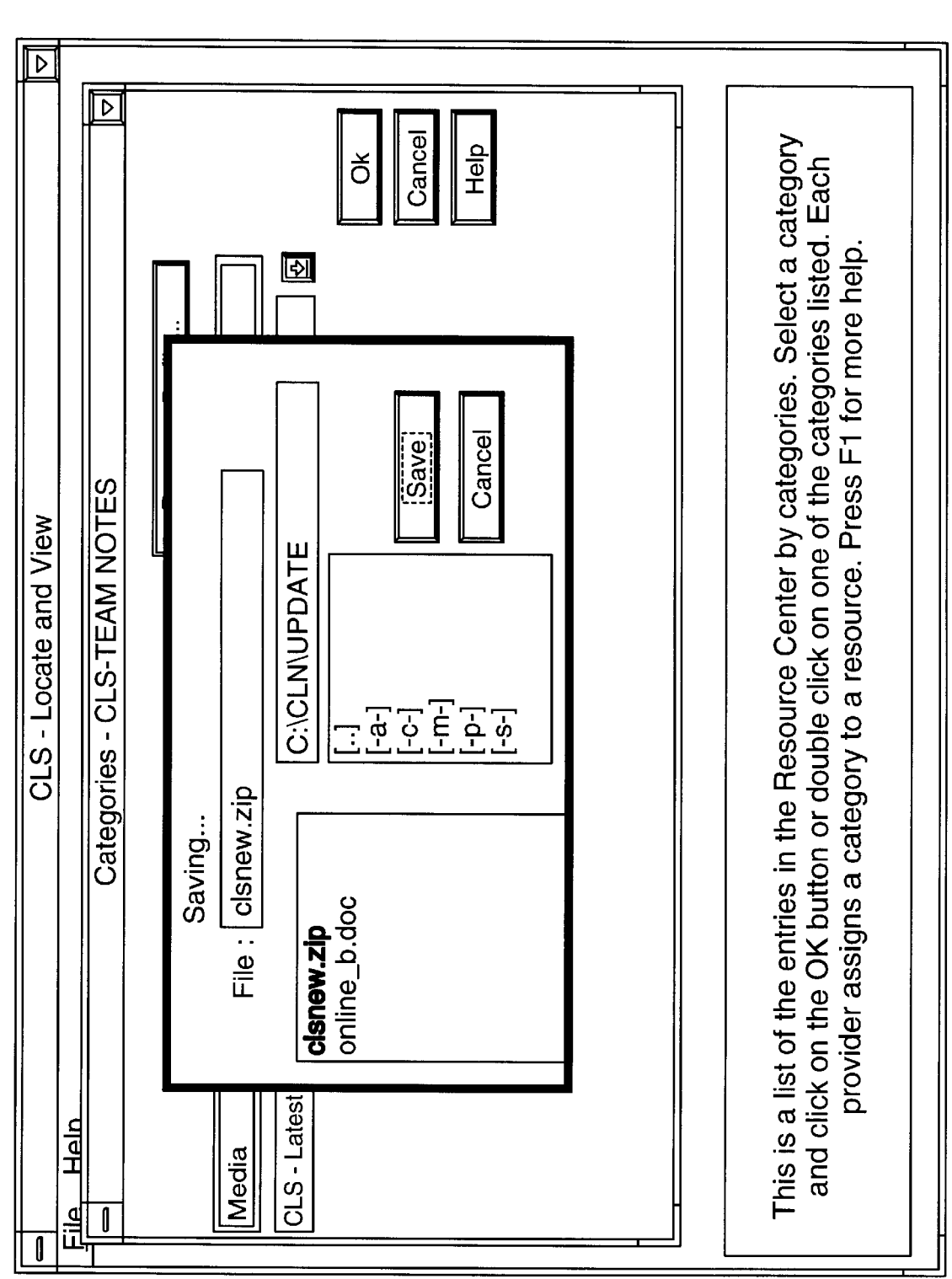

The CLS presents the user with the screen shown in FIGS. 23 and 24, and allows the user to save the RESOURCEs, which in this example take the form of computer files, in the usual manner.

Two examples will illustrate some important points regarding the meaning of "display in the intended manner."

EXAMPLE 1

Generally, word processing programs display their documents in formats which are somewhat unique to each program, and also store their documents in different data formats on floppy diskettes.

For instance, consider text which should be underlined, when printed on paper. One word processing program may display this text, on a computer display, as actually underlined. Another word processing program may instead display this text in a different color from the surrounding, non-underlined text.

Further, the two word processing programs will probably store the document on floppy diskettes as different sequences of bytes. That is, the sequences stored on diskettes contain two (or more) types of data. The first type includes the bytes for the actual text of the document. ASCII codes are commonly used, although other codes exist, such as EBCDIC.

The second type includes formatting codes, which indicate special characteristics of given sections of text, such as the underlining discussed above. Different word processing programs, in general, use different codes to signal different characteristics of the text.

Thus, a given formatting code may have different meanings in different documents created by different word processors. The given code may cause a given piece of text to appear with underlining when displayed on one word processor, yet cause the same text to appear as a different color in another processor.

Further, when some processors display documents generated in another processor, they simply strip out all such codes, and display the document in a predetermined, default format.

The CLS identifies the program which generated the RESOURCE (such as a word processing document) which is retrieved, and attempts to launch the program which generated the RESOURCE, so that the RESOURCE will appear in the same manner as when it was created.

This identification is done not only for word processing documents, but for all RESOURCEs which are retrieved, such as graphics RESOURCEs, spreadsheet RESOURCEs, and so on.

EXAMPLE 2

Multi-media systems display information to a user in several formats, simultaneously. The information can be visual, as on a computer display. The visual information can be static, as a graphic, or sheet of text. The visual information can be dynamic, as in a changing sequence of images, as in video or animation.

The information can also be audible, and played from a speaker.

Conceivably, the information can be tactile. For example, Morse Code can be represented as a sequence of long and short beeps. A proper transducer can make these beeps detectable to the sense of touch, by vibrating a pad which is touched by the fingers. Visually impaired persons may utilize such a transducer.

Another type of tactile information results from the conversion of visual text into Braille text. The conversion is done by an electromechanical device, known in the art, containing a matrix of parallel pins. The device raises the proper pins to display each letter of the visual text in the proper Braille format.

There are numerous other formats of information display. The identification process under discussion examines a RESOURCE which is downloaded, and ascertains whether additional files, information, or data are required to generate a presentation for the user in the format intended by the RESOURCE.

The invention locates the necessary files and information, and launches the proper computer programs necessary for communication with the user, in the manner intended by the RESOURCE.

Alternate Procedures

It is possible to establish a procedure for running a suitable alternative program, for displaying a RESOURCE, when a given program is not available. For example, if a RESOURCE requires a particular word processing program, and if that program is unavailable when the RESOURCE is downloaded, then the CLS can be programmed to run another program, such as an earlier version of the given program, or another program entirely.

A variation of launching the program can be taken with RESOURCEs which take the form of compressed data files. For example, the suffix ".zip" is commonly attached to files which are in compressed format, and require de-compression for use. When the CLS examines the file, it will see the suffix, and launch the proper de-compression program to unpack the file. Then, after unpacking, the CLS again examines the file to ascertain the program which will display the file in its intended manner.

Level 2: Locate and View, Media

Assume that the user is at level 2 within the CLS. That is, the user selected option 1 in FIG. 5, which represents Level 1, and advanced to Level 2.

Figure 25:
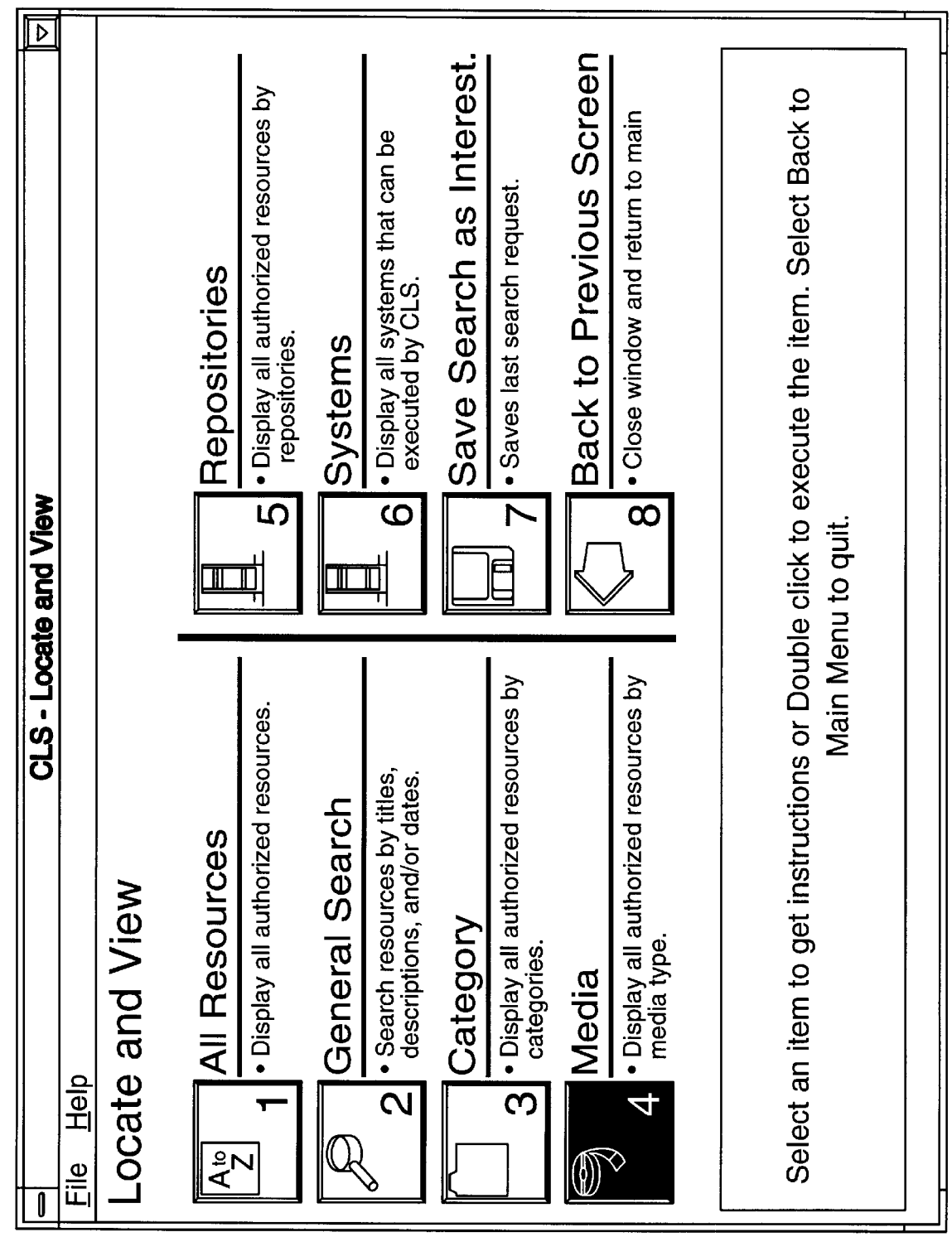
FIGS. 25–28 illustrate locating RESOURCEs based on the media upon which the RESOURCEs are stored.

In Level 2, the user wishes to Locate and View RESOURCEs by MEDIA type, as indicated by the button actuated in FIG. 25. The CLS responds by presenting a list of the different types of MEDIA on which RESOURCEs are stored, as shown in FIG. 26.

Assume that a user wishes to view a list of all RESOURCEs taking the form of video MEDIA (eg, videotape cassettes on VHS or Beta format, and one-inch or two-inch reel tape). The user highlights the "Video" entry, as in FIG. 27, and the CLS responds with a list of all RESOURCEs stored in video format, as indicated in FIG. 28.

As the screen indicates, the user can select a RESOURCE, and then view the PROFILE associated with that RESOURCE. In addition, the user can retrieve the RESOURCE.

If the RESOURCE takes the form of down-loadable data, then the RESOURCE is downloaded in the usual manner. However, in the case of video MEDIA, the REPOSITORY holding the RESOURCE may not possess equipment capable of downloading the video by a data link to the user. (That is, the MEDIA may take the form of a videocassette tape. Data stored on such tape can be analog data, rather than digital data. Analog data is not directly downloadable.)

In this case, the CLS informs the user of the inability to download, and inquires whether the user wishes to request that the RESOURCE be physically delivered to the user. If so, the CLS notifies the REPOSITORY holding the RESOURCE of the user's request. This notification takes the form of a message sent to the ADMINISTRATOR of the REPOSITORY in question, using the CLS. Alternately, the notification can take the form of the CLS sending a message by a commercially available electronic mail service. Sometimes, for added reliability, both types of notification can be undertaken.

It is possible to add the following feature to the CLS. When a user places an order for retrieval of a physical object, such as the video tape in the present example, the CLS, in addition to notifying the REPOSITORY of the request, also notifies a transportation agent.

For example, if both the user and the REPOSITORY are affiliated with the same business organization, the CLS can notify the organization's mail service that the REPOSITORY will soon have a parcel ready for delivery. The mail service takes the appropriate steps to pick up the parcel.

In addition, the CLS can be arranged such that the PROFILEs of RESOURCEs which are non-downloadable contain relevant shipment information, such as a notation that the RESOURCE is especially delicate, large, or heavy. When a user requests physical delivery of a RESOURCE, the CLS examines the PROFILE, learns whether relevant shipment information exists, and forewarns the transportation agent of the information.

For example, when the CLS informs the mail service that a parcel (the video tape) will be awaiting retrieval at the REPOSITORY, the CLS also informs the mail service of the size of the parcel (very small) so that the mail service knows whether special preparations are required for the pick-up.

As an alternative to notifying an internal mail service, the CLS may notify a public, common carrier, of the impending shipment, and request that carrier to pick up the parcel. This notification can be accomplished by using commercially available electronic mail services.

Figure 96:
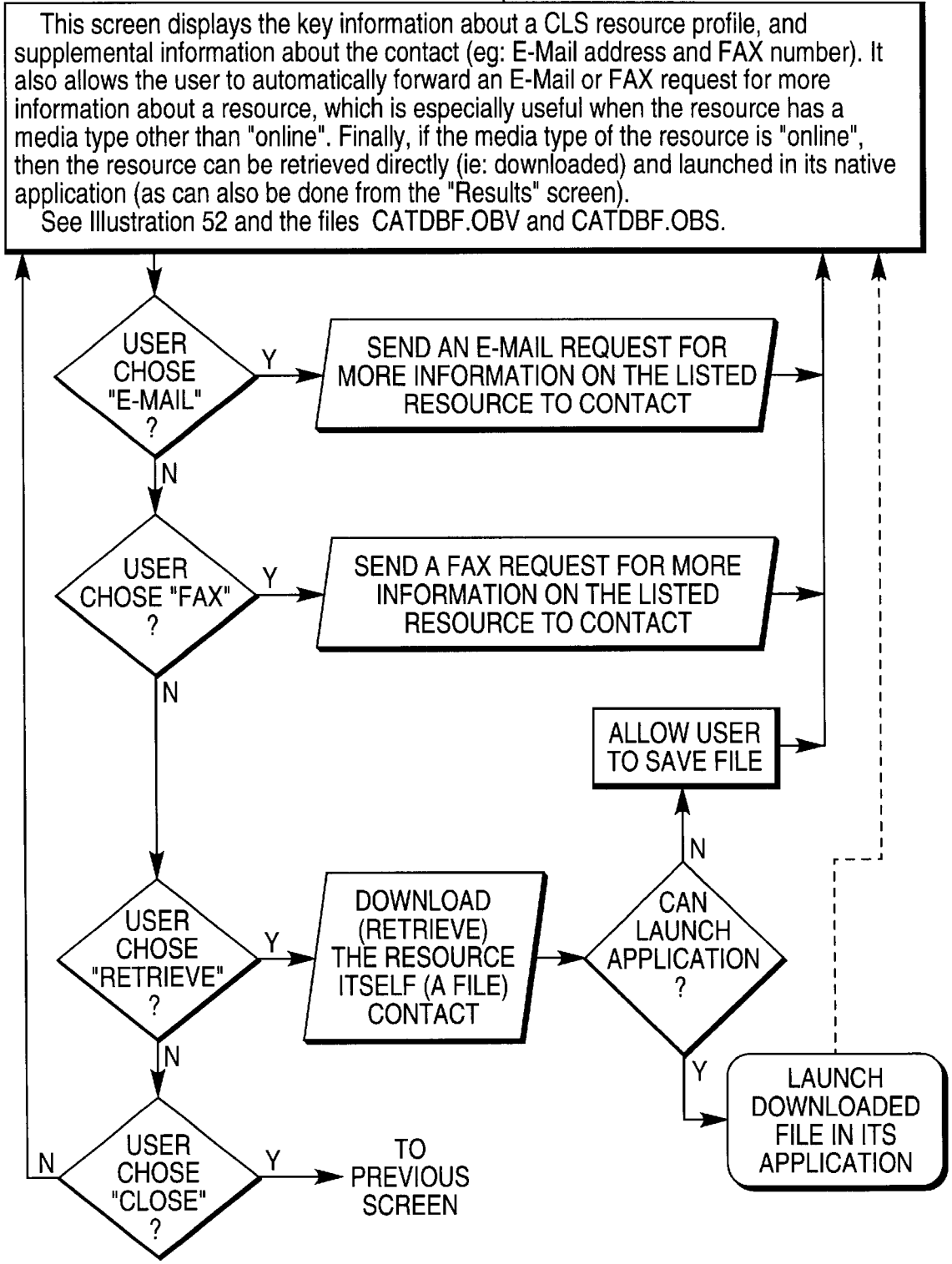

As another alternate, as FIG. 96 indicates, the user may choose that a facsimile message (or FAX) be sent, requesting order of the RESOURCE. One implementation of this FAXing capability requires that the LOCAL SERVER, or the user's PC, be equipped with a facsimile modem, which are known in the art. The content of the FAX is a predetermined "form" letter, to which CLS adds the identify of the RESOURCE, plus other ordering information required by the custodian of the RESOURCE.

Classification of RESOURCEs

RESOURCEs can be classified as "physical," as physical objects, such as flex diskettes, videotapes, etc., or "soft," as in computer-downloadable RESOURCEs, such as software.

When a user orders a "physical" RESOURCE, a message, as discussed above, is sent to the custodian of the RESOURCE, requesting delivery. When a user orders a "soft" RESOURCE, the RESOURCE is downloaded to the user directly.

Features of Display of FIG. 26

FIG. 26 displays a list of RESOURCEs, containing both "soft" and "physical" RESOURCEs. The "On Line" entry contains soft RESOURCEs, while most of the remainder are physical RESOURCEs.

When the user orders one of the physical RESOURCEs, the information which CLS transmits to the custodian of the RESOURCE is in a format which facilitates automatic order-filling by the custodian, if the custodian is so equipped.

For example, a common electronic mail message will contain the ordering user's name and address. This information is in an electronic format which is easy to assimilate into custodian's inventory management, or product ordering. That is, the information is contained within a data file which the custodian can retrieve into the system which handles the custodian's order entry system. The custodian can manually transfer the ordering information (such purchaser's name and address) to the files used in filling orders. Alternately, the custodian can be equipped with a computer program which searches the electronic mail message for ordering information, and automatically loads the information into the custodian's order-filling software system. An example will illustrate.

Assume that the electronic mail message contains the following text:

Item ordered: Stock number ABC 123

Purchaser: John Blank

Address: 4343 Oak Terrace, Dayton, Ohio 45479

How to Bill: (Credit Card or Internal or Send Bill)

Credit Card Number: 1111 2222 3333 4444

The custodian's program searches the text for the phrase "Item ordered." When the program finds this text, it then searches the subsequent text for the stock number to be ordered, and copies the stock number to the order-filling file.

The program copies the rest of the information to the order-filling file in a similar manner. (The "How to Bill" phrase is followed by three possibilities. The ordering person selects one of these, as by entering a numeral "1", "2", or "3". The custodian's program detects the selection, and sets into motion the proper billing action.

Different custodians, in general, will require different items of information. Once the items are known, and the message format is established by the ADMINISTRATOR, the message which CLS sends to the custodians will contain all information which is necessary for completion of a normal business transaction, resulting in transfer of the ordered RESOURCE. And, as described above, the message can automatically trigger initiation of the ordering process.

Locate and View, by REPOSITORIEs

Assume that the user is at level 2 within the CLS. That is, the user selected option 1 in FIG. 5, which represents Level 1.

Figure 29:
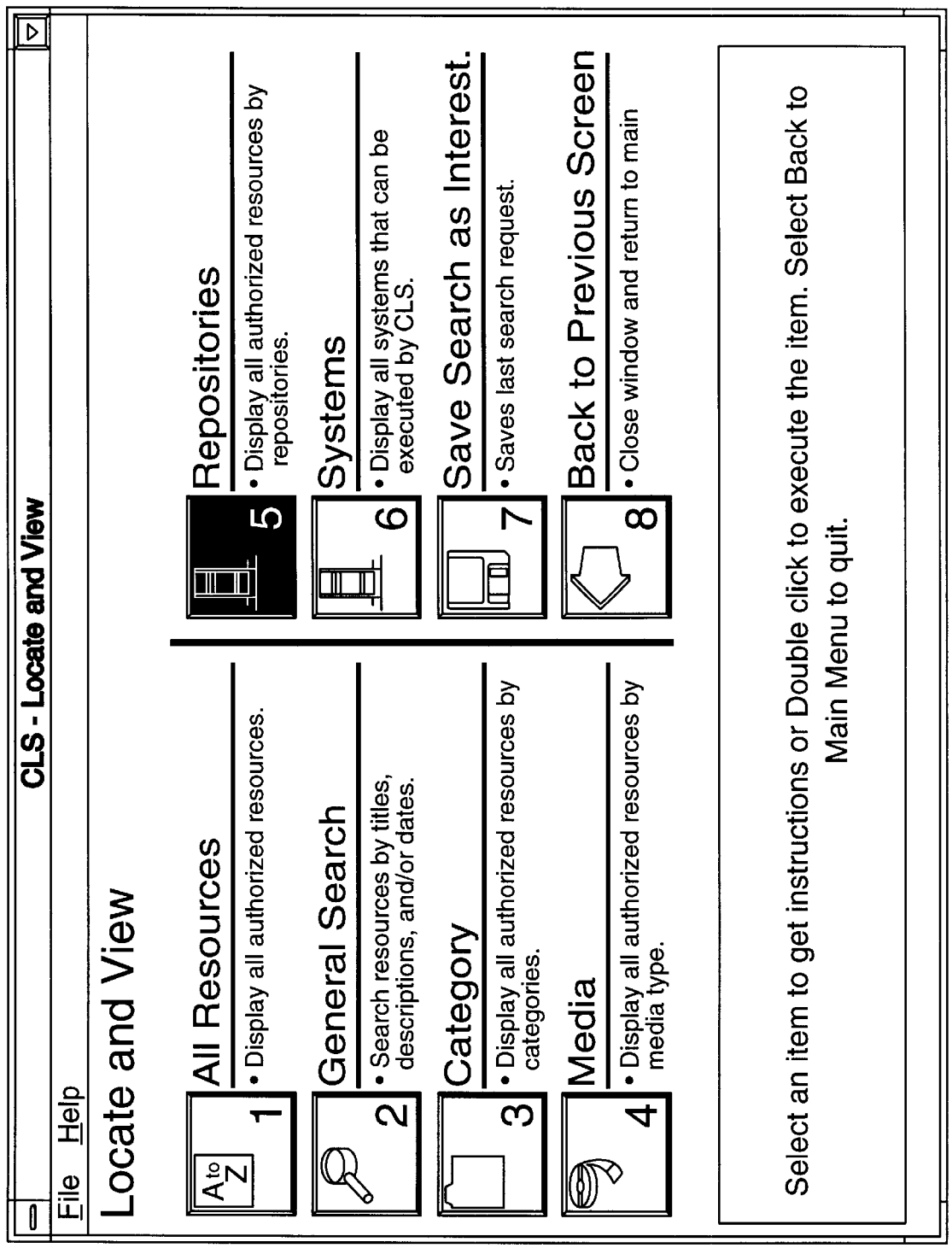
FIGS. 29–32 illustrate locating RESOURCEs based on the REPOSITORIEs in which the RESOURCEs are stored.
Figure 30:
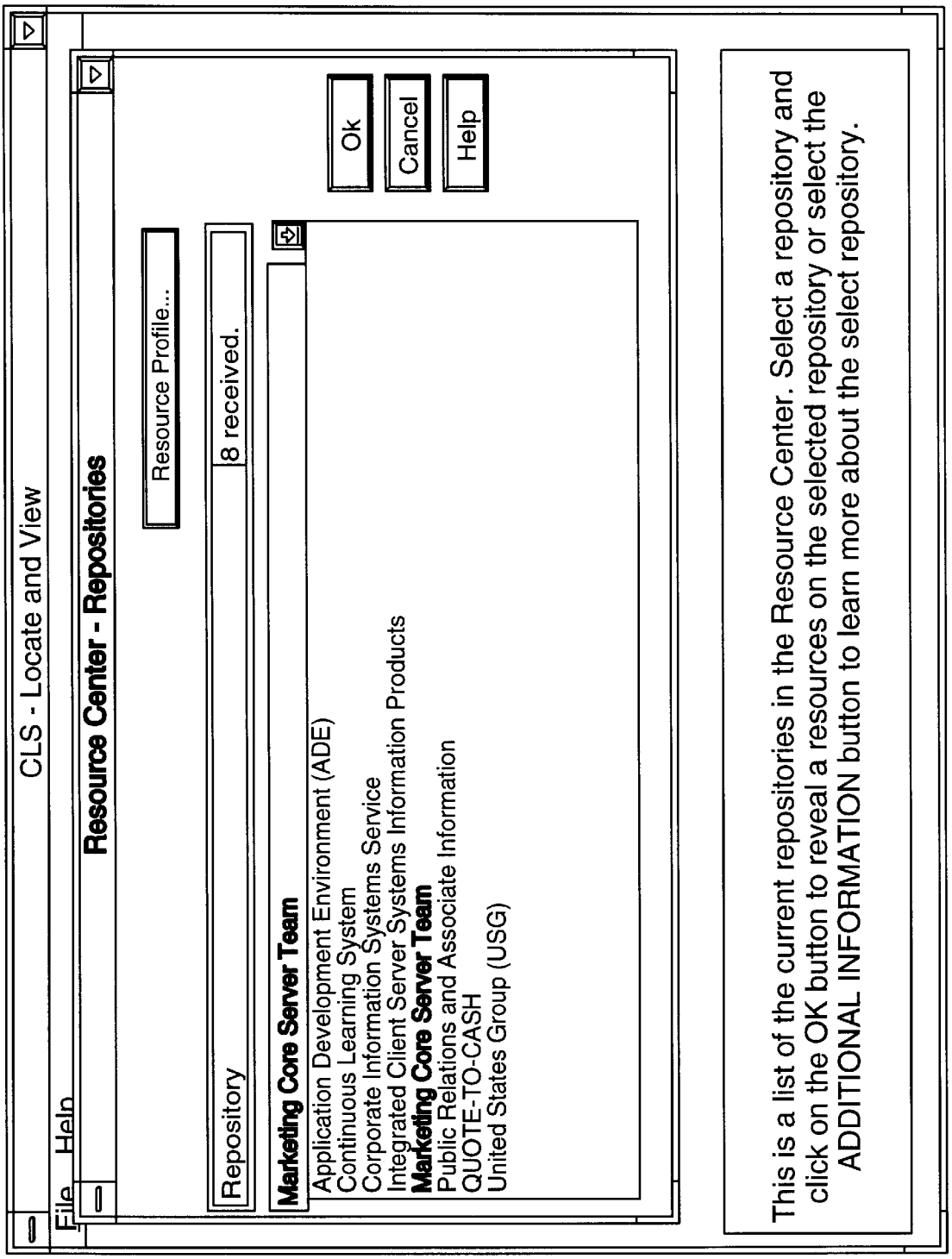

In Level 2, the user now wishes to Locate and View by REPOSITORY, as indicated by the button actuated in FIG. 29. In response, the CLS displays all REPOSITORIEs holding RESOURCEs, as indicated in FIG. 30. Assume that the user selects the REPOSITORY "Marketing Core Server Team," as indicated by the highlighted entry in the Figure.

Figure 31:
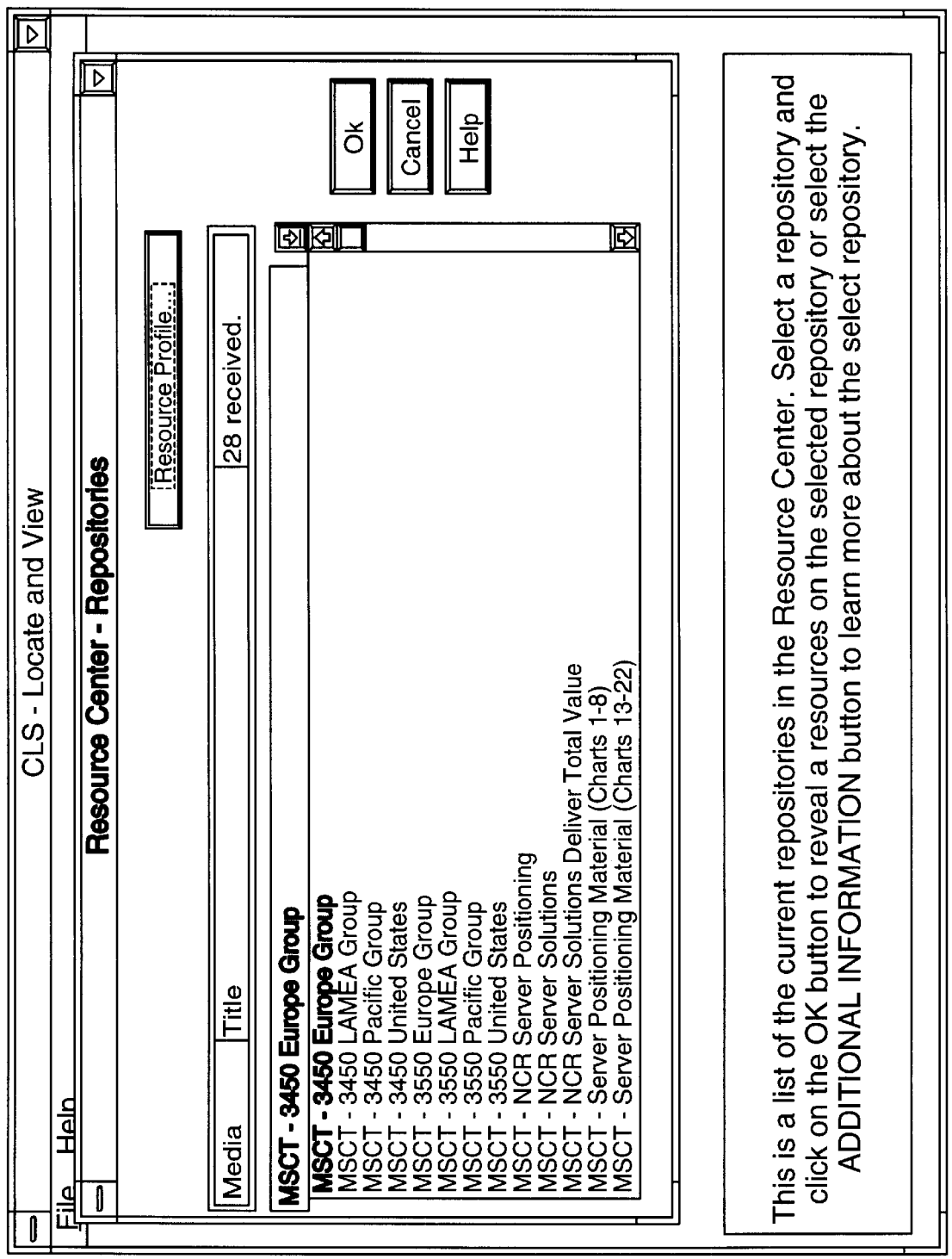
Figure 32:
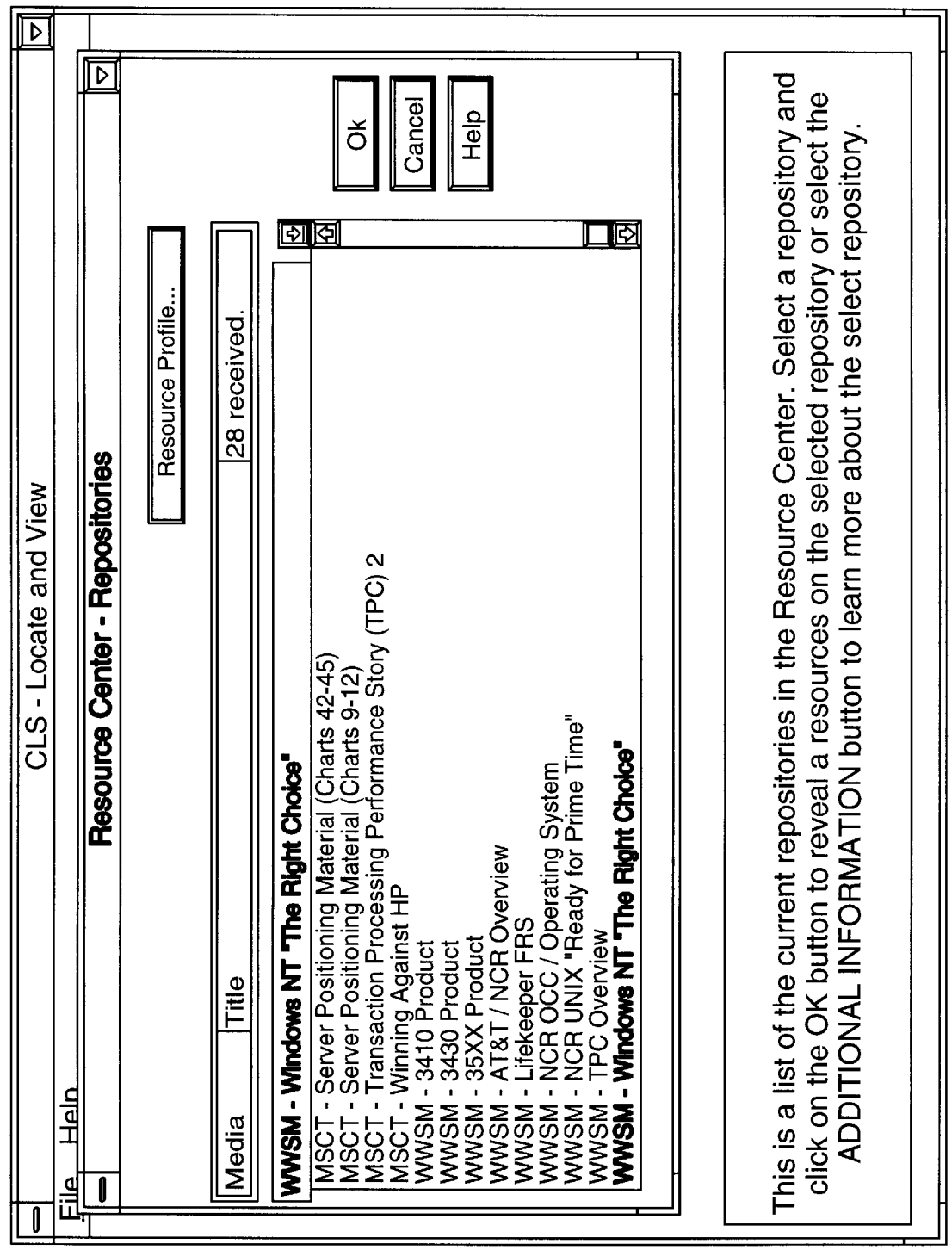

In response, the CLS displays the RESOURCEs held by the selected REPOSITORY, as indicated in FIGS. 31 and 32. Assume that the user selects the RESOURCE entitled "Windows NT 'The Right Choice'", as indicated by the highlighted entry in FIG. 32.

In response, the CLS retrieves the RESOURCE and examines (as explained above) the RESOURCE to ascertain which, if any, program is required to display the RESOURCE. This particular RESOURCE requires the program entitled "Powerpoint," available from Microsoft Corporation, as indicated by the suffix ".PPT" contained in the name of the RESOURCE.

Figure 33:
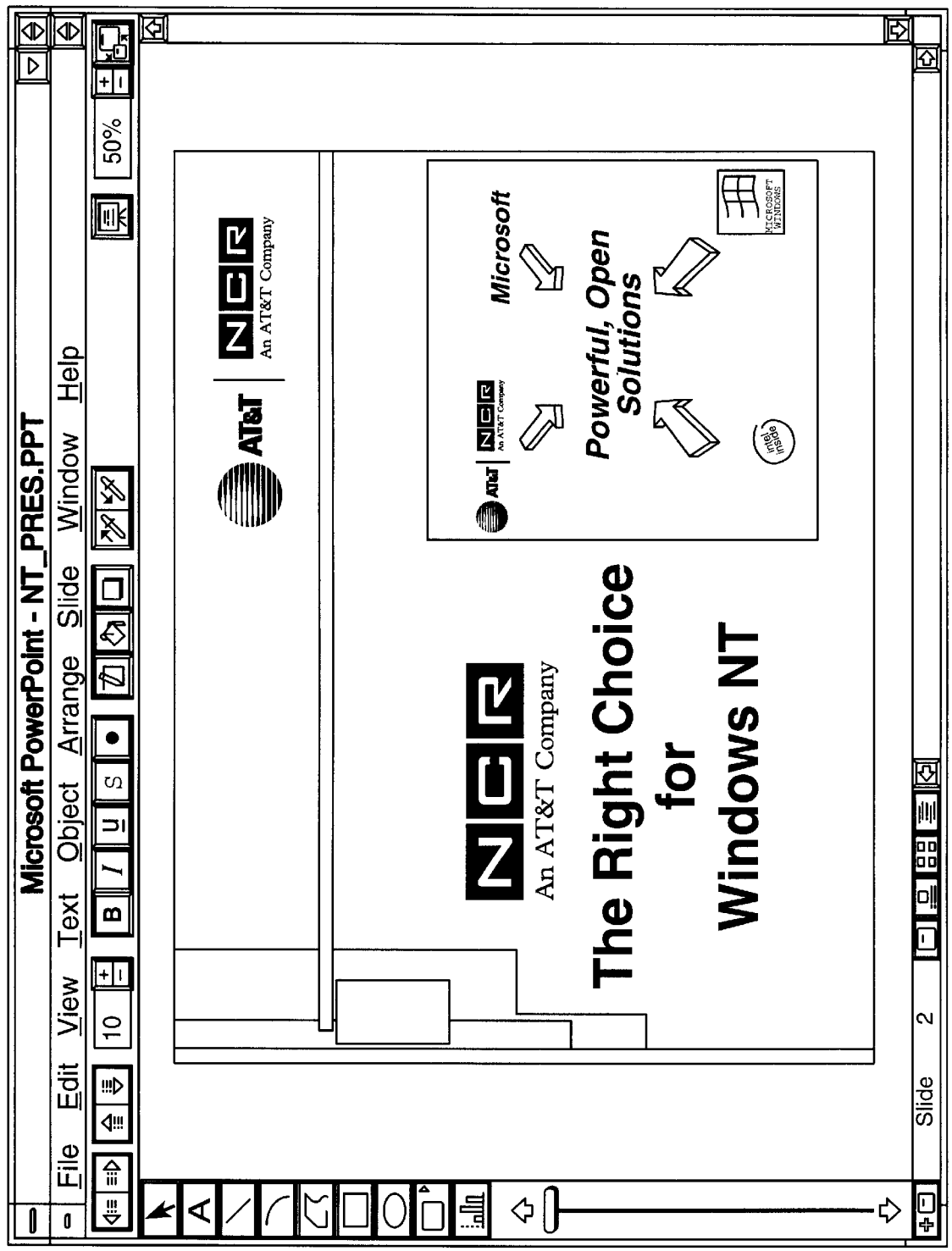
FIG. 33 illustrates retrieval of the RESOURCE identified in FIG. 32.

The CLS launches the Powerpoint program, and loads the RESOURCE into the program, thereby displaying the RESOURCE in its intended format, as indicated in FIG. 33.

Locate and View, by SYSTEMs

Assume that the user is at level 2 within the CLS. That is, the user selected option 1 in FIG. 5, which represents Level 1.

Figure 34:
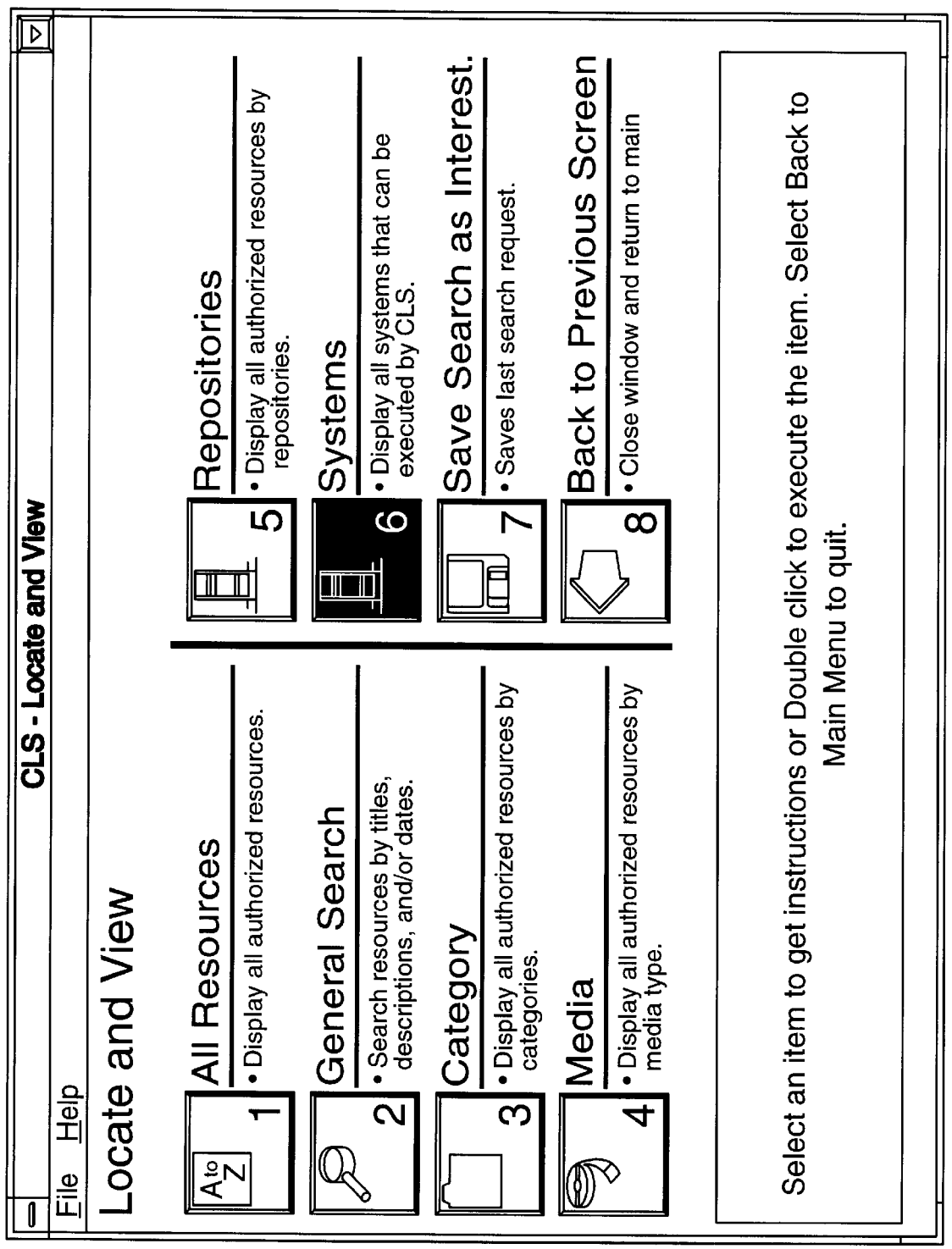
FIGS. 34–37 illustrate other SYSTEMs to which the invention allows a user to gain access.
Figure 35:
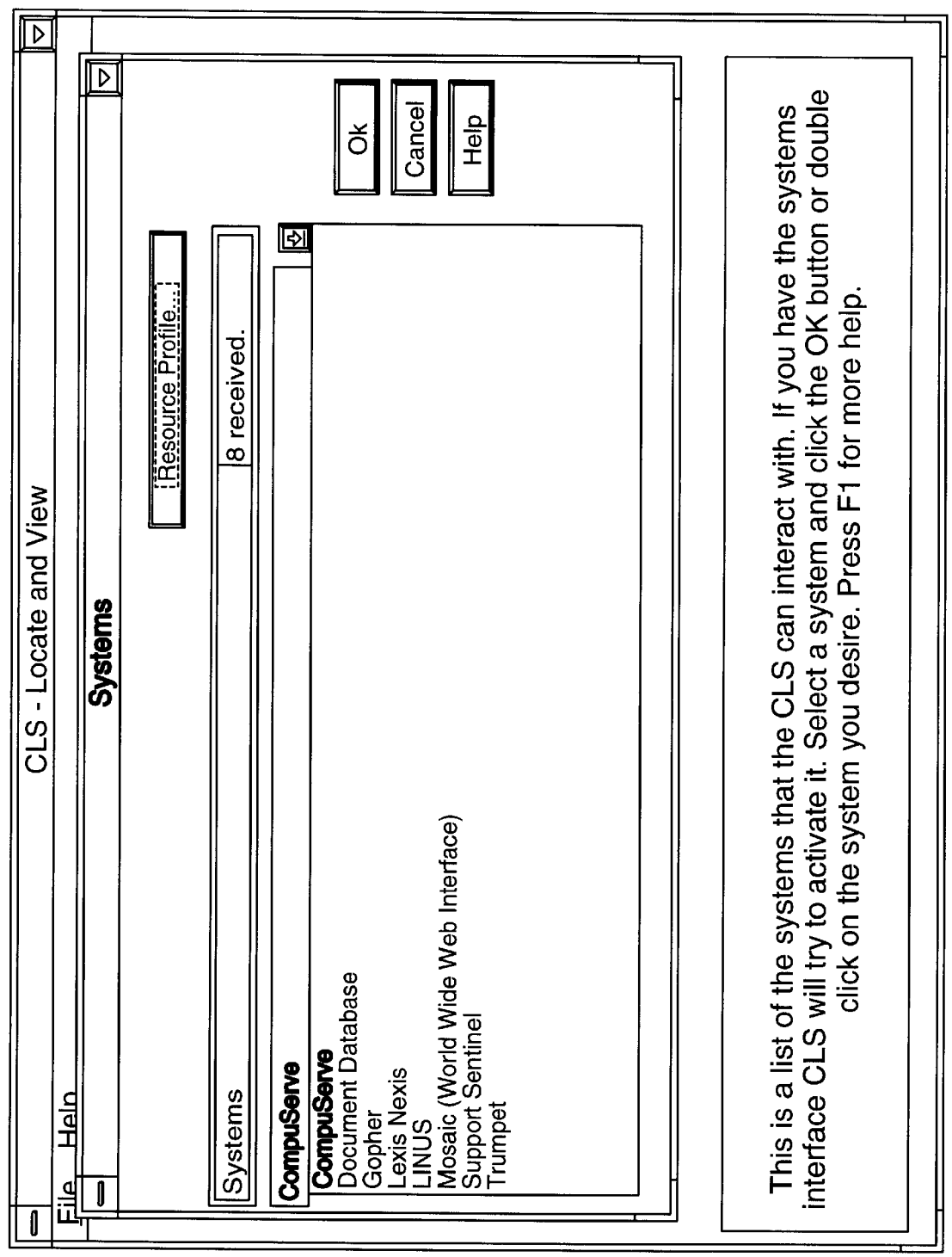

In Level 2, the user now wishes to Locate and View by SYSTEMs, as indicated by the button actuated in FIG. 34. In response, the CLS provides a list of systems which are available to the user, as shown in FIG. 35.

The term "system" refers to organizations which maintain collections of information, such as stock market reports, newspapers, magazines, and so on, which are downloadable to a user. Three exemplary SYSTEMs were identified above.

Figure 36:
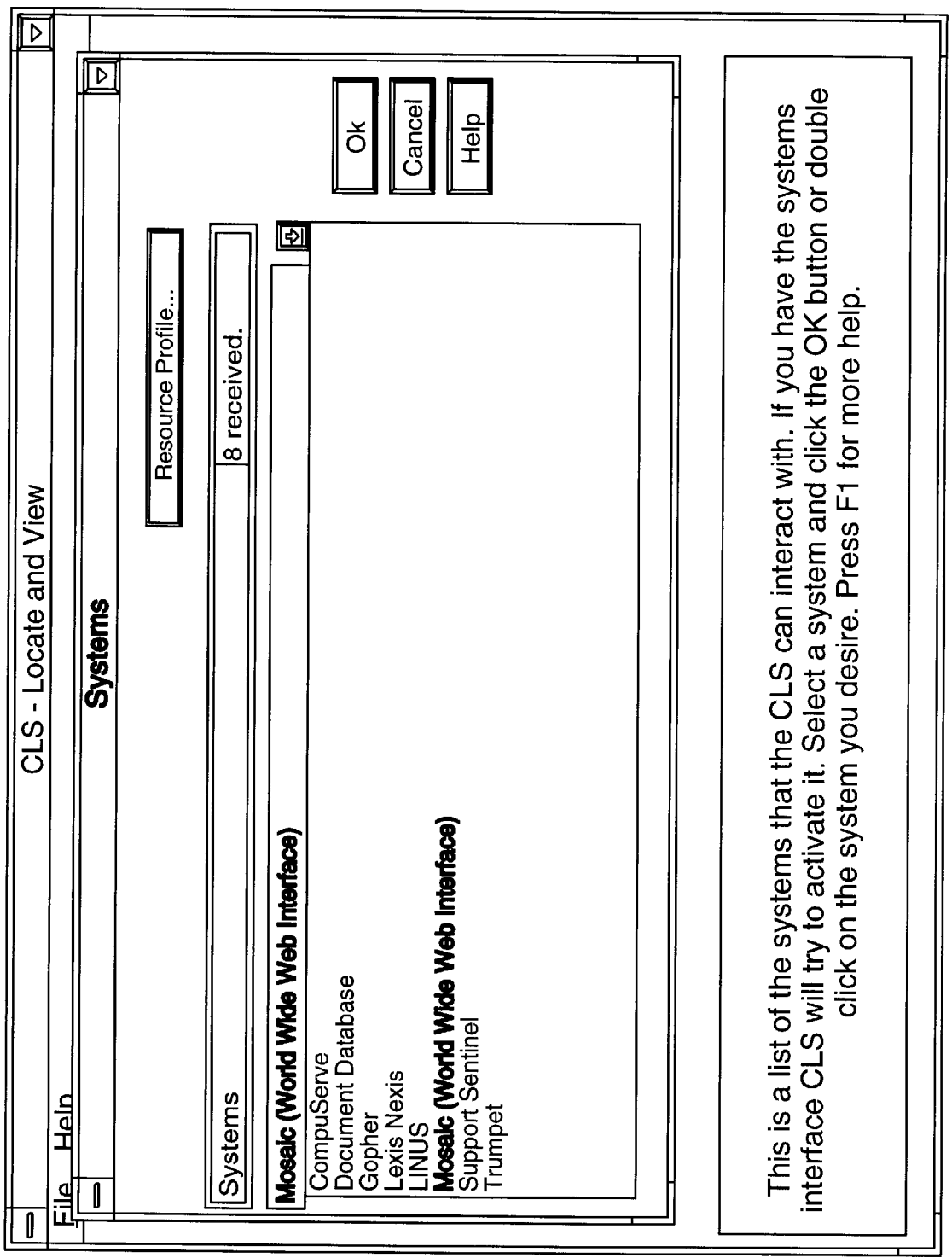
Figure 37:
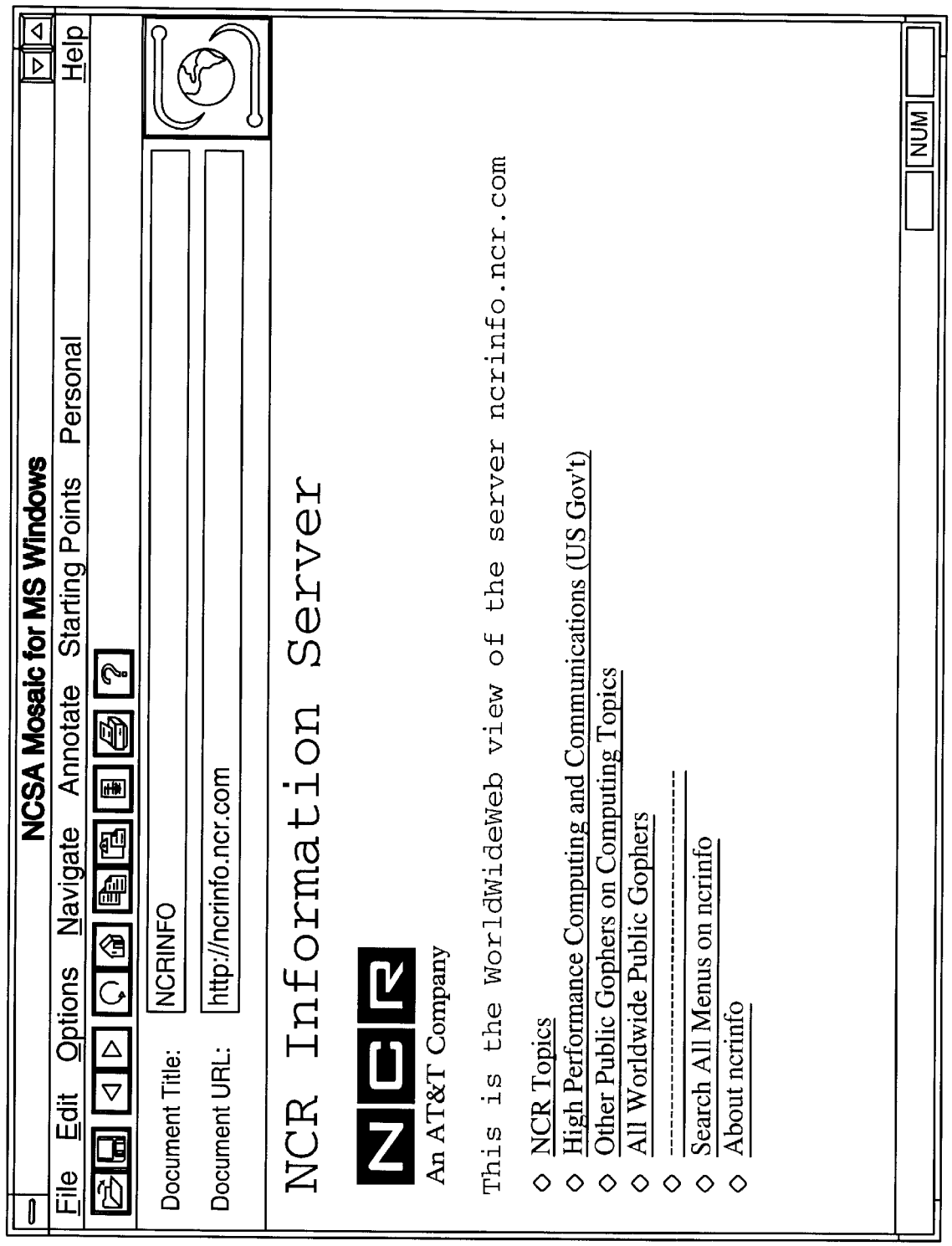

When the user selects a SYSTEM, as indicated in FIG. 36, the CLS connects the user with that SYSTEM. The user obtains access to the system, and obtains the same use of the system as if the user had connected to the system outside the CLS. When the connection is made with a SYSTEM, the CLS displays an appropriate screen, such as that shown in FIG. 37.

Adding a RESOURCE to a REPOSITORY

Figure 38:
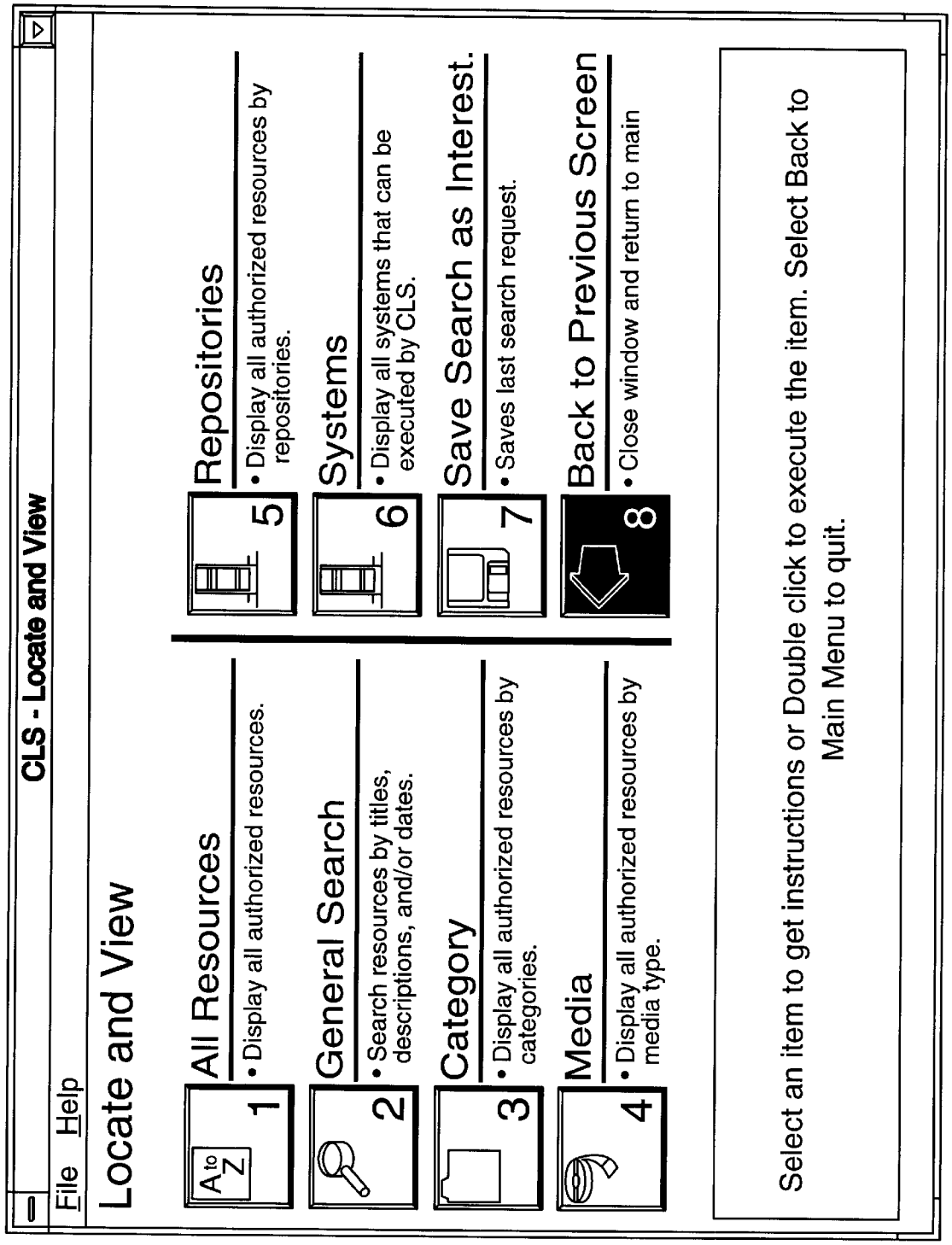
FIGS. 38 and 39 illustrate returning to Level 1.
Figure 39:
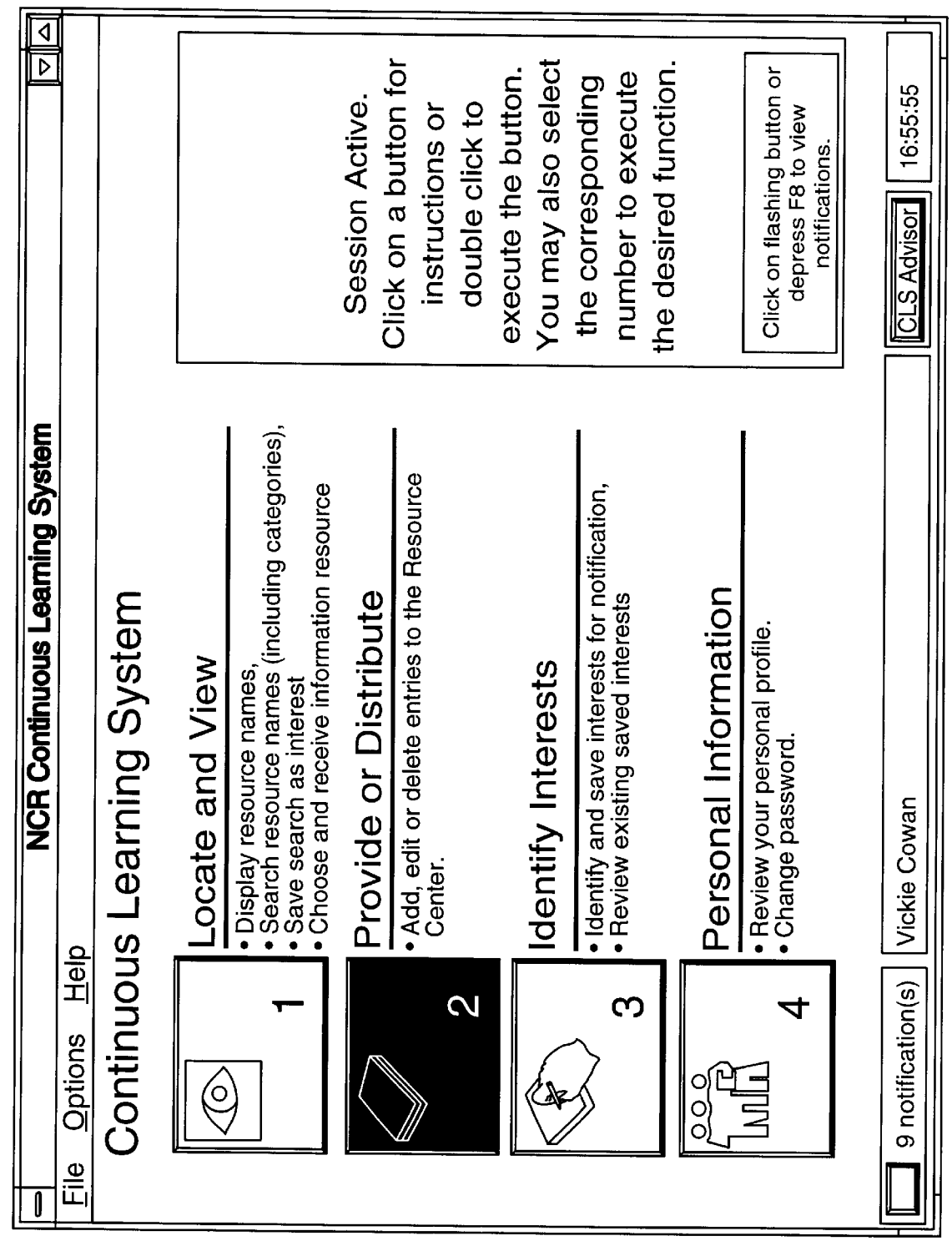

The user can return to Level 1 by actuating the button shown in FIG. 38, which causes the screen shown in FIG. 39 to be displayed. The CLS has returned the user to Level 1.

Figure 40:
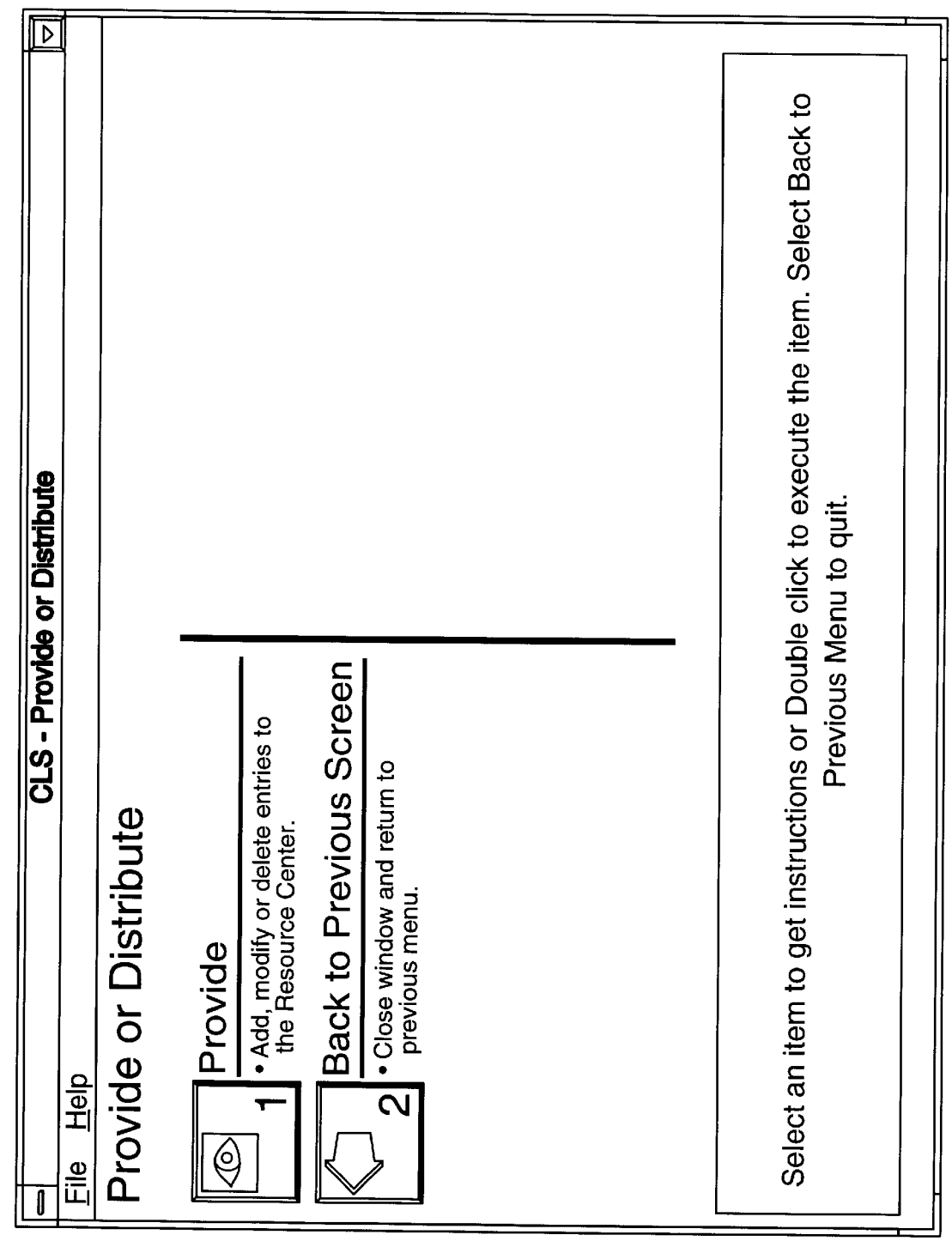

Assume that the user selects option #2, "Provide and Distribute." In response to this option, the CLS displays the screen shown in FIG. 40, which allows the user to select the "Provide" option, as indicated. If the user selects the "Provide" option, the CLS responds with the screen shown in FIG. 41.

This screen represents the PROFILE of the RESOURCE which the user is about to provide to a REPOSITORY. The user fills out the PROFILE in the usual manner, as by the sequence illustrated by FIGS. 41–49. Several points are significant.

The user, who is now a PROVIDER, declares an "Access Level," by selecting a box at the upper right part of FIG. 41. If the user selects "Public," then any person gaining access to the CLS can obtain access to the RESOURCE now being added.

If the user selects "Organization" or "Team," then only those members of the user's respective organization or team can gain access. If the user belongs to many teams or organizations, the CLS asks the user to specify those to whom access should be granted.

The "Resource Title" is, of course, the title which appears on the PROFILE. When another user, at a later time, performs searches using the CLS, this title will appear in the list of titles returned to the later user.

The "Resource Category" refers to the "Category" described in connection with FIGS. 18–21. The RESOURCE now being created will become located within the CATEGORY specified on the PROFILE in FIG. 41. Whenever a later user searches this CATEGORY, the title of the newly created RESOURCE will be found. (Of course, if the new RESOURCE has access limited to a particular "Team," and if the later user is not a member of this "Team," then the later user will not see the title when any searches are performed. This aspect is described near the end of the Specification.)

If the PROVIDER finds the CATEGORIEs which CLS provides to be unsuitable (these have been created previously by other users of the system), then the PROVIDER can create a new CATEGORY. The PROVIDER does this by choosing the option "OTHER," which is presented when the PROVIDER actuates the box labeled "INFORMATION CATEGORY" in FIGS. 41–49. The new CATEGORY is then added to the list of CATEGORIEs, and is shown to all users who subsequently elect to view the CATEGORIEs.

"Repository" in FIG. 41 refers to the REPOSITORY which will receive and then maintain the RESOURCE.

Figure 27:
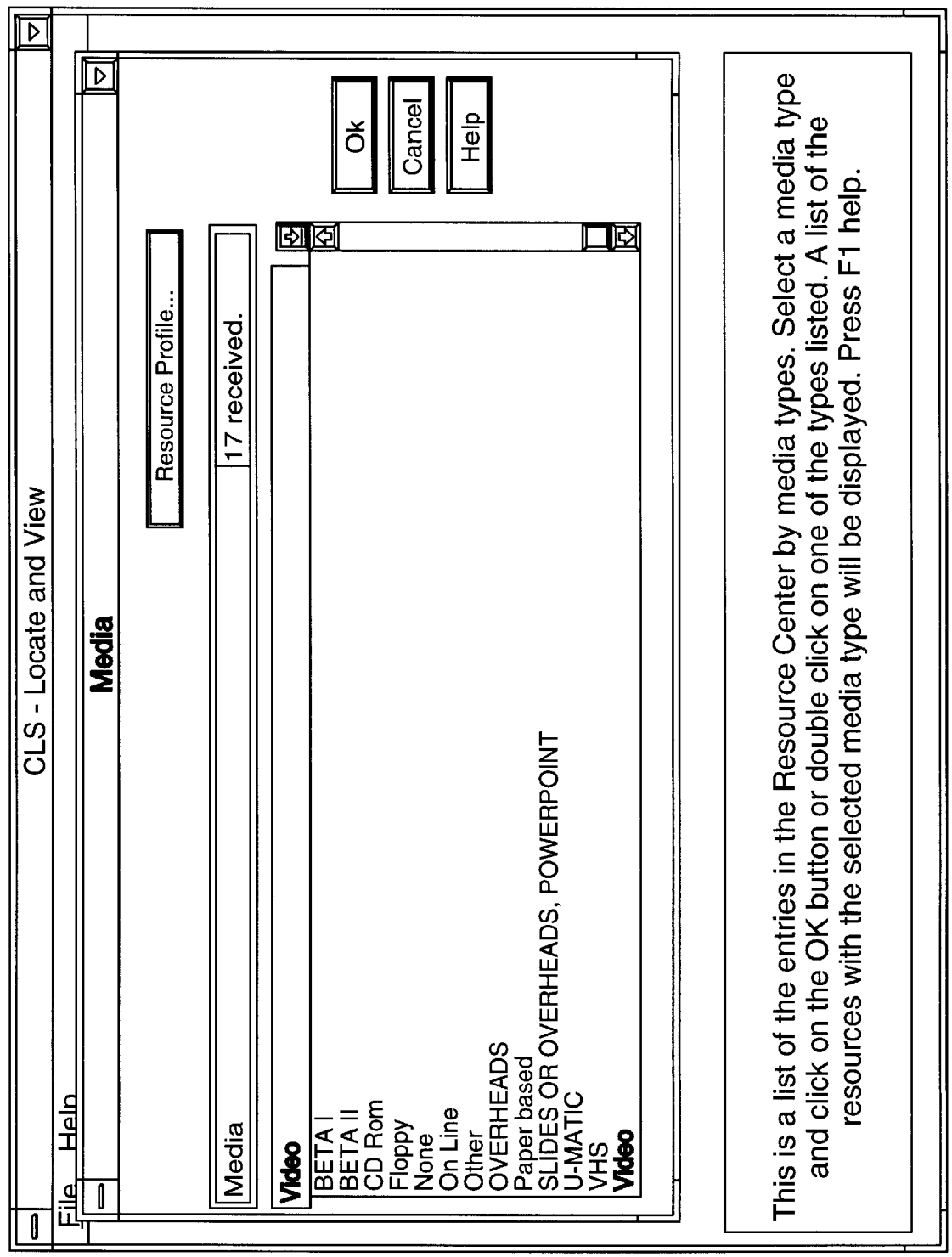
Figure 28:
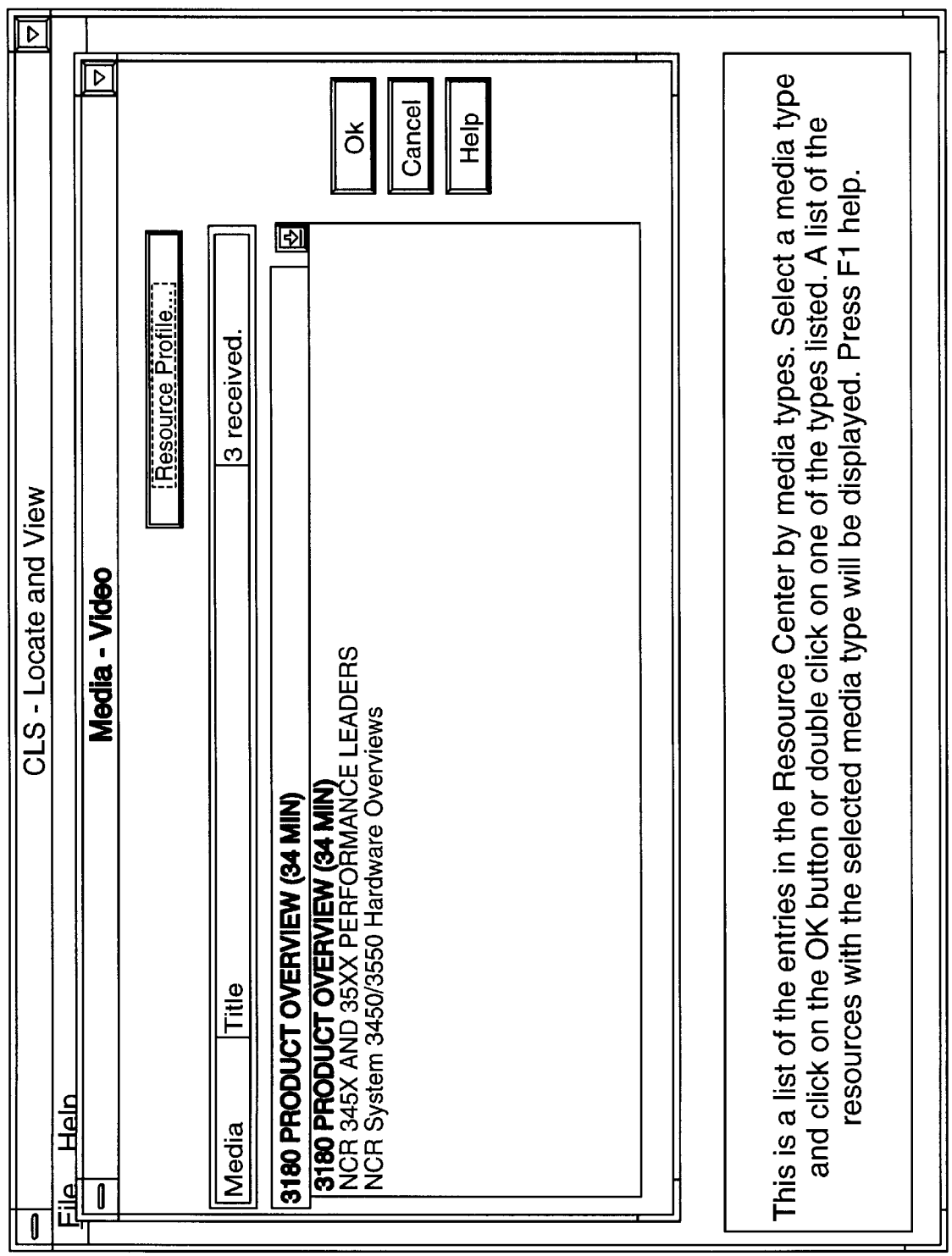

"Media" refers to the media type, such as those shown in FIG. 27.

Figure 46:
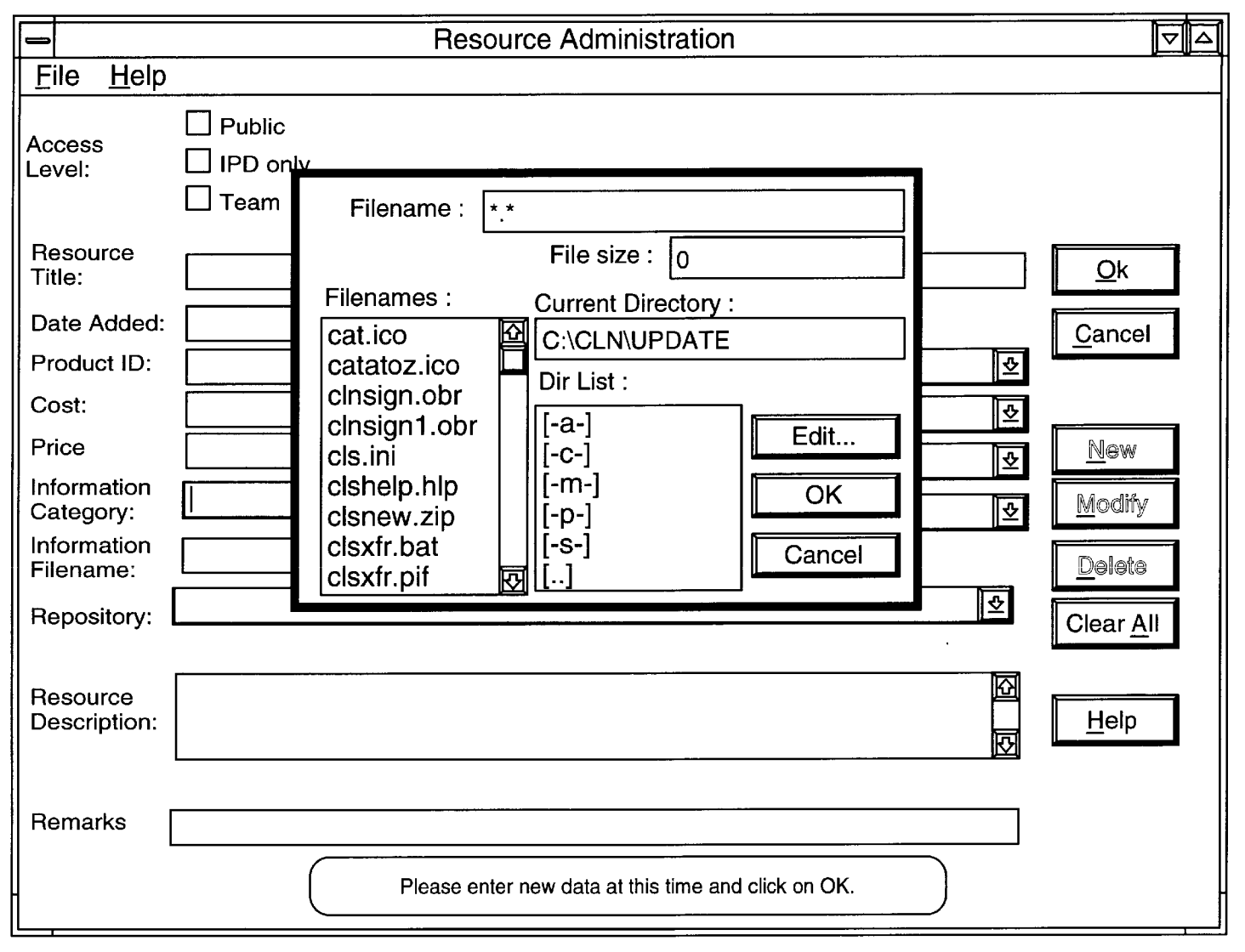
Figure 47:
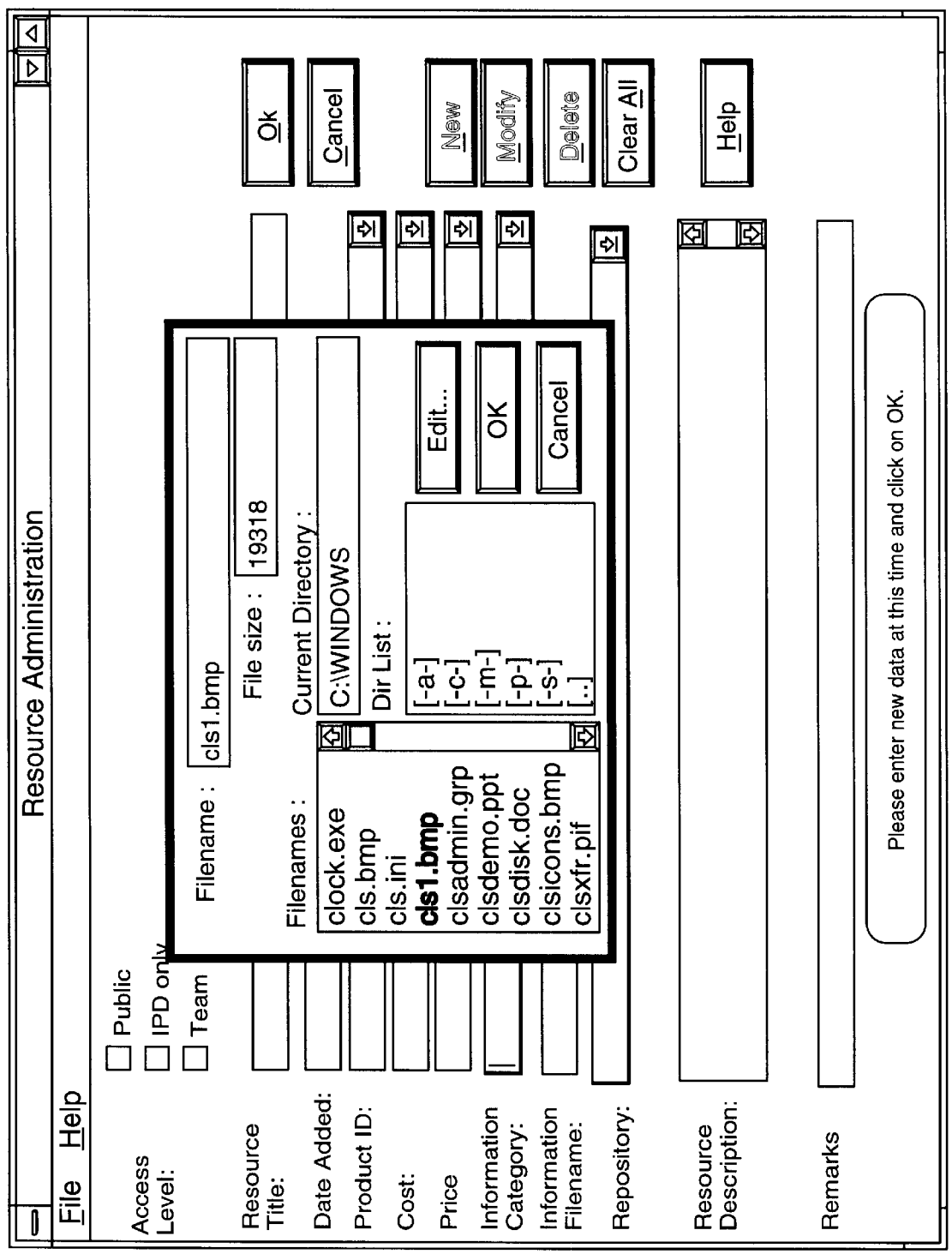

"Bitmap" refers to a graphical image, or picture, which the PROVIDER can associate with the PROFILE. FIGS. 46 and 47 illustrate how the PROVIDER identifies the file which contains this image, at the time of creation of the PROFILE. Once the file has been identified, CLS stores it with the PROFILE. At subsequent times, when other users call up the PROFILE, they can actuate the "Bitmap" option, and CLS will display the graphical image.

For example, if the PROFILE's RESOURCE is a physical object, such as a fuel pump for an automobile, the graphical image may take the form of a picture of the pump.

Searching for Resource Just Created

Figure 50:
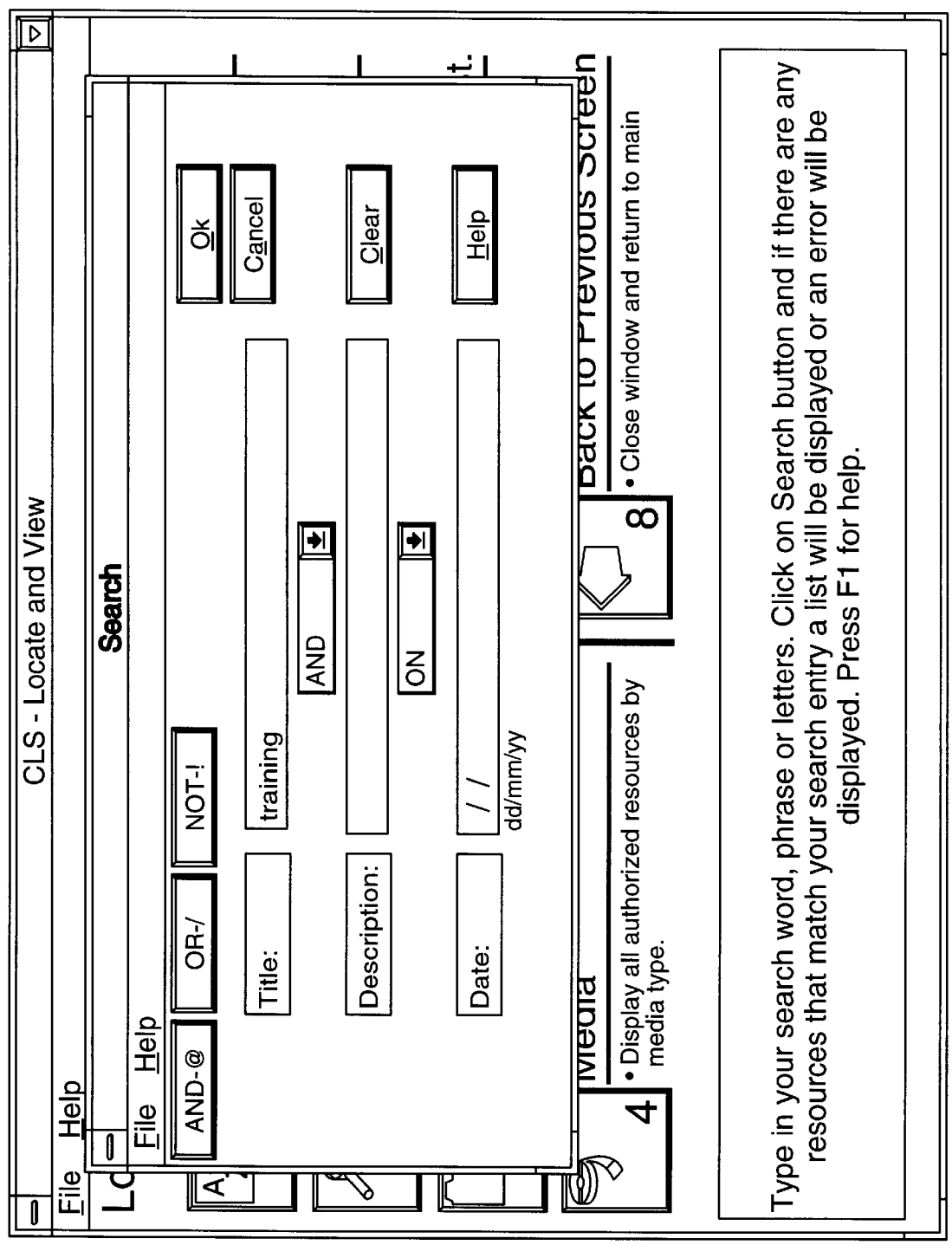

FIGS. 41–49 described creating a PROFILE for a new RESOURCE. It was entitled "Test Resource for Training," as indicated in FIG. 49. FIG. 50 illustrates a search request, undertaken under the LOCATE AND VIEW option, done in pursuit of this newly created RESOURCE.

Figure 51:
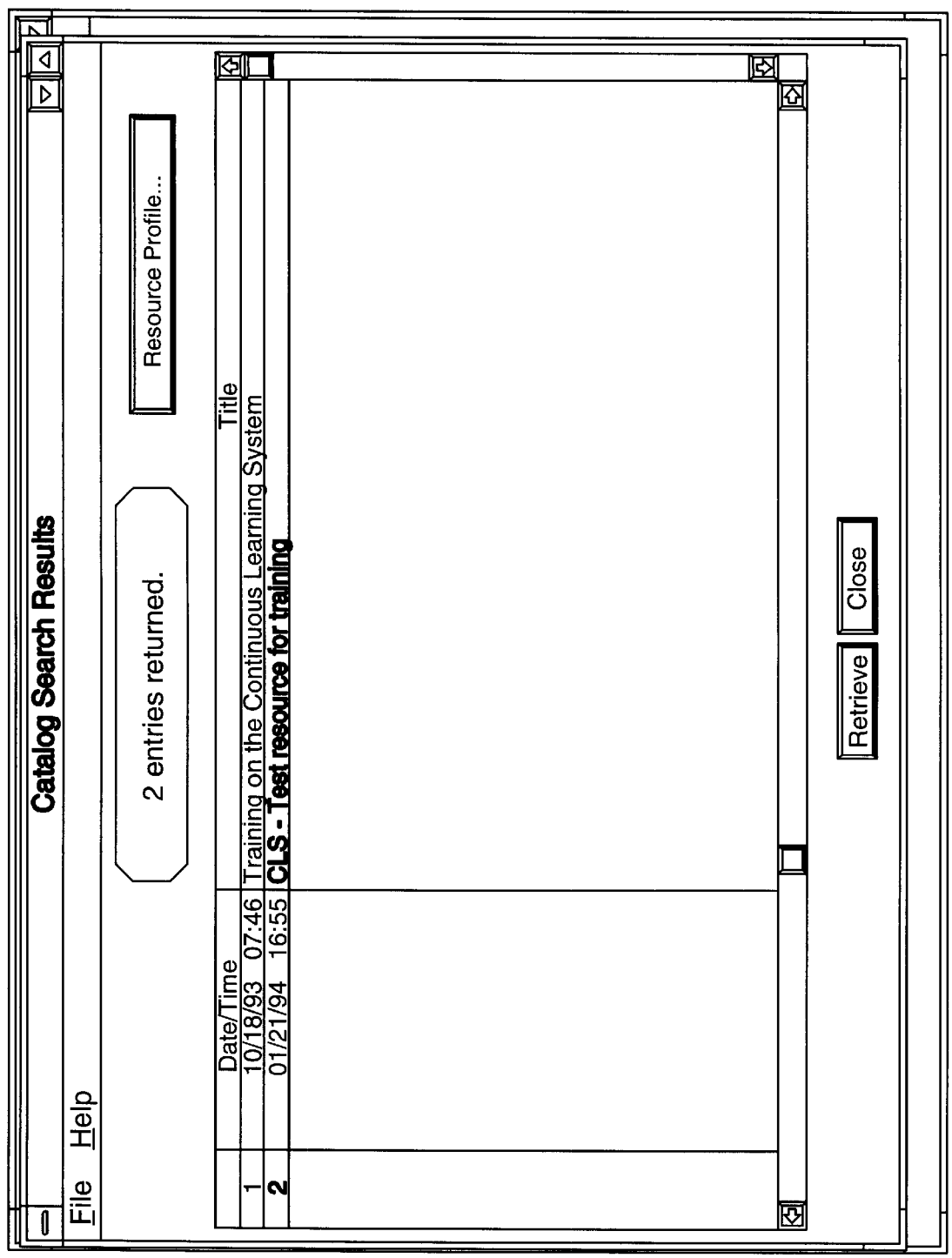
Figure 52:
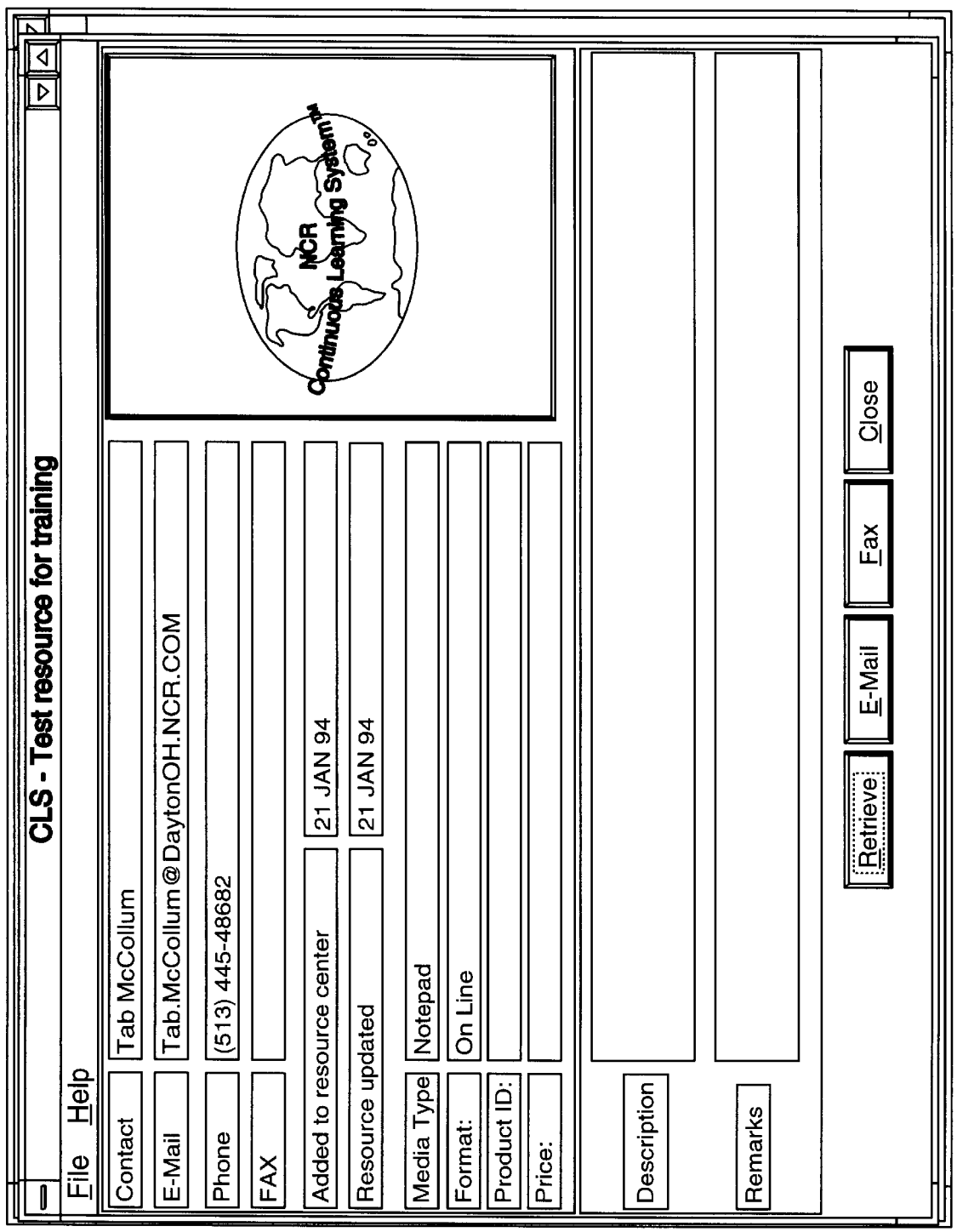

FIG. 51 illustrates the results of the search. The new RESOURCE is highlighted by the user, and the RESOURCE PROFILE option is selected. If the user actuates the button labeled "Resource Profile," located at the upper right part of the Figure, CLS displays the PROFILE of this highlighted RESOURCE, as shown in FIG. 52.

Figure 53:
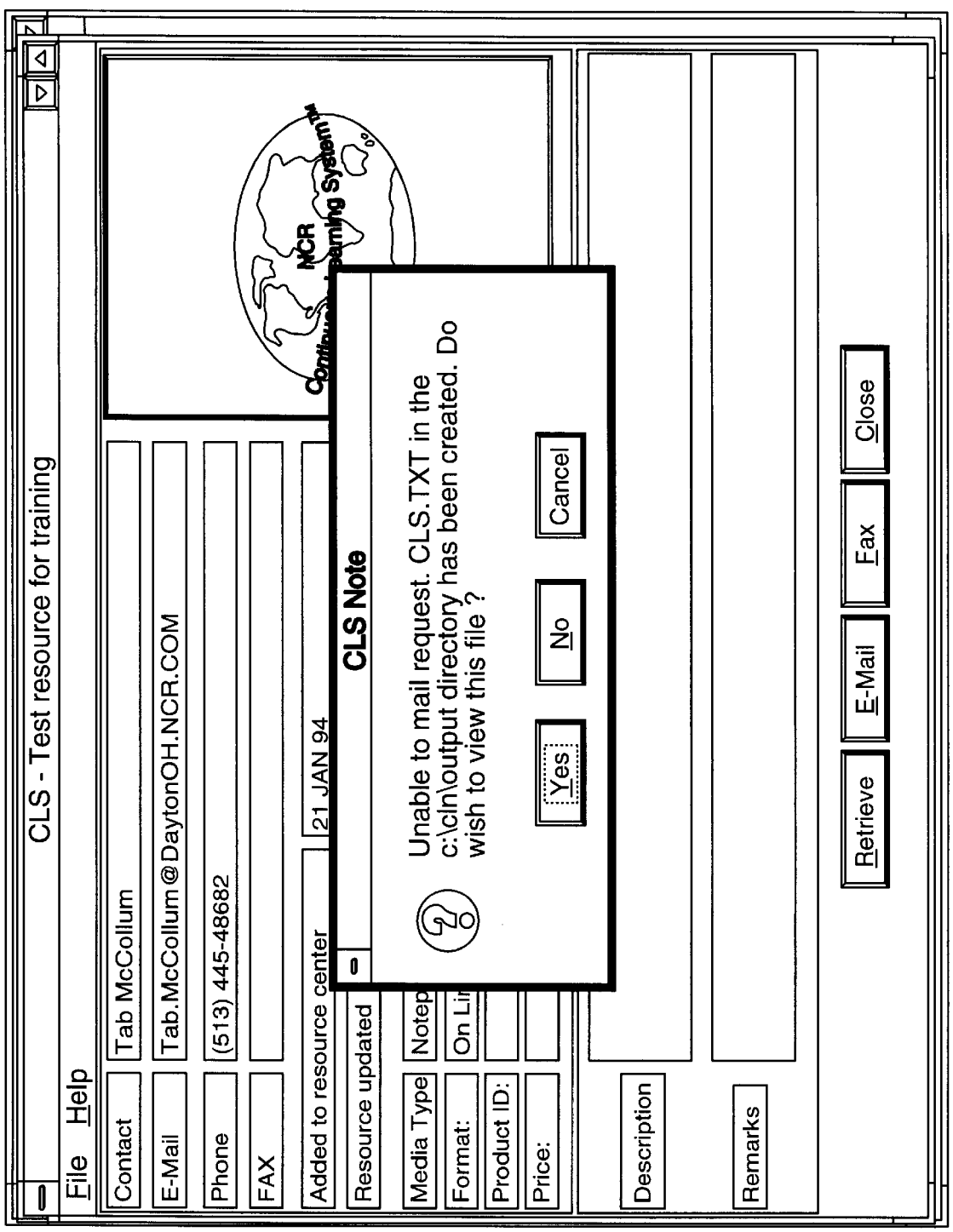
Figure 54:
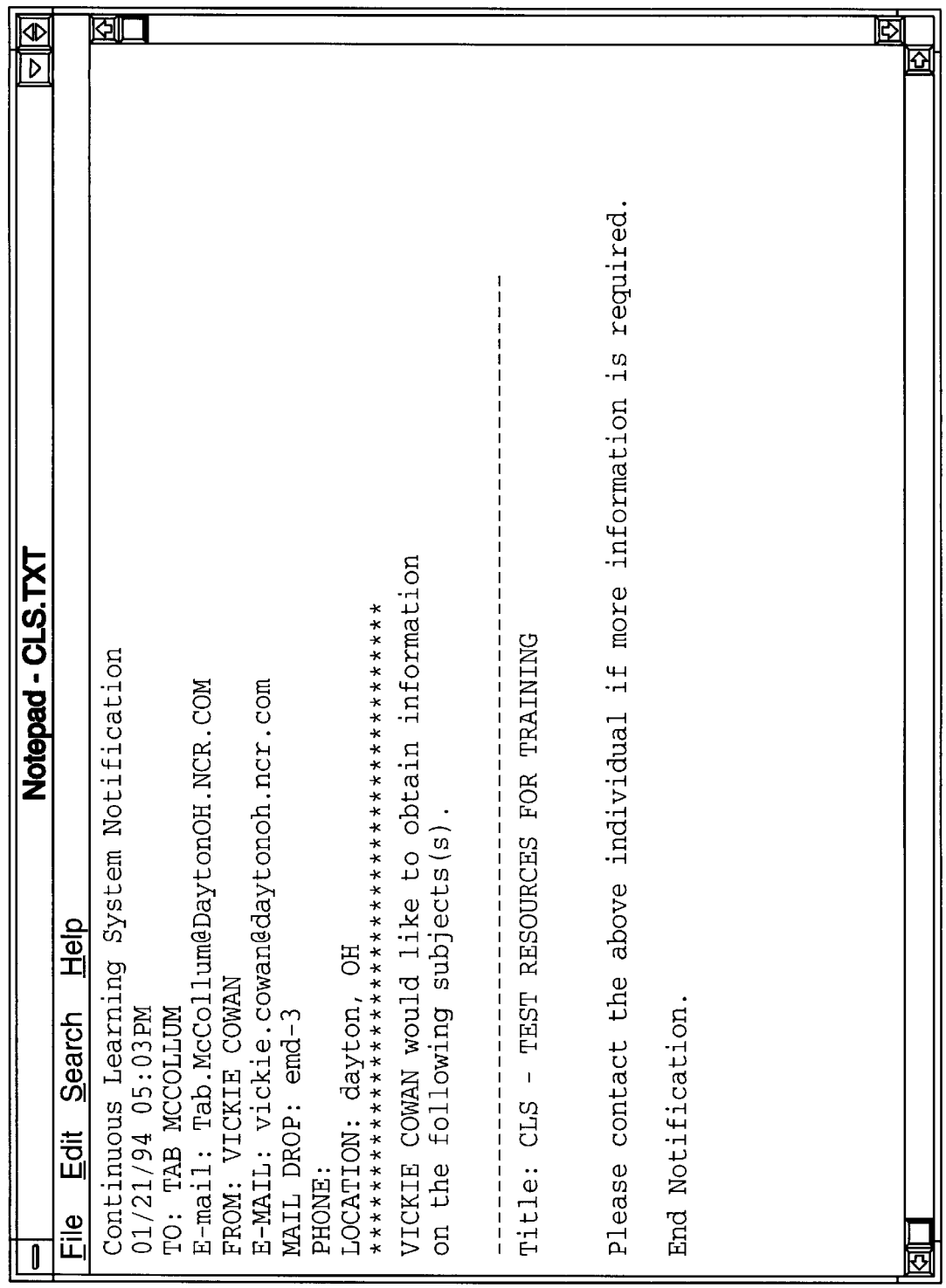

(If the user selects the "E-Mail" option, by actuating the proper button at the bottom of the Figure, but if the E-Mail option is unavailable, then CLS responds with the message shown in FIG. 53.) This message indicates that the file could not be mailed electronically, but specifies the location of the RESOURCE, and inquires whether the user wishes to view the RESOURCE. If the user selects YES, then CLS displays the RESOURCE, as shown in FIG. 54.

Establishing a Standing Search (Level 1—Identify INTERESTs)

In brief, this option allows a user to establish a standing search, analogous to a search described in FIGS. 9–12, above. However, this standing search examines new RESOURCEs shortly after they are added to their REPOSITORIEs, instead of searching the REPOSITORIEs immediately. How often the standing search is executed is controlled by the user.

Thus, if a user is interested in new developments in, say, pediatric medicine, the user would establish a standing search in the appropriate category for the subject of interest. The user accomplishes this as follows.

Figure 55:
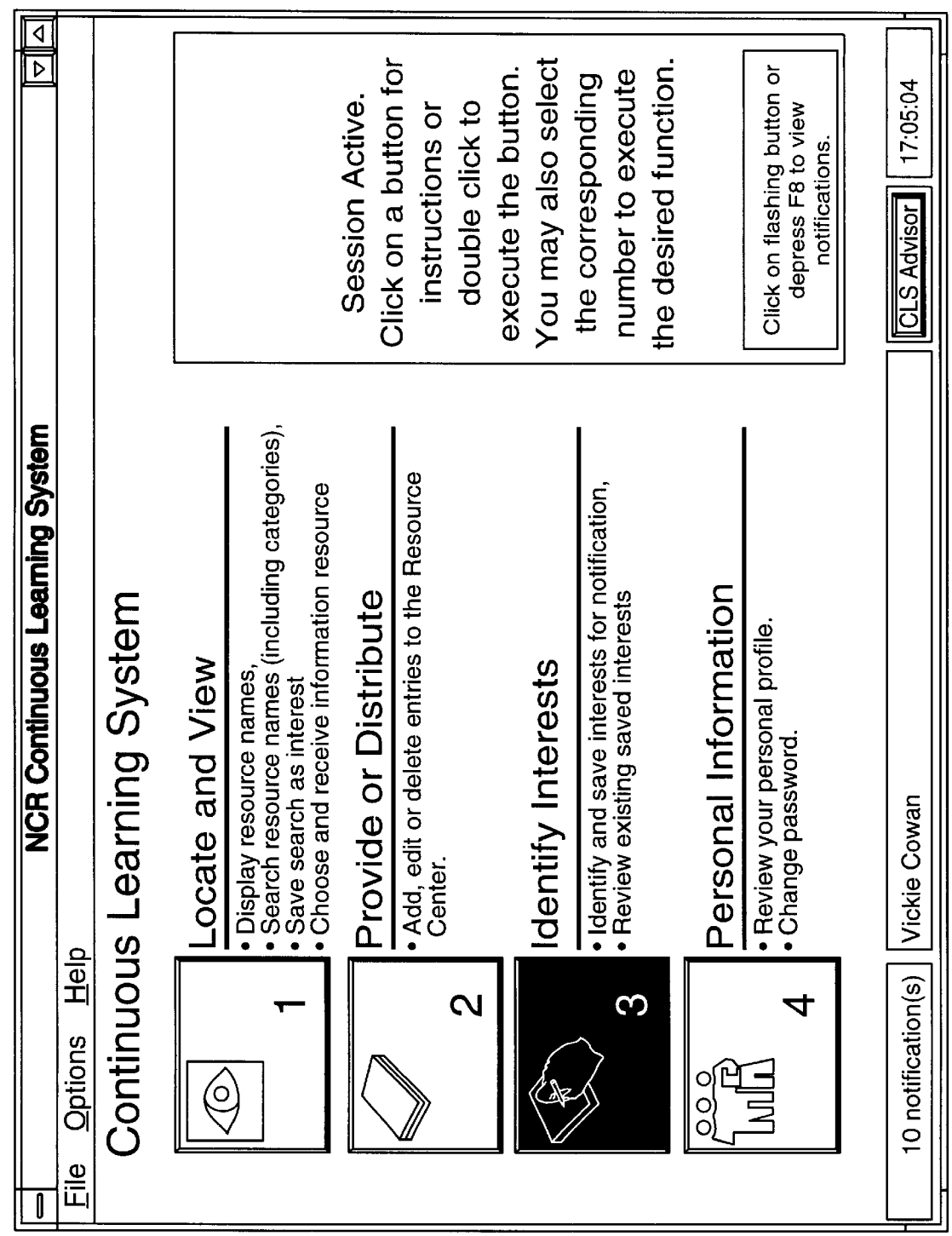
FIGS. 55–59 illustrate establishing of an INTEREST, which is an order to search new PROFILEs at specified times in the future.
Figure 56:
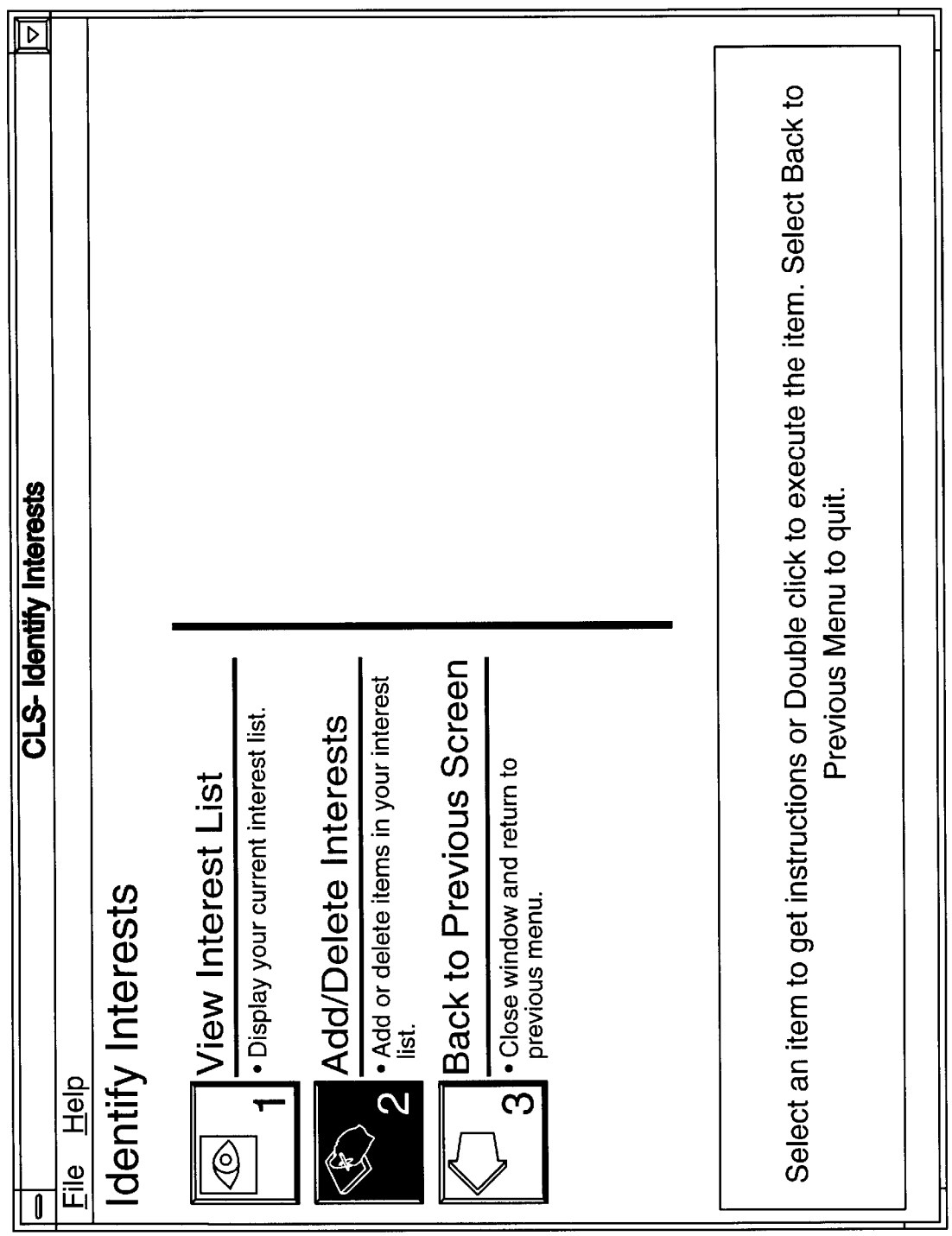

At Level 1, as indicated in FIG. 55, a user can select option #3, "Identify Interests." The CLS responds by displaying the screen shown in FIG. 56. Assume that the user selects option #2, "Add/Delete Interests."

Figure 57:
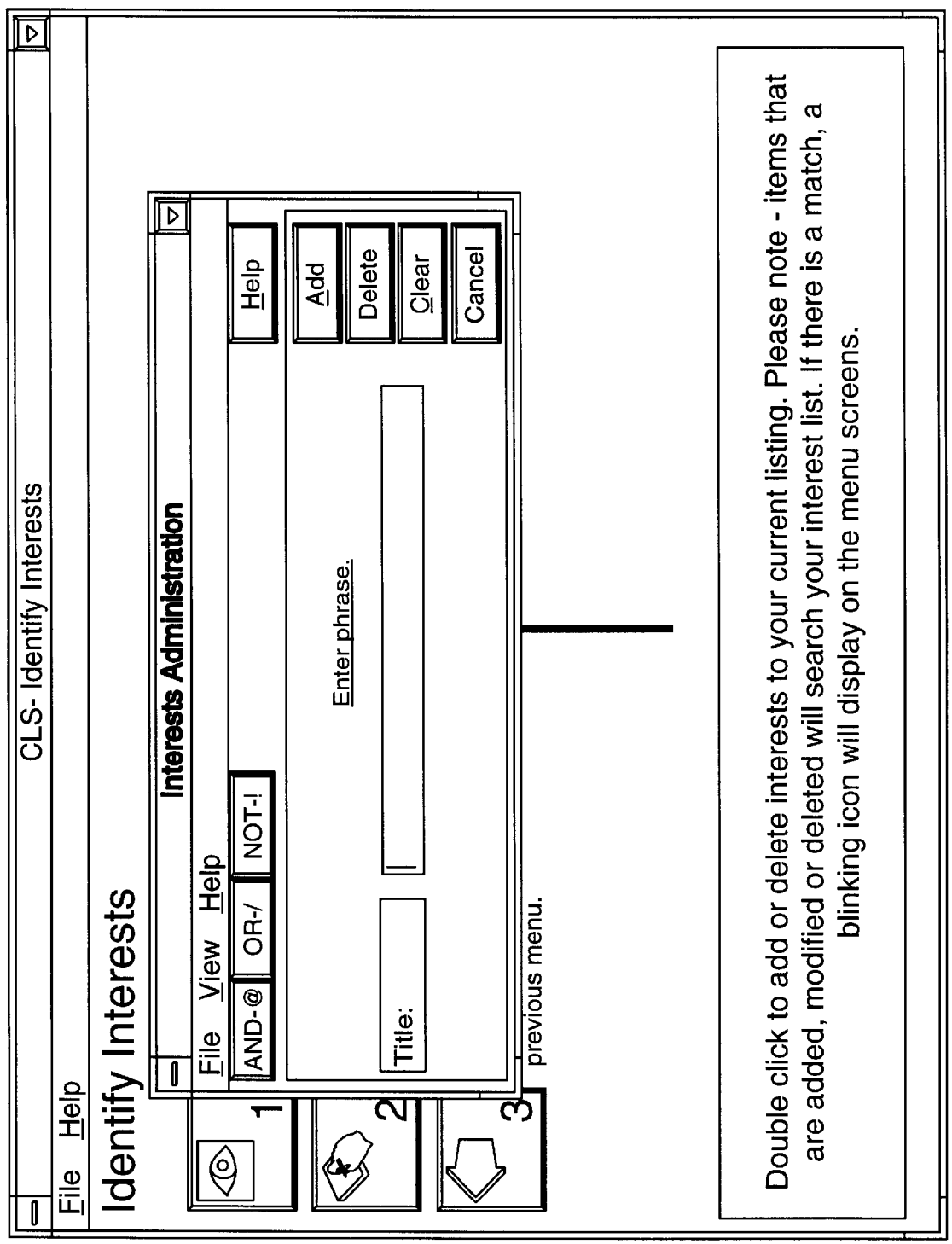
Figure 58:
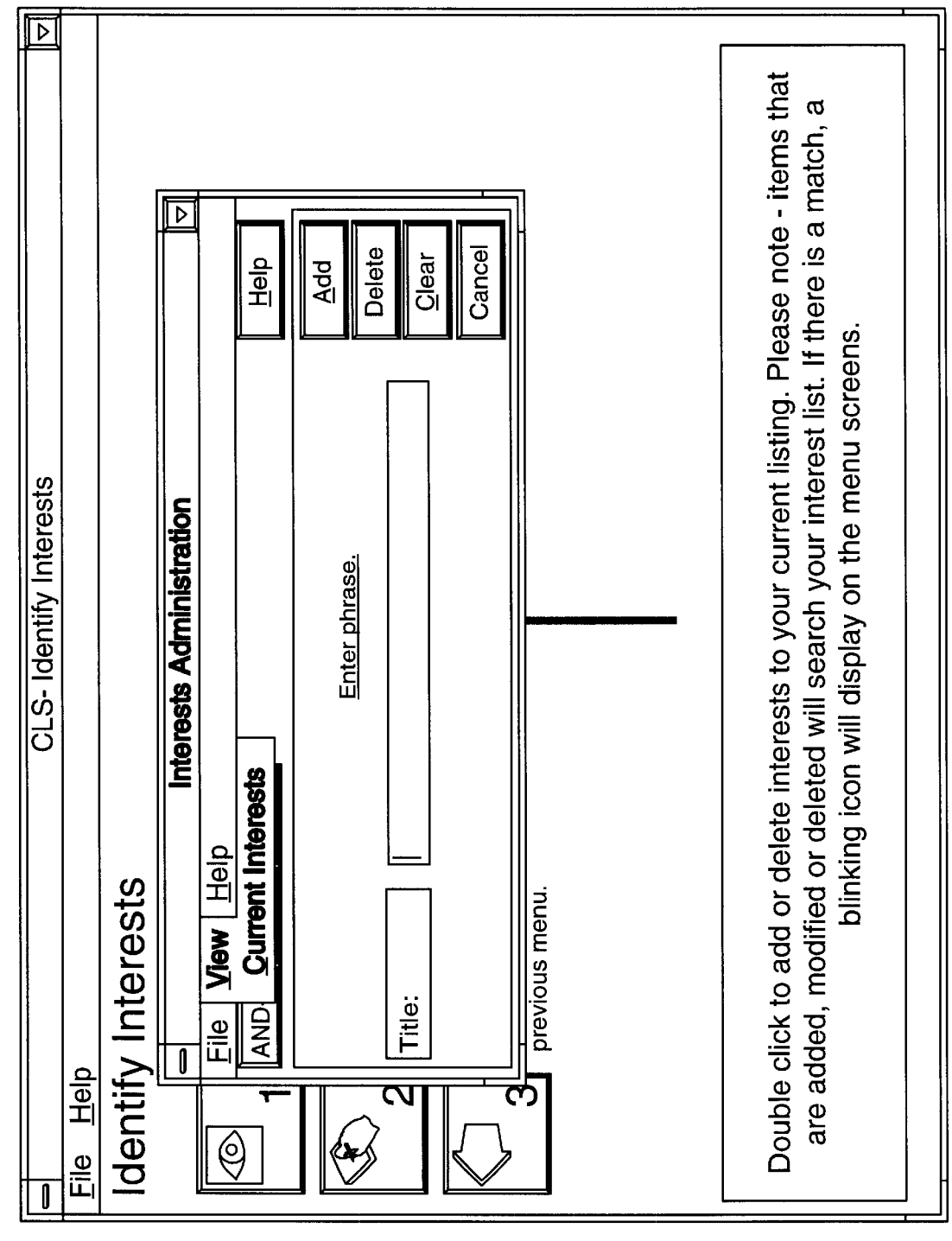
Figure 59:
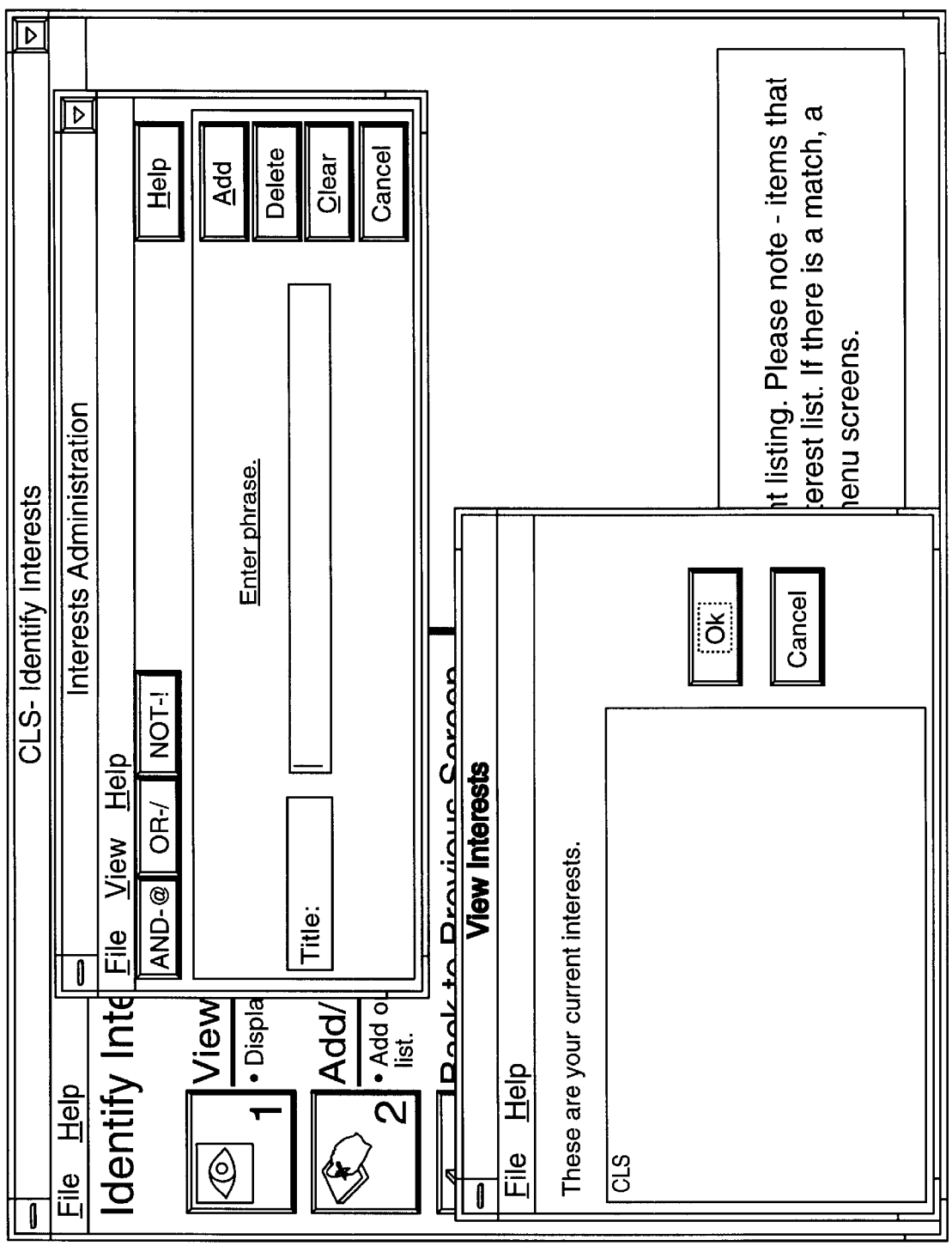

The CLS displays the screen shown in FIG. 57, which invites the user to enter a phrase which describes the interest. The user can enter a phrase or, as indicated in FIG. 58, opt to view the user's presently established INTERESTs (if any exist). FIG. 59 illustrates the present INTERESTs, namely, "CLS." This INTEREST was saved after a previous search was performed.

Irrespective of the particular manner in which the user creates an INTEREST (either by (a) direct entry of a phrase in FIG. 58, (b) by recalling a previous interest, or (c) by modification of the previous interest) the CLS acts upon the interest in the following way.

The CLS, automatically, searches each new PROFILE, at the times specified by the user when the INTEREST was created, according to the search criteria established by the INTEREST.

During a search, if the search criteria are fulfilled, the CLS notifies the user. The CLS accomplishes the notification by placing a small icon on the screen of the user's computer.

This icon does not disrupt any current activity of the user. One such icon is that located in the lower left corner of FIG. 5, indicating "9 notifications," meaning that nine PROFILEs were found which match the standing search, or INTEREST.

Figure 62:
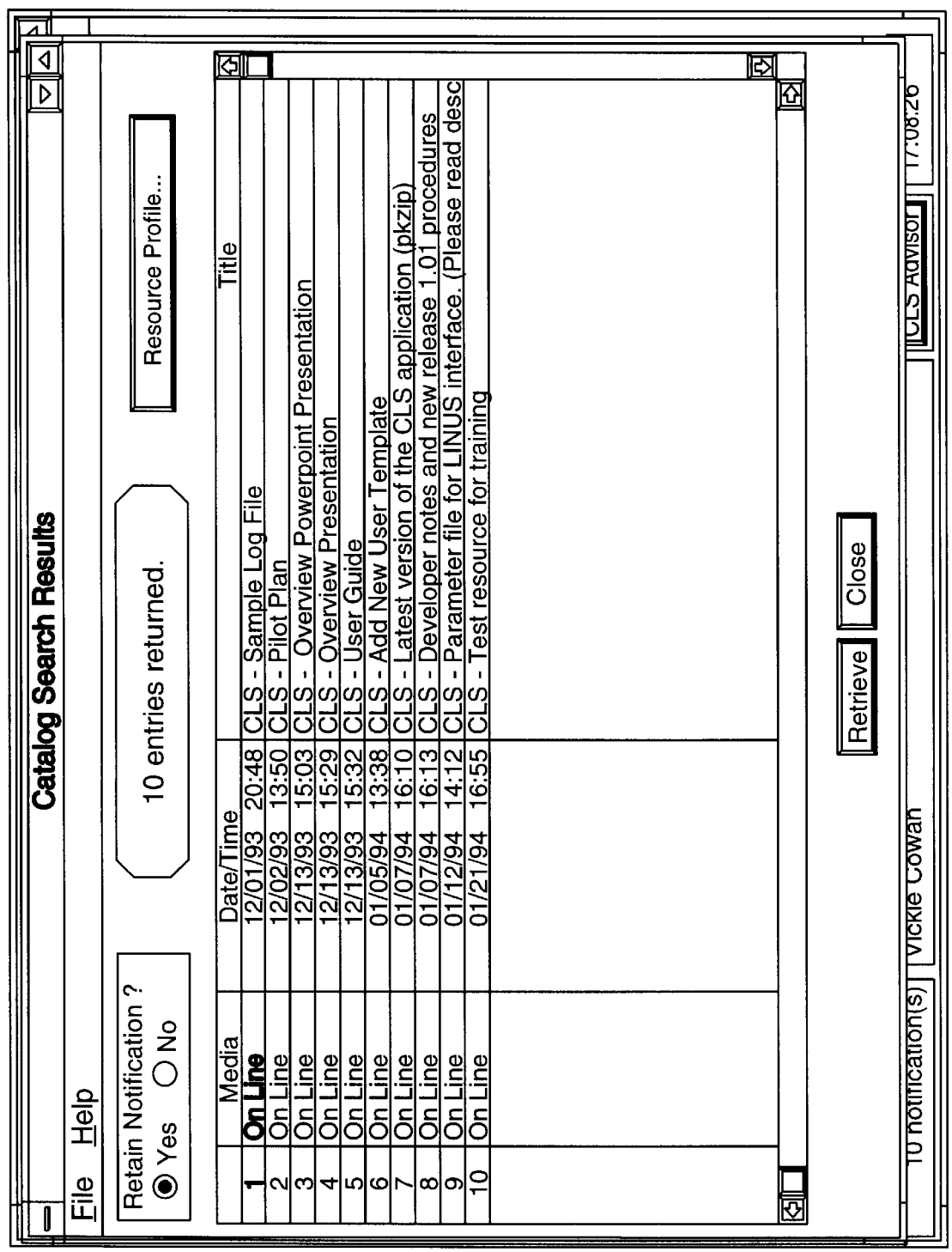
FIG. 62 illustrates the results of the INTEREST search.

The user can view the search results, as shown in FIG. 62, by actuating the button at the lower left, associated with the phrase "10 notifications." The search results are then displayed, as shown in FIG. 62.

Figure 60:
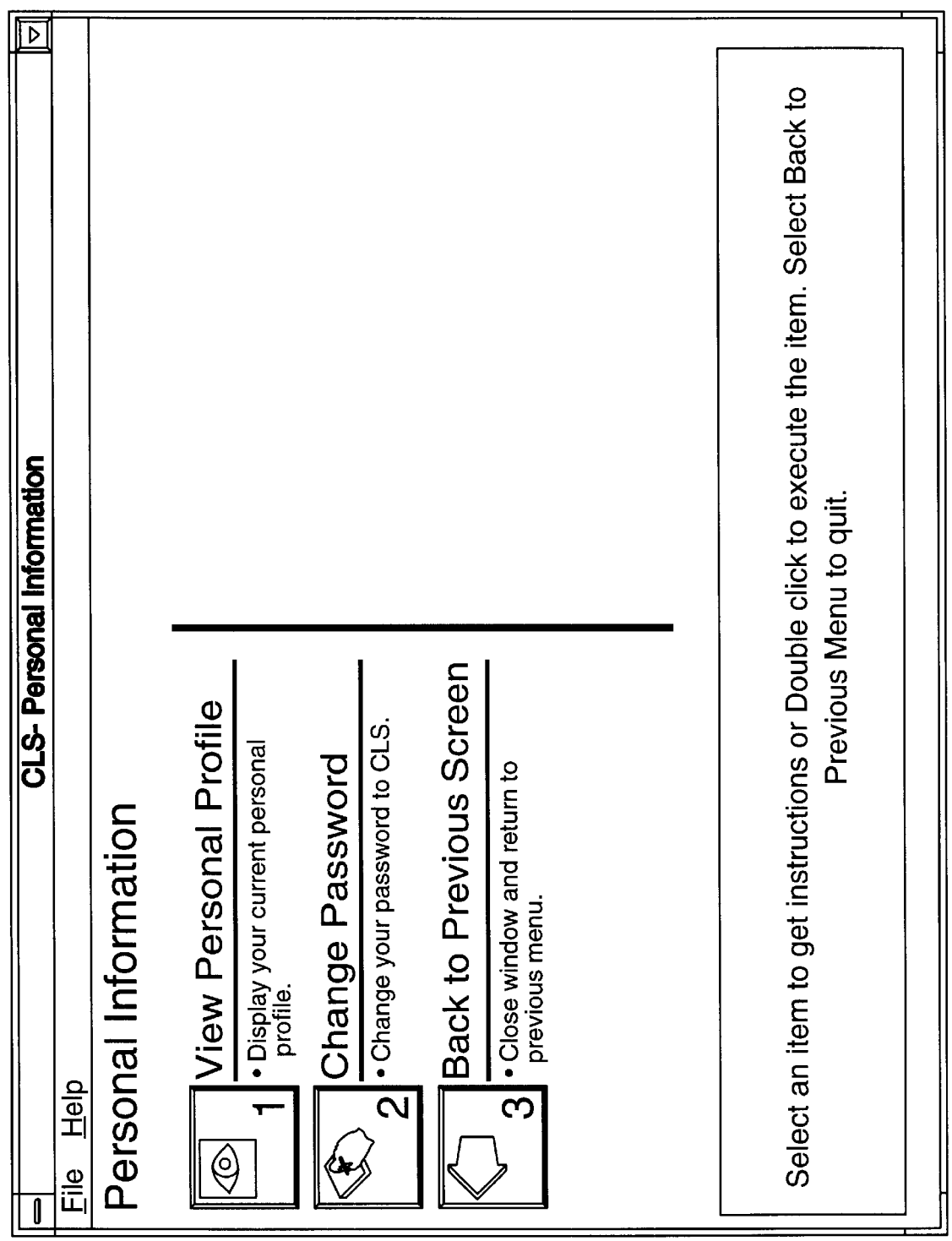
FIGS. 60 and 61 illustrate the passage of time, during which the INTEREST was searched.
Figure 61:
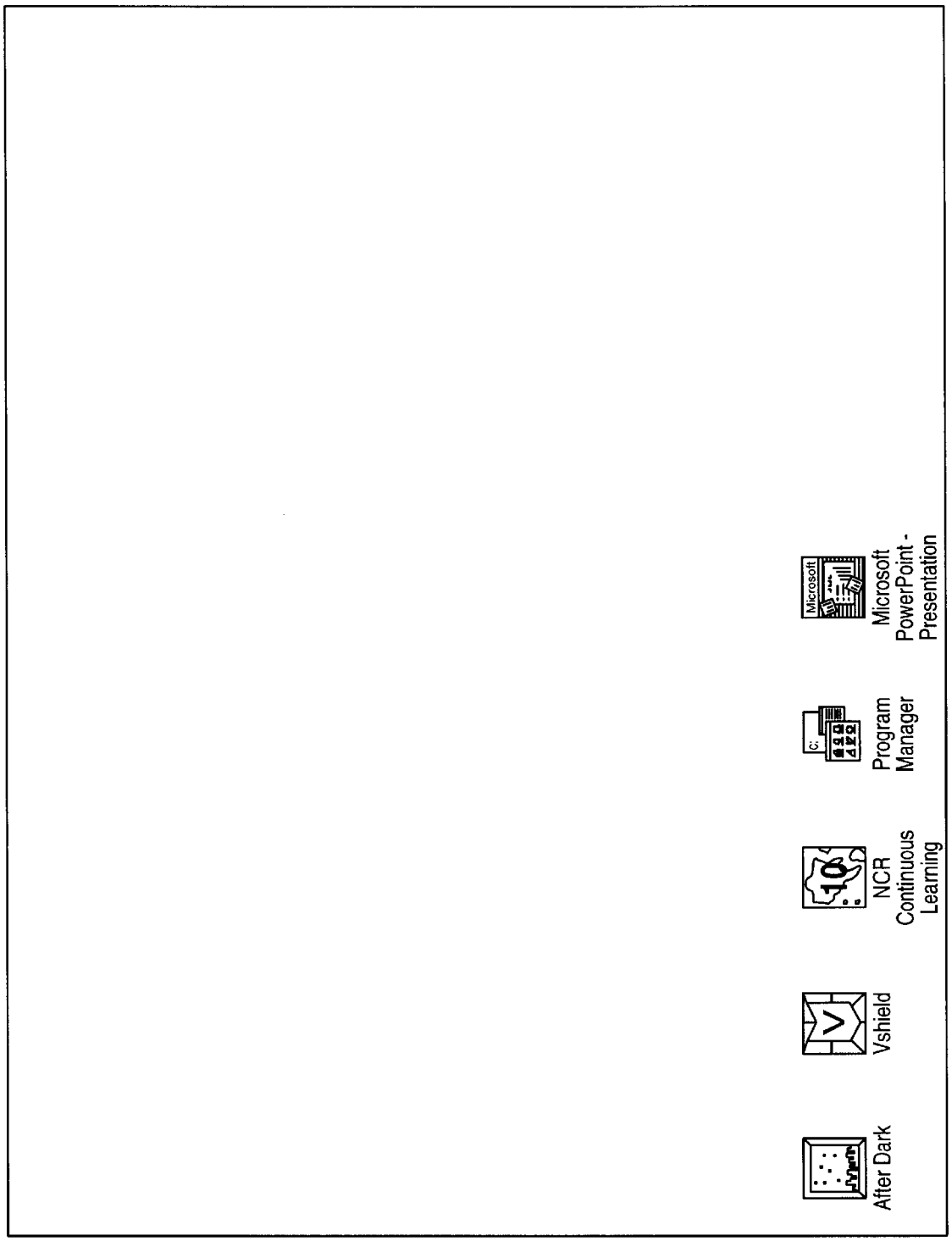

FIG. 60 illustrates a screen from which a user may exit. Upon exiting, the GUI will display a screen of the type shown in FIG. 61. The icon containing the number "10" and labeled "NCR Continuous Learning" indicates the results of a standing search, or INTEREST. To view the search results from this level, the user actuates this icon, which causes the display shown in FIG. 62 to be generated. The display lists the PROFILEs found which match the search criteria.

Reminder to Save Upon Exiting

Figure 63:
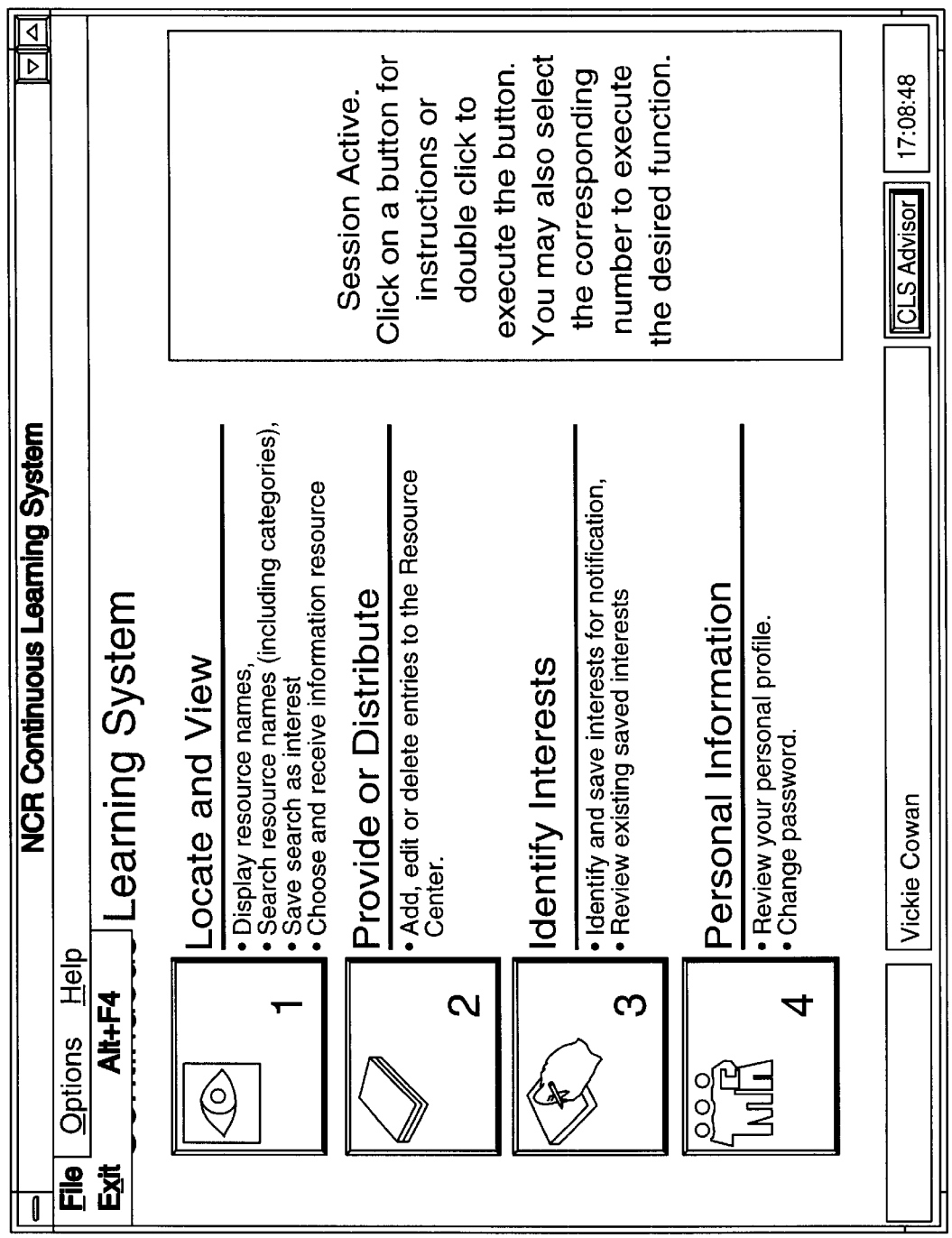
FIG. 63 illustrate return to Level 1.
Figure 64:
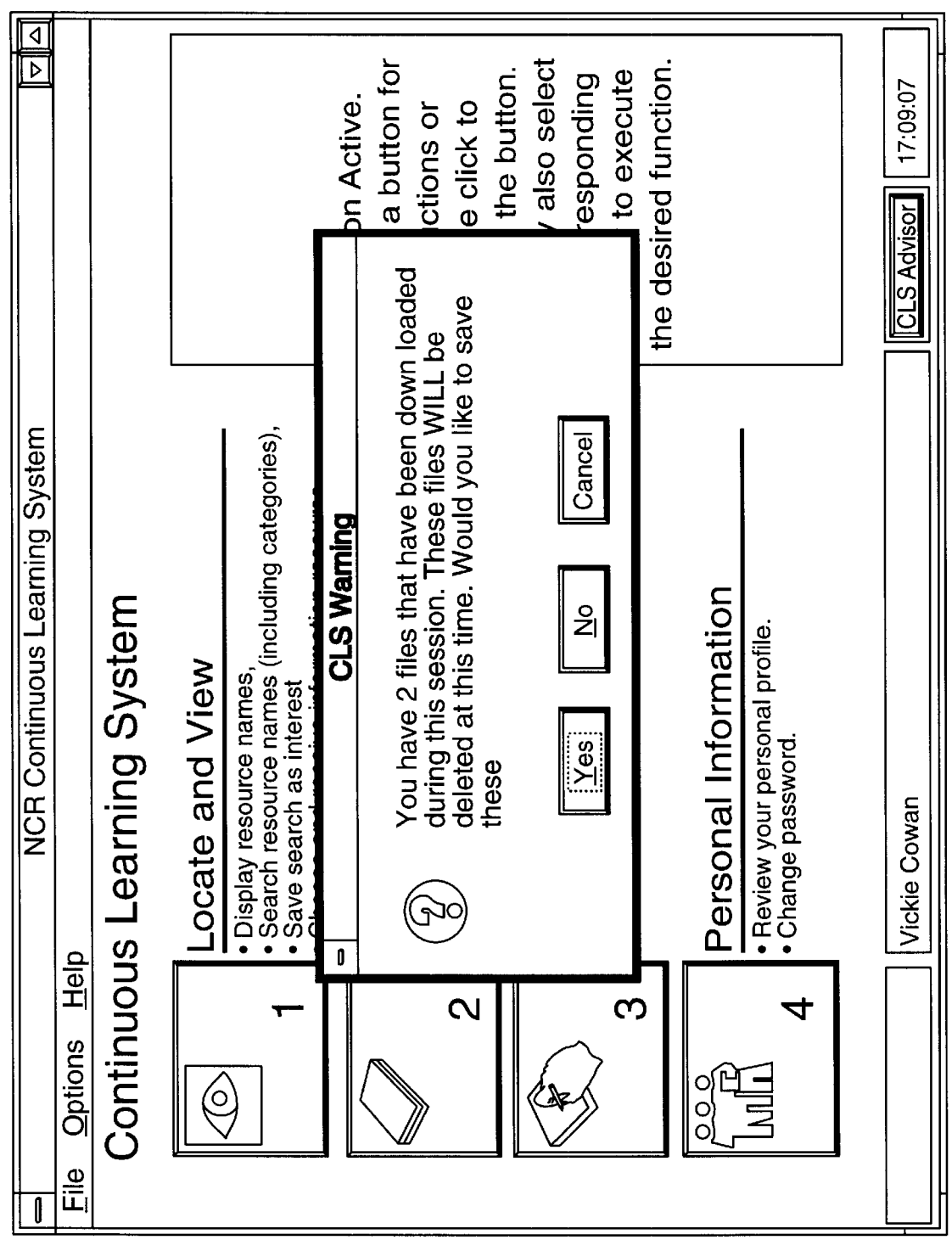
FIG. 64 illustrates a warning given when the user attempts to exit, when downloaded files are present, but not yet stored.

When a user wishes to exit the CLS, the user actuates the exit button, as shown in FIG. 63. If the CLS contains local files, which have been downloaded, but not yet saved, the CLS reminds the user of this fact at this time, by means of the screen shown in FIG. 64. The user takes appropriate action. (Of course, the originals of the downloaded items are still located at their respective RESOURCEs, and are not lost if the user does not heed the warning screen shown in FIG. 64.)

Figure 65:
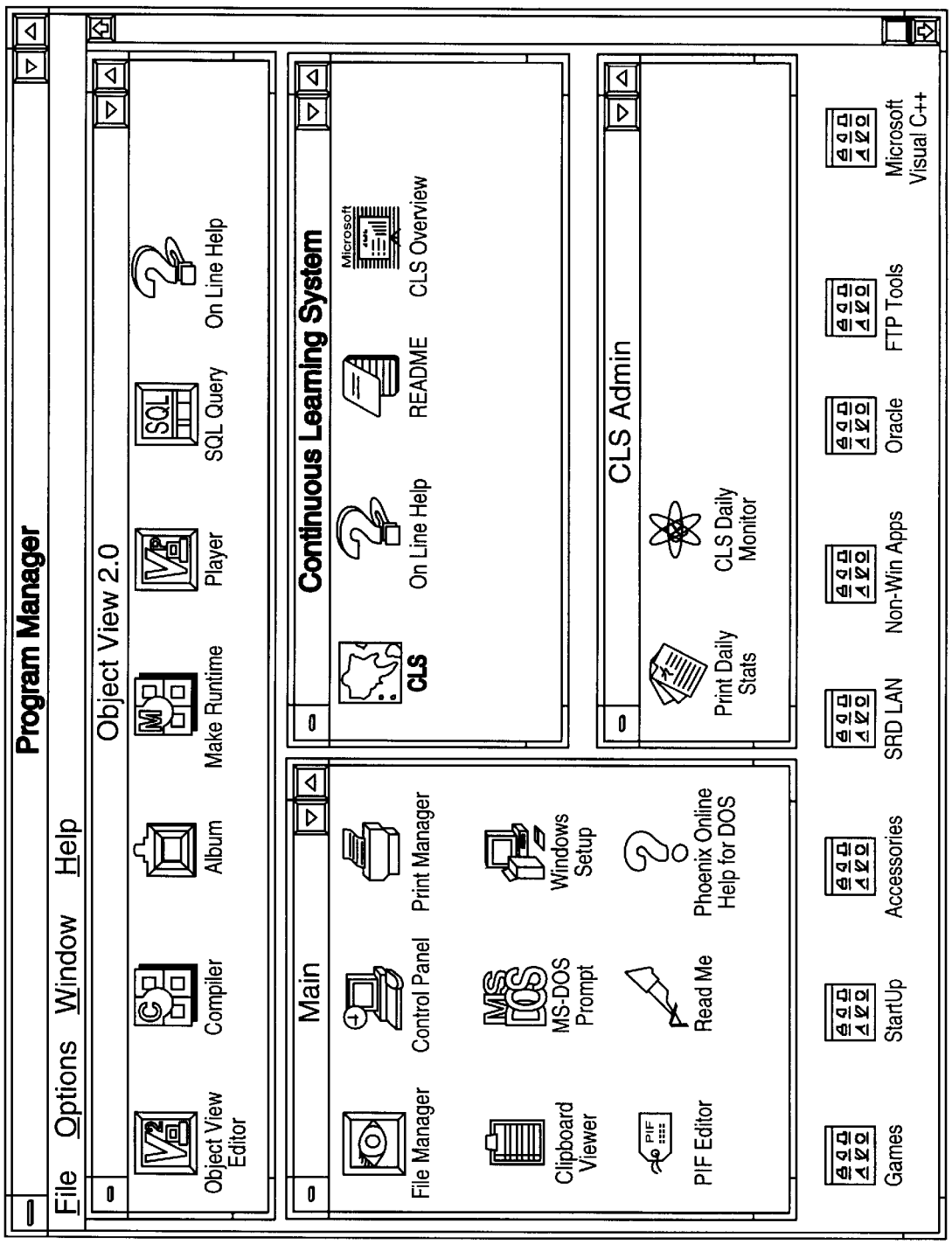
FIG. 65 illustrates layout of a typical screen displayed by a Graphical User Interface, GUI. The particular icons, which represent programs and information stored on the computer, will, of course, differ from one computer to another.

Upon exiting the CLS, the Graphical User Interface displays a screen resembling that in FIG. 65.

Modification of Team Membership

FIG. 66 explains the fact that the CLS Administrators manage the membership of teams, and provides a scenario wherein subsequent Figures illustrate modification of team membership. These screens are available only to the Administrator of the SERVER running CLS, and not to the users.

Figure 67:
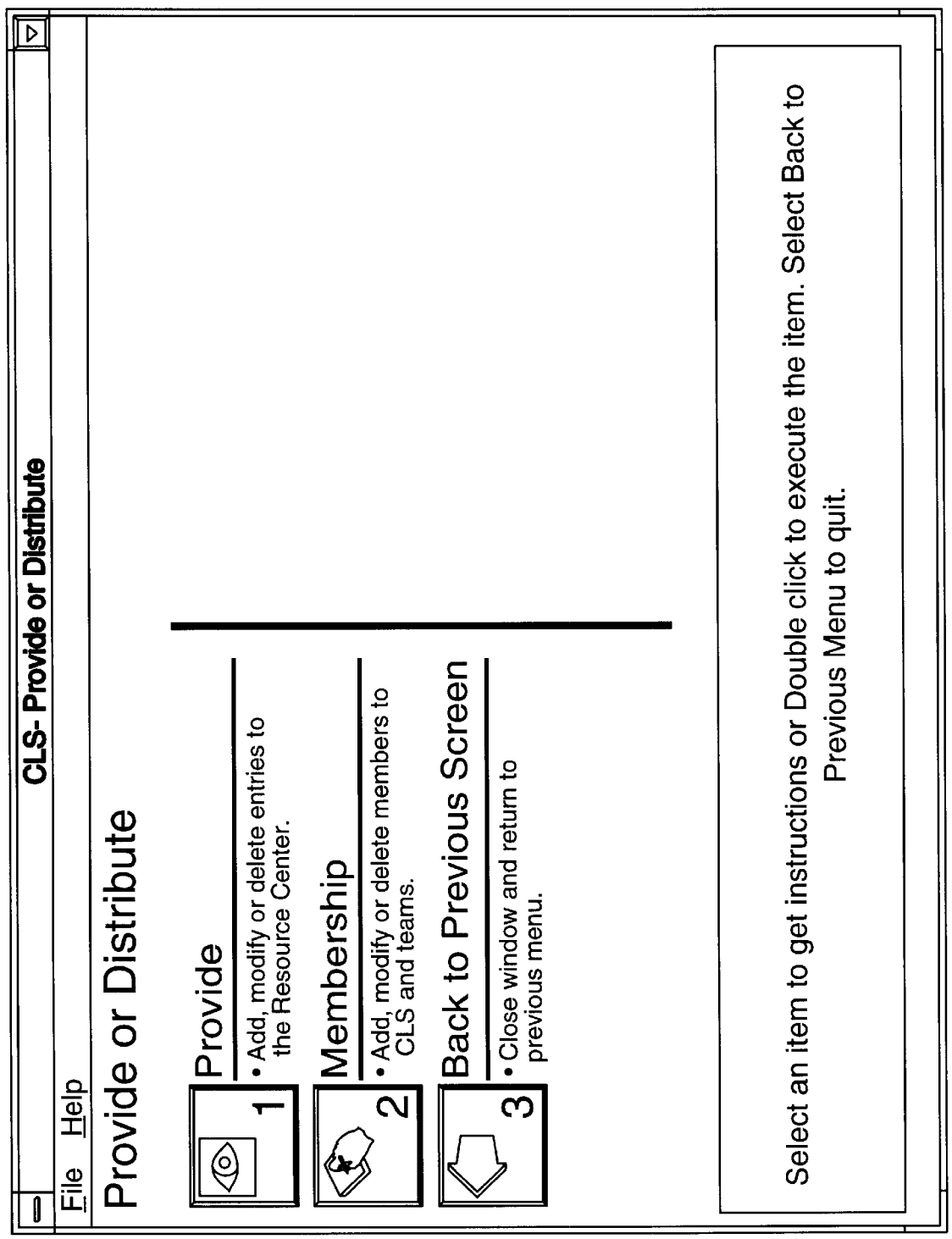
Figure 68:
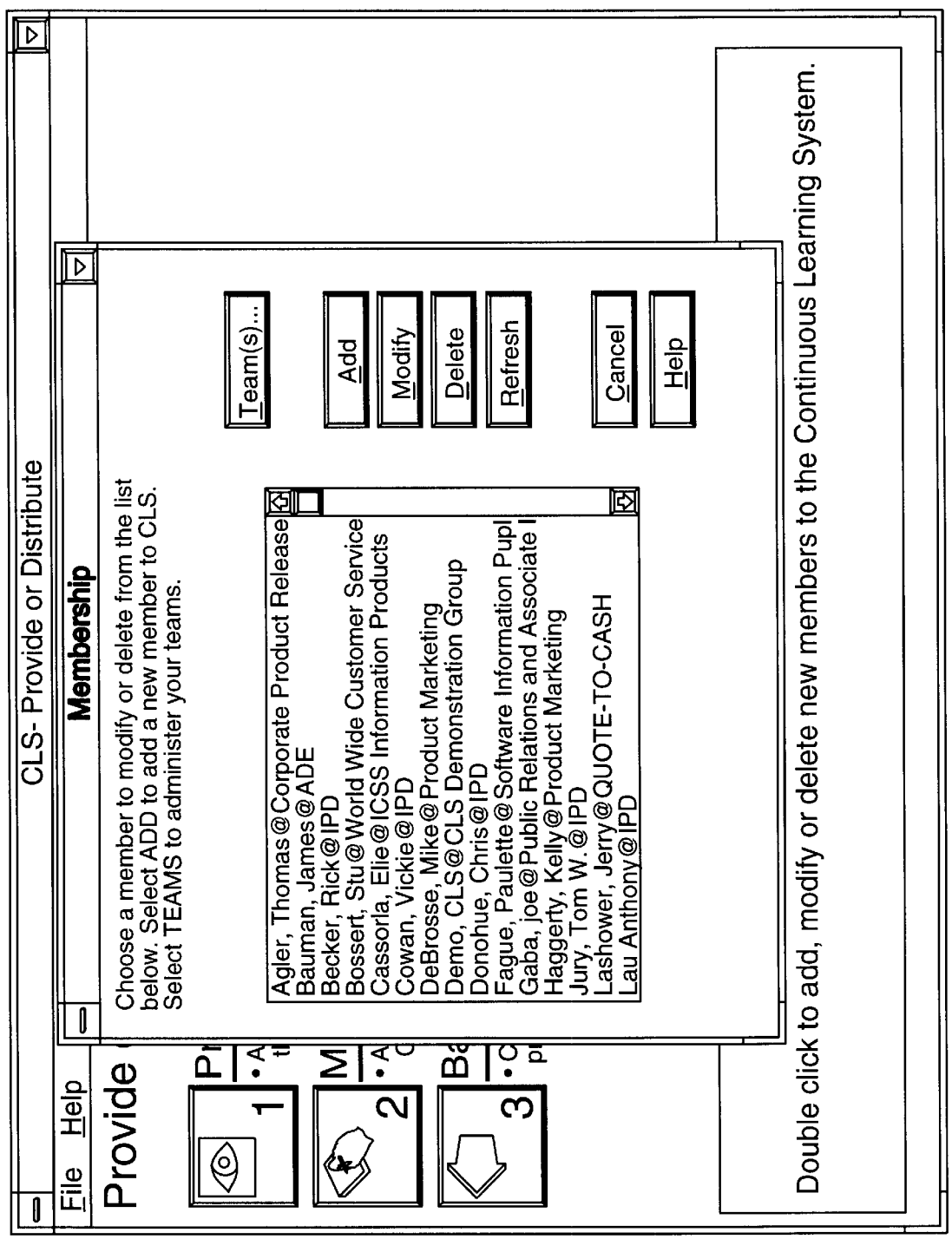

In FIG. 67, the Administrator actuates the MEMBERSHIP button. The CLS responds with a list of members, as shown in FIG. 68, together with the team affiliation of each. The team affiliation follows the symbol "@".

Figure 69:
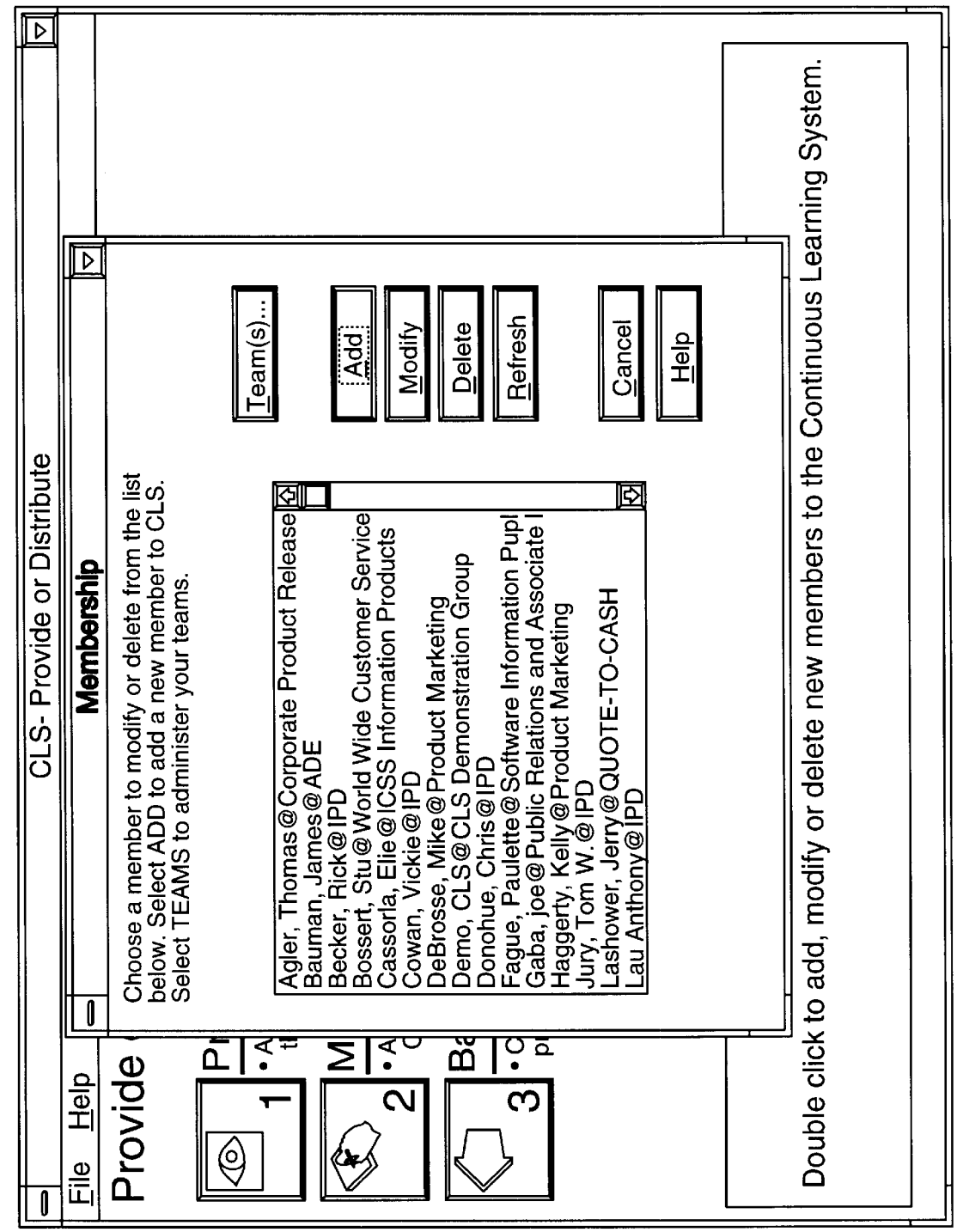

In FIG. 69, the Administrator clicks the ADD button, because the Administrator wishes to add a member to a team. The CLS responds by displaying the screen shown in FIG. 70. The Administrator provides the information requested, and actuates the proper buttons on the screen.

The CLS adds the person identified in the screen shown in FIG. 70 to the proper team. The membership of the new team can be viewed as shown in FIG. 71.

Figure 71:
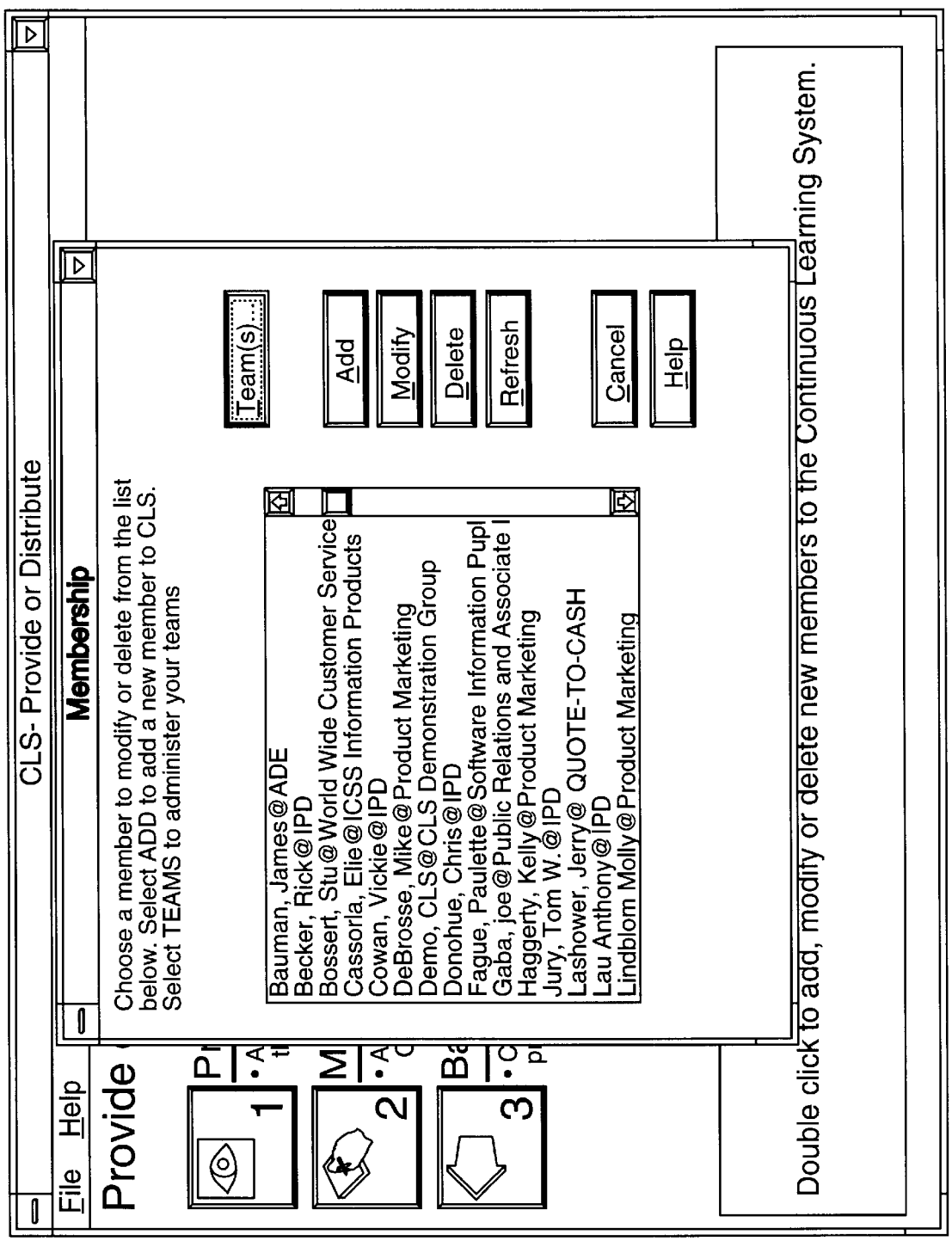
Figure 72:
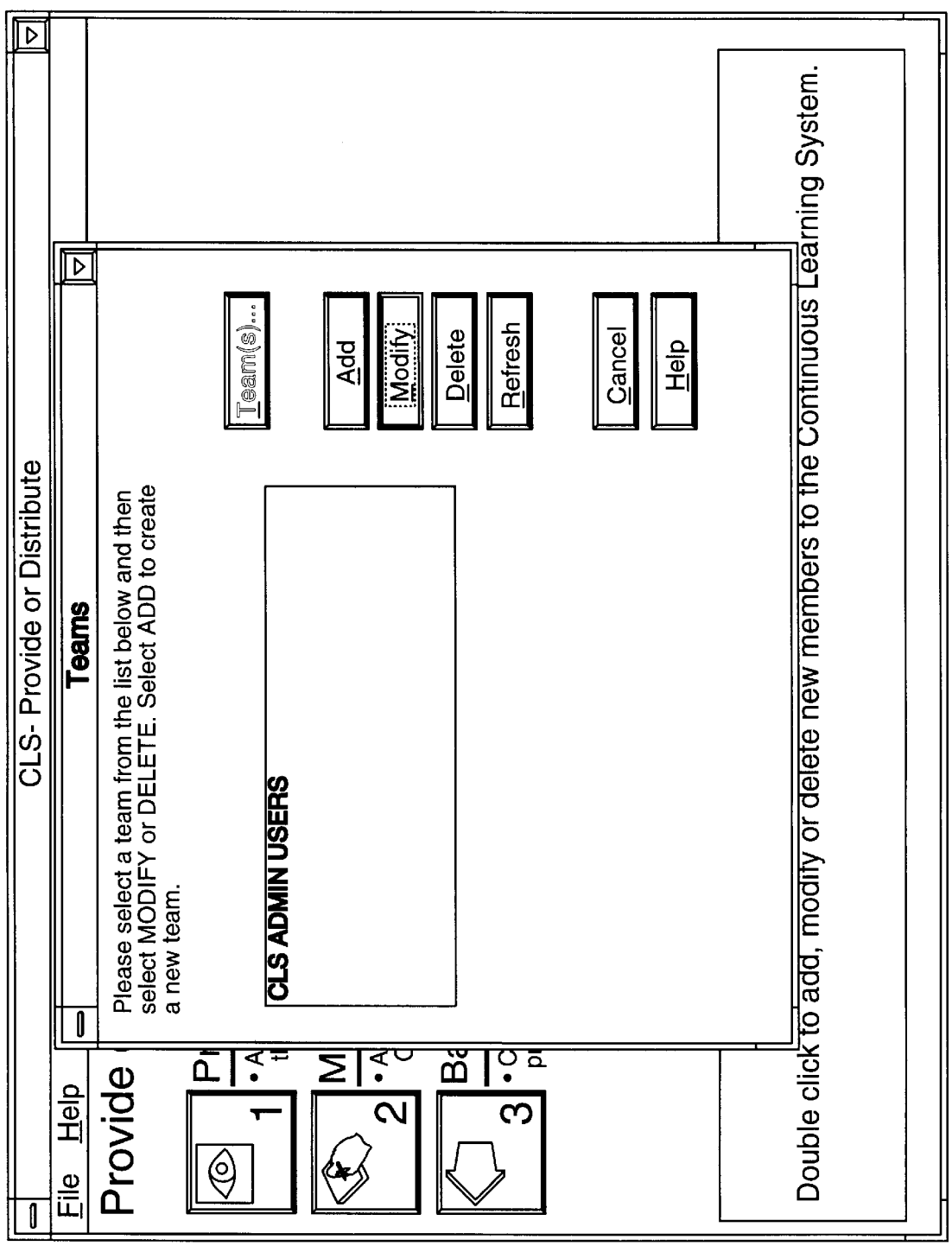

The screen of FIG. 71 can also be used as a launching point to modify membership of the TEAMs under the control of the Administrator. (The Administrator of each SERVER handles the TEAM membership of that SERVER.) The Administrator actuates the button TEAMs, causing the CLS to display the screen shown in FIG. 72. For simplicity, a single team is illustrated, namely "CLS ADMIN USERS."

Figure 73:
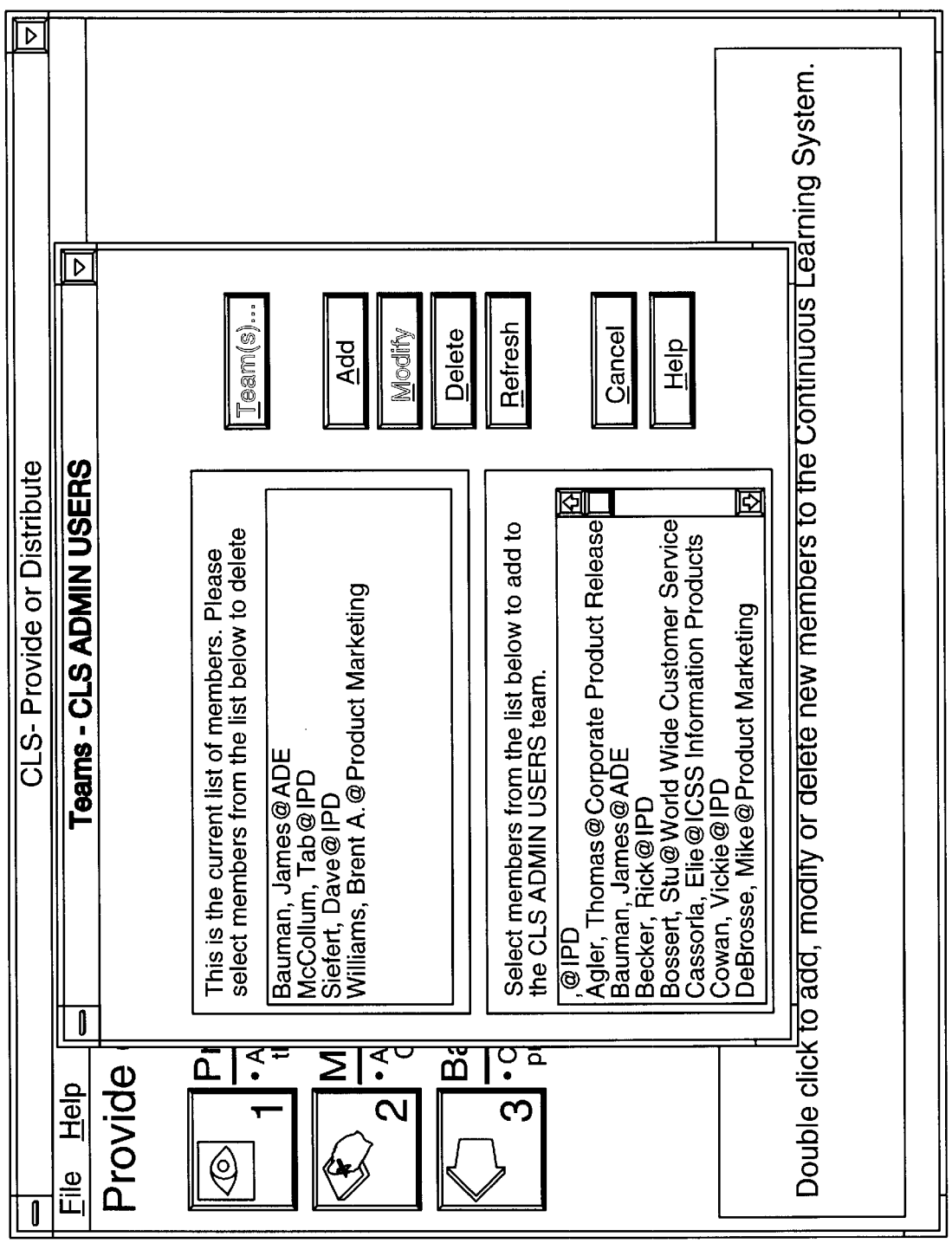

The Administrator actuates the MODIFY button, causing the CLS to display the screen shown in FIG. 73. The upper frame lists the current members of the TEAM selected in FIG. 72. The lower frame provides a roster of possible members. This roster includes all users which the SERVER, under control of the ADMINISTRATOR, serves.

Figure 74:
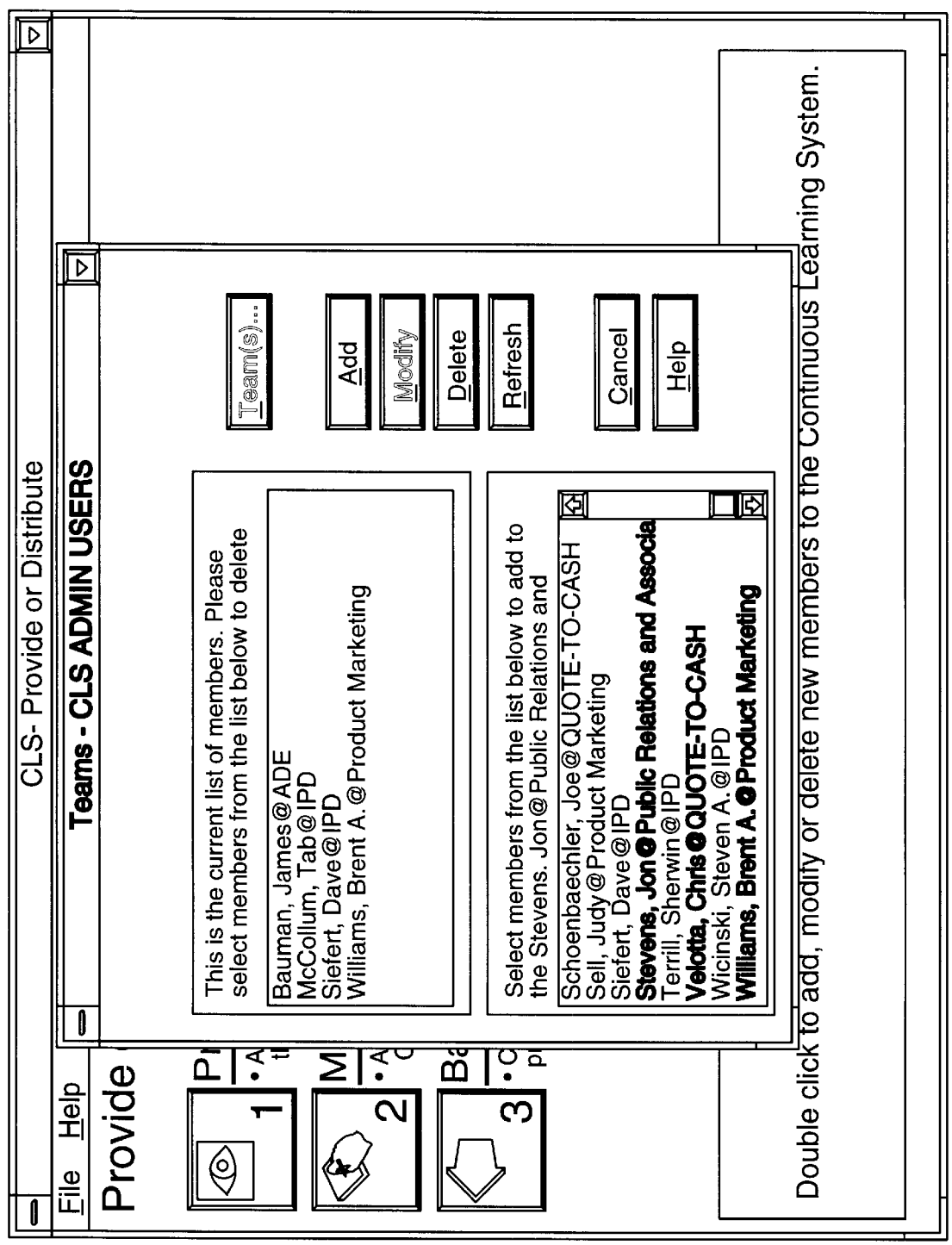
Figure 75:
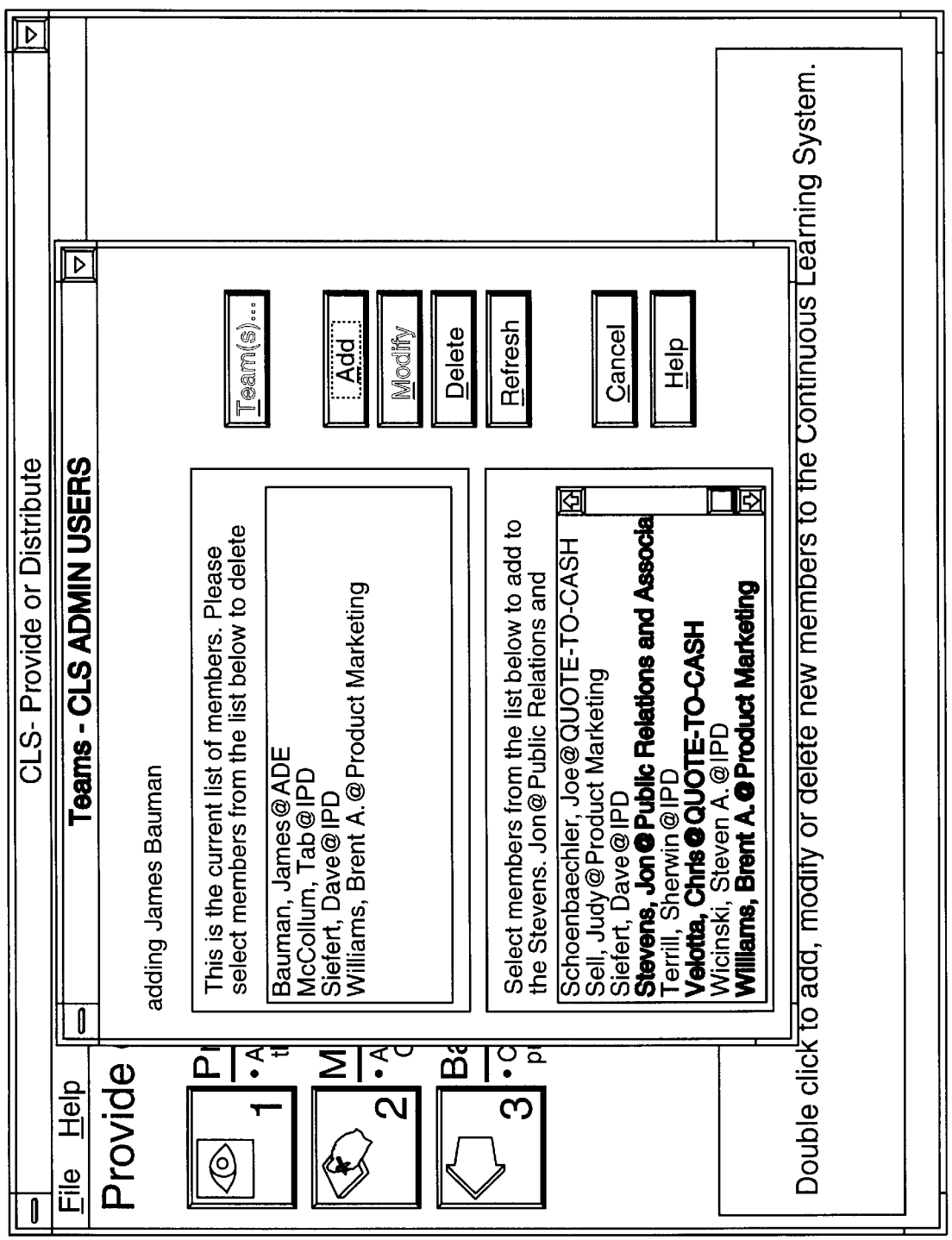
Figure 76:
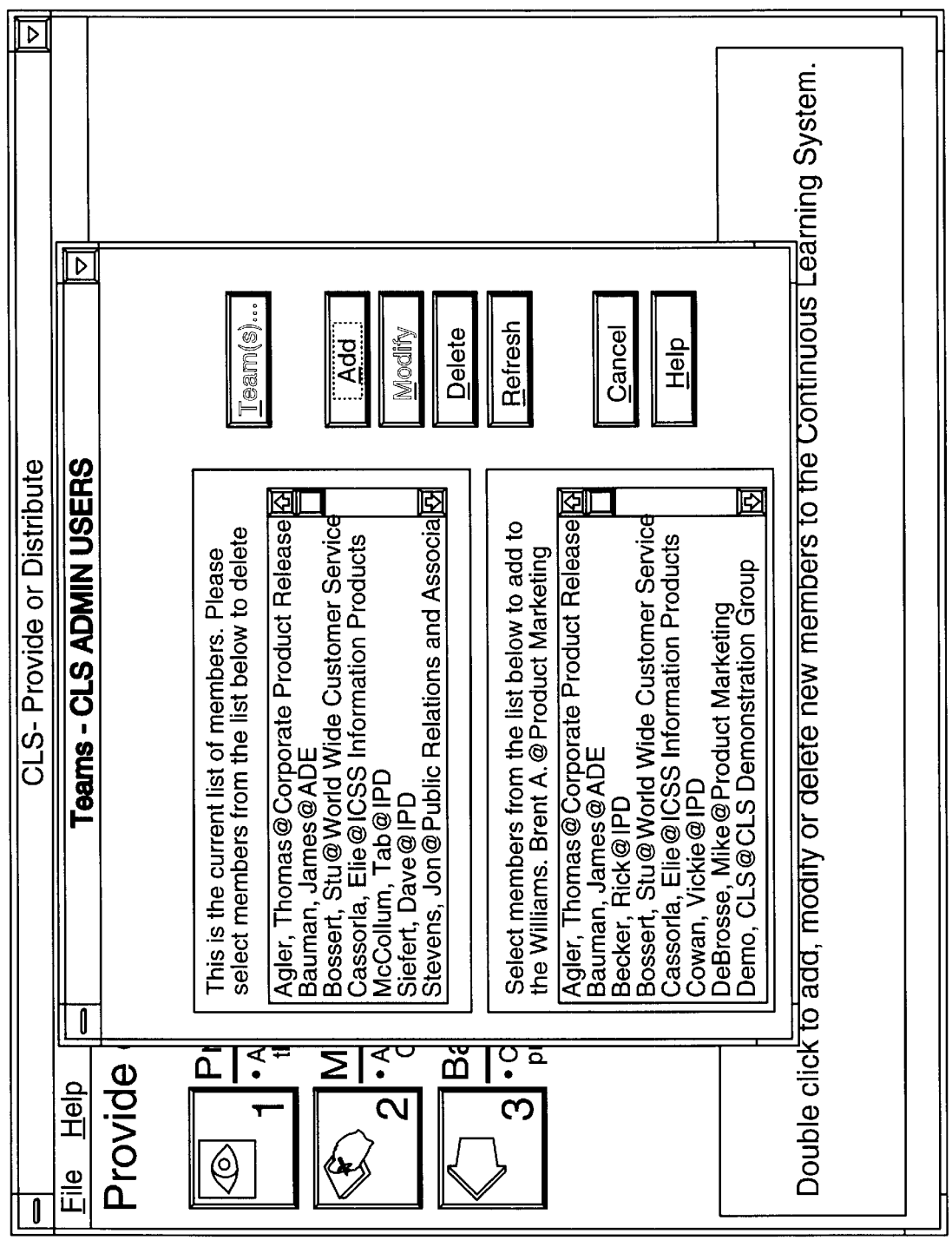

The ADMINISTRATOR selects users in the lower frame to be added to the TEAM, as indicated by the highlighting in FIG. 74, and then actuates the ADD button, as shown in FIG. 75. The CLS adds the selected users to the TEAM, as indicated in FIG. 76.

Creating a Resource which is Limited to Specific Teams

FIG. 77 illustrates a PROFILE of an exemplary RESOURCE which is being created by the ADMINISTRATOR, and which is entitled "CONFIDENTIAL REPORT ON CLS SECURITY REQUIREMENTS." The PROFILE is generated as shown in FIG. 78, and, as indicated, access to it has been restricted by the entry adjacent the symbol "CLS ADMIN USERS."

Figure 79:
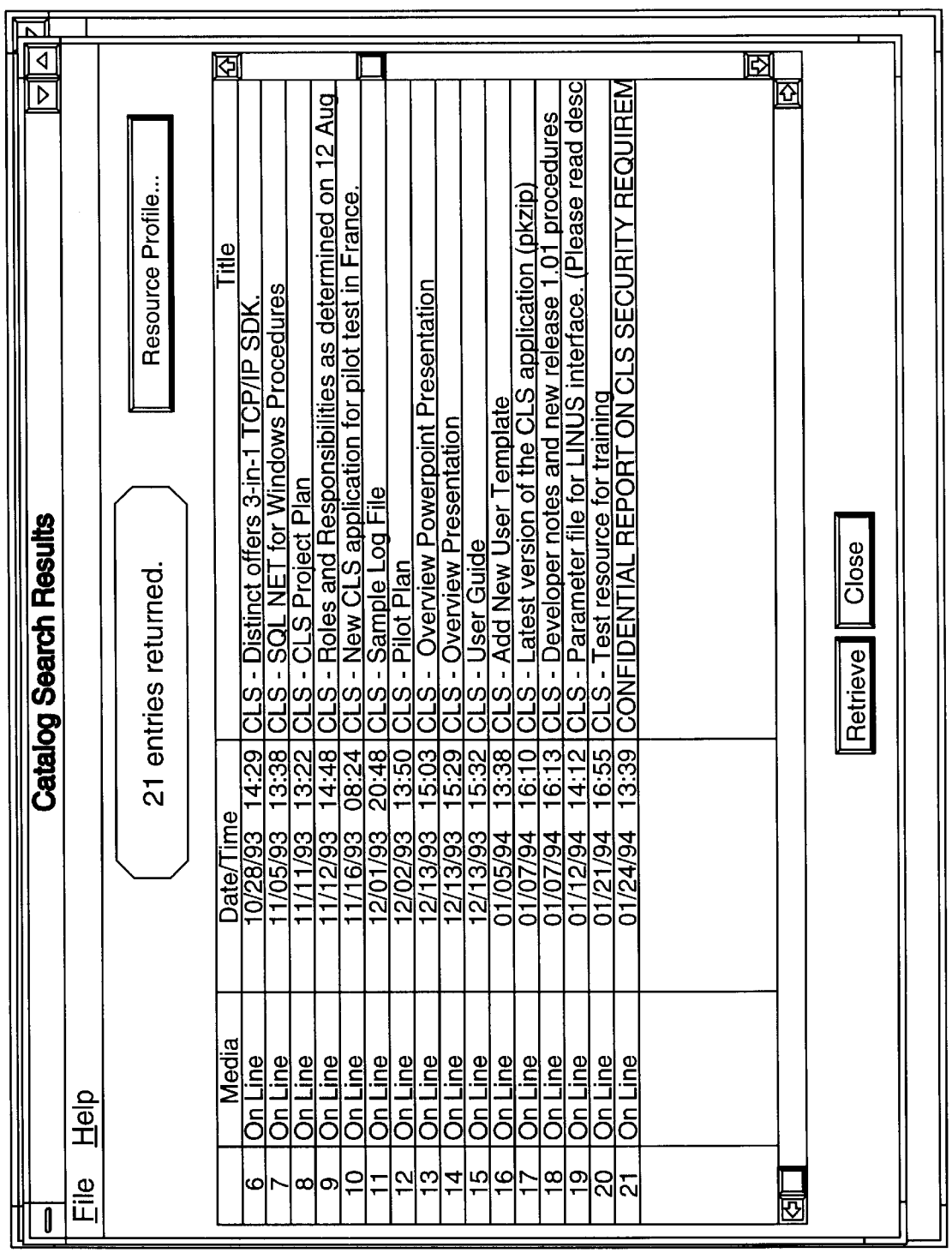
FIG. 79 illustrates sample search results given to a TEAM member. The member is allowed access to all 21 RESOURCEs listed.

To illustrate the restricted access to the RESOURCE (after its creation) the ADMINISTRATOR first performs a SEARCH (using steps not shown, but explained above, in connection with FIGS. 10–12) which would ordinarily locate the newly created RESOURCE. The results of the search are shown in FIG. 79. The "CONFIDENTIAL REPORT . . . ", which is the RESOURCE just created, appears at the bottom of the list.

Figure 81:
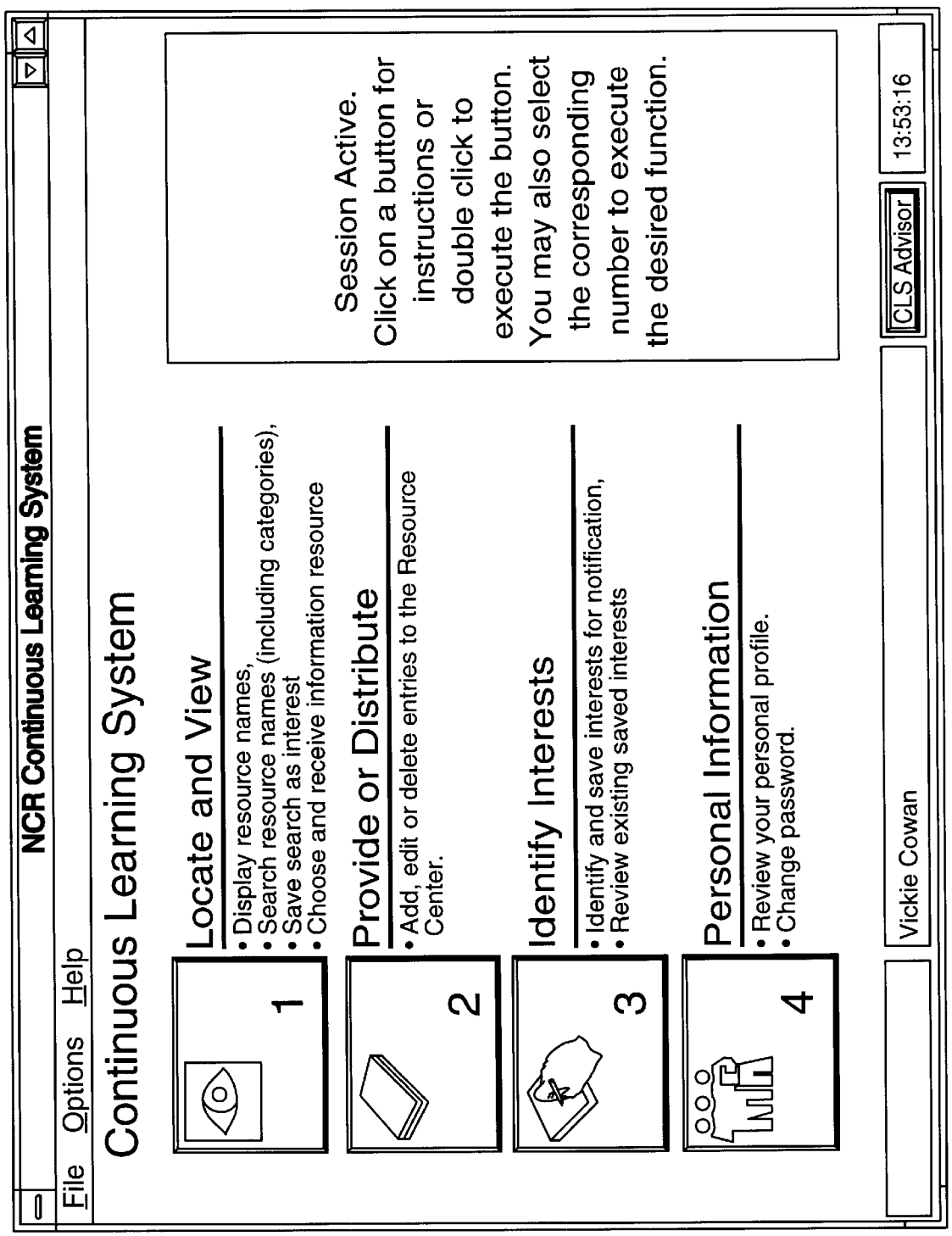
FIGS. 81–83 illustrate a search undertaken by a user who does not have access to all 21 RESOURCEs shown in FIG. 79.
Figure 82:
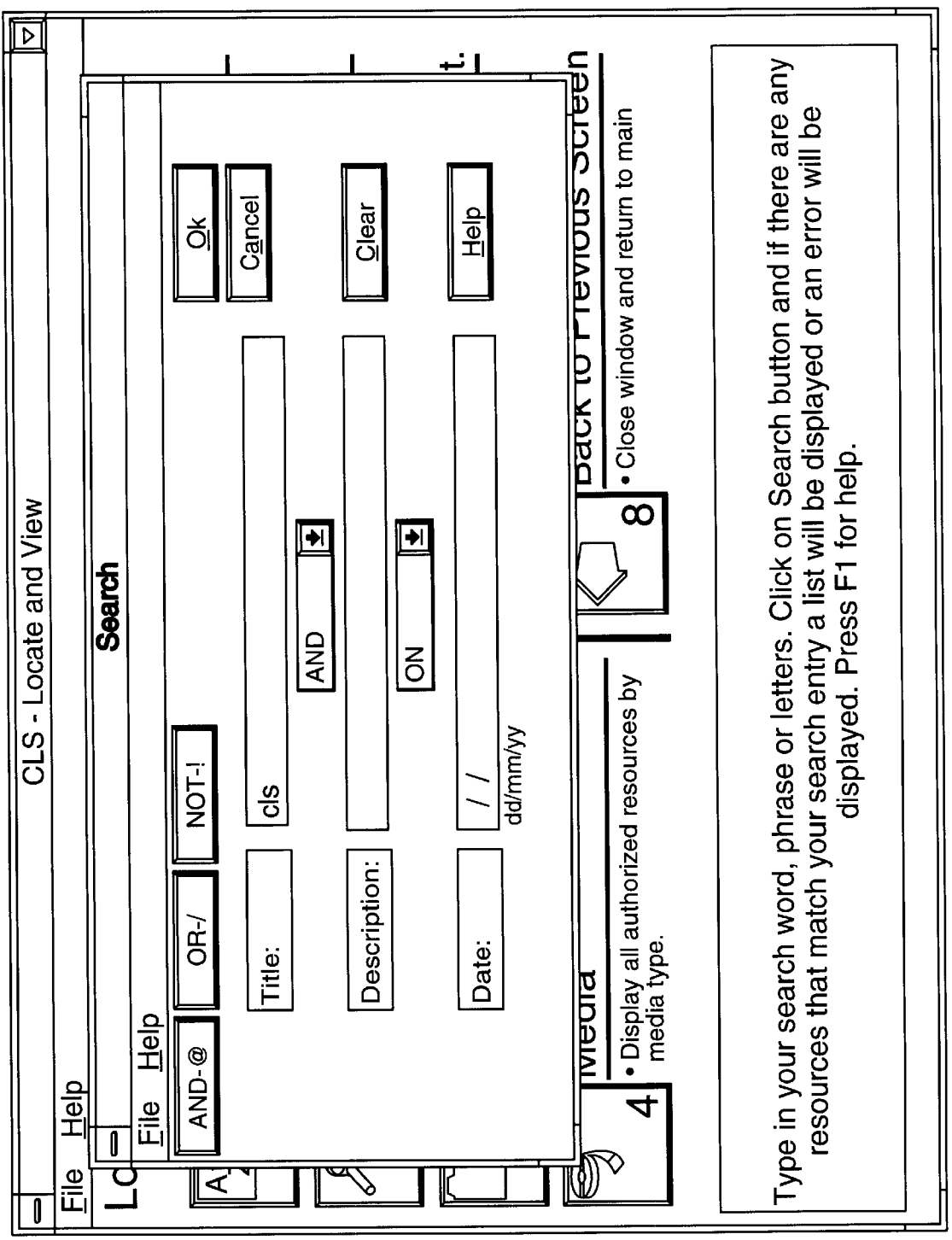
Figure 83:
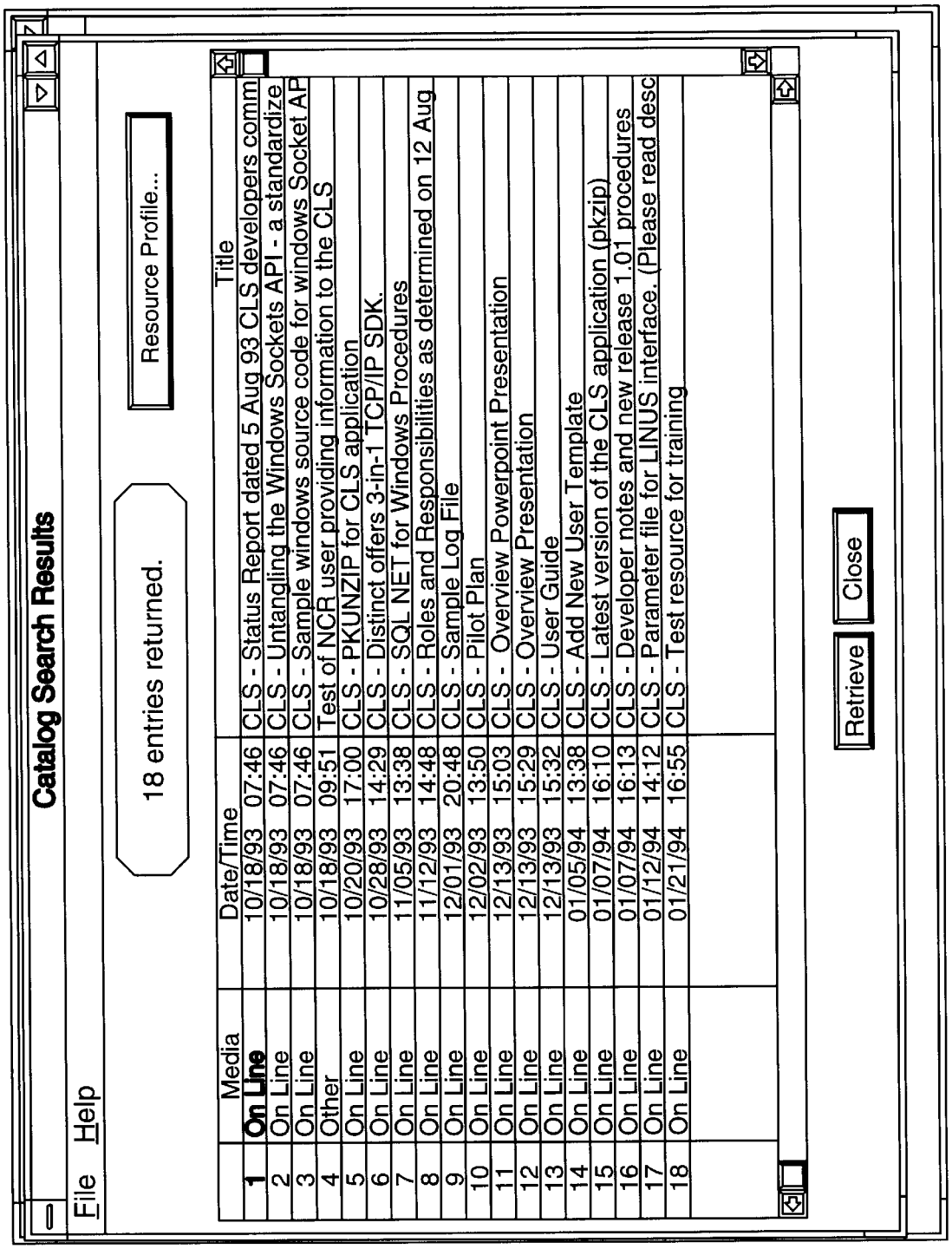
Figure 84:
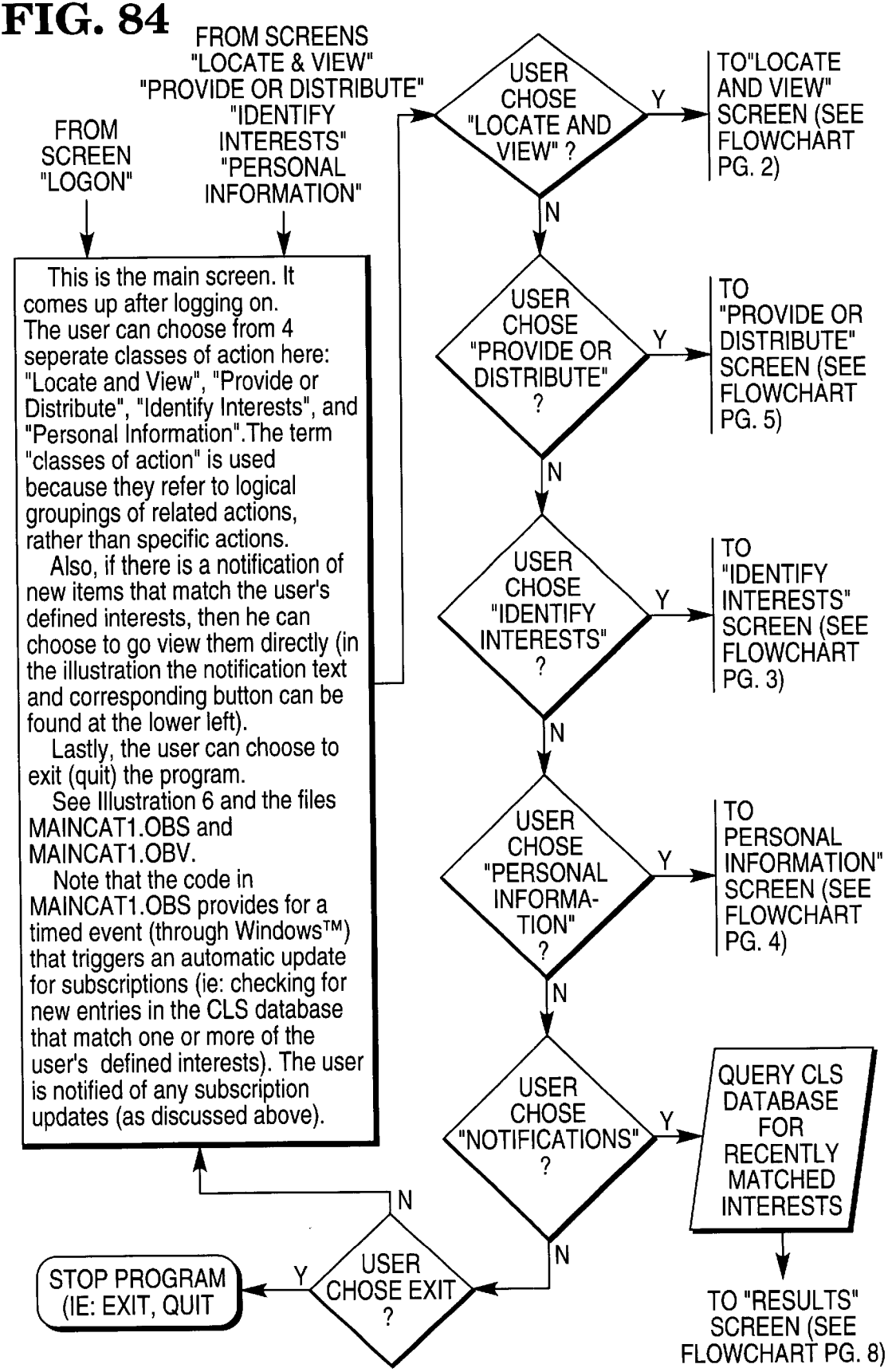
Figure 85:
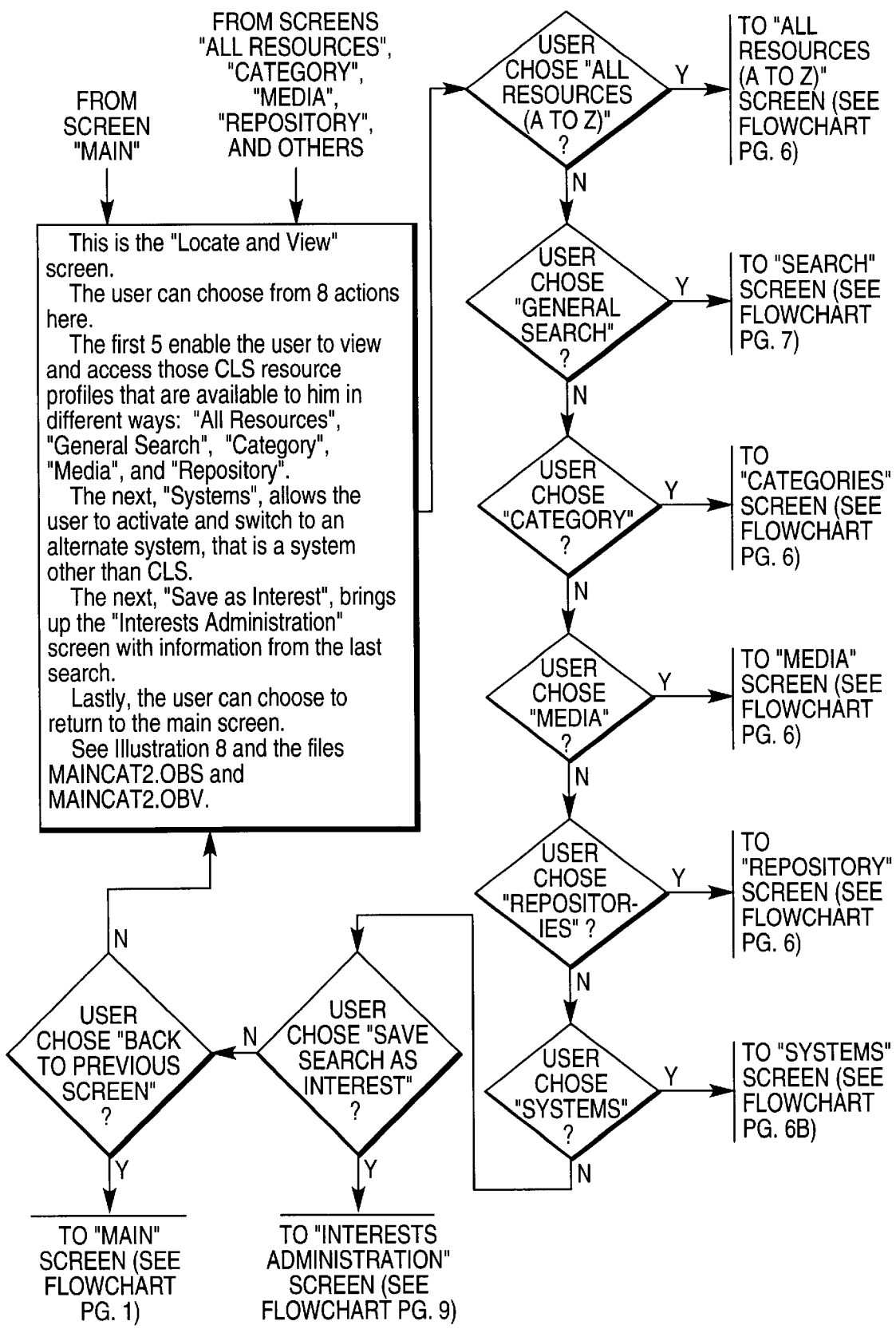
Figure 86:
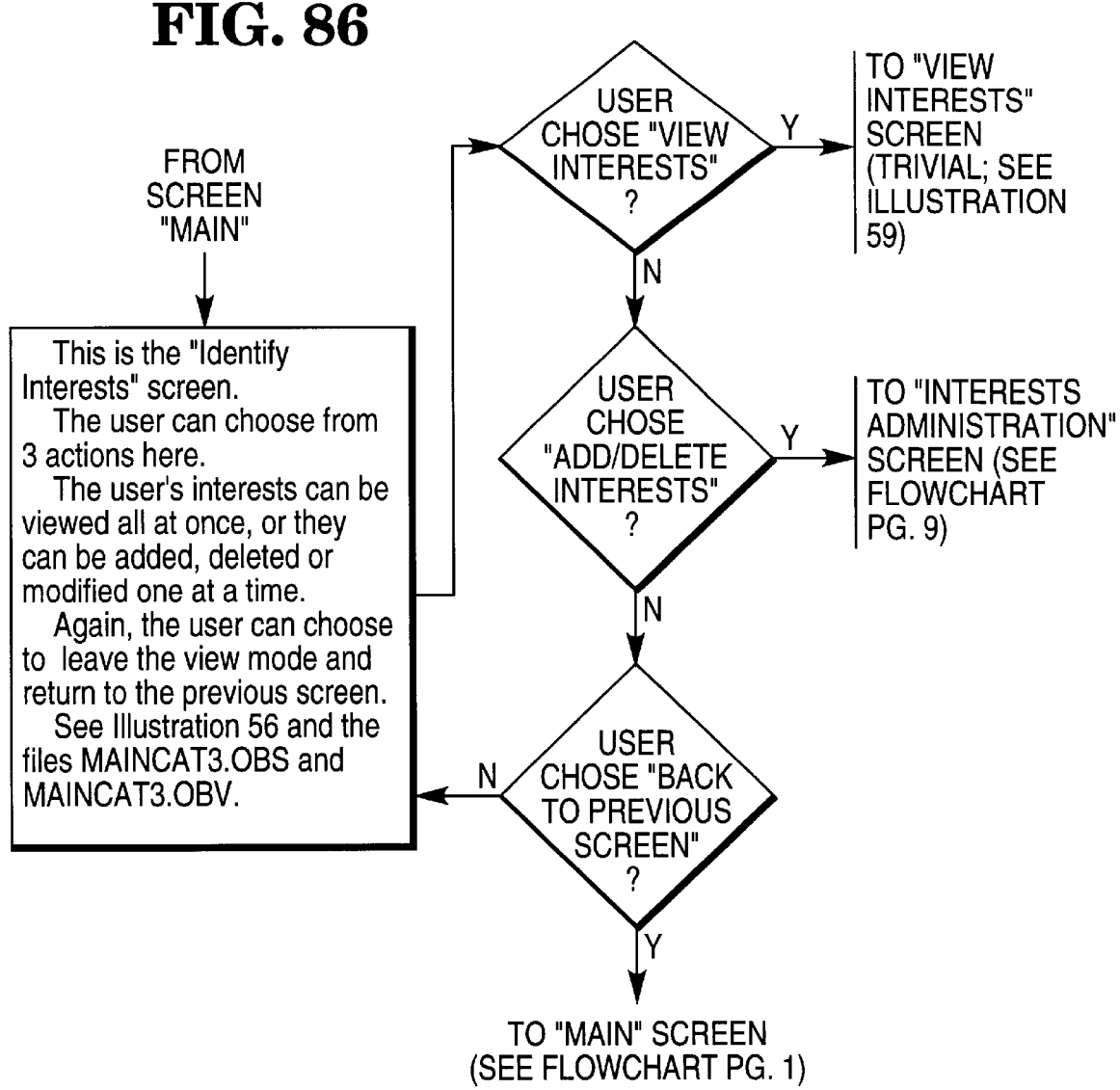
Figure 87:
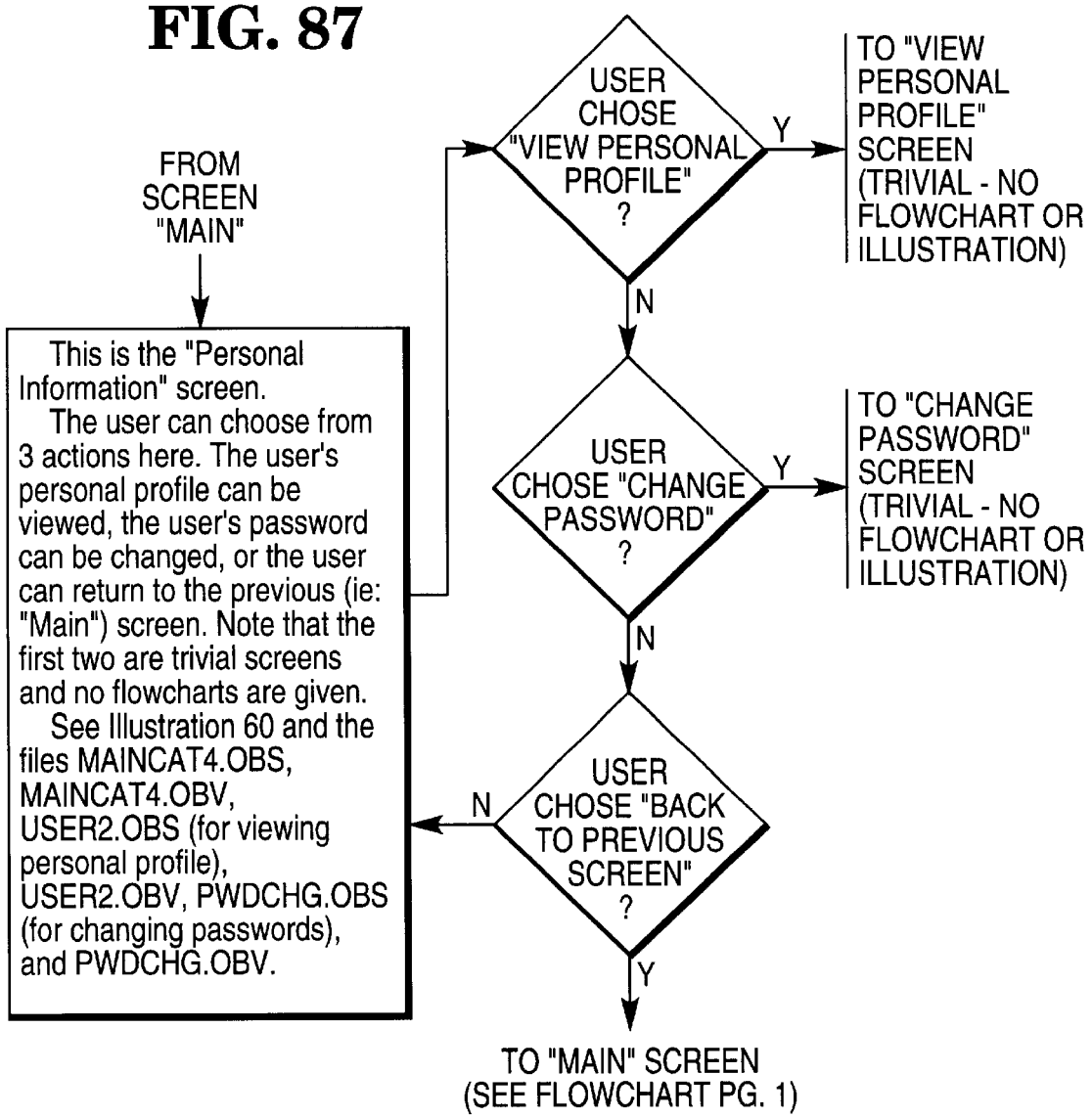
Figure 88:
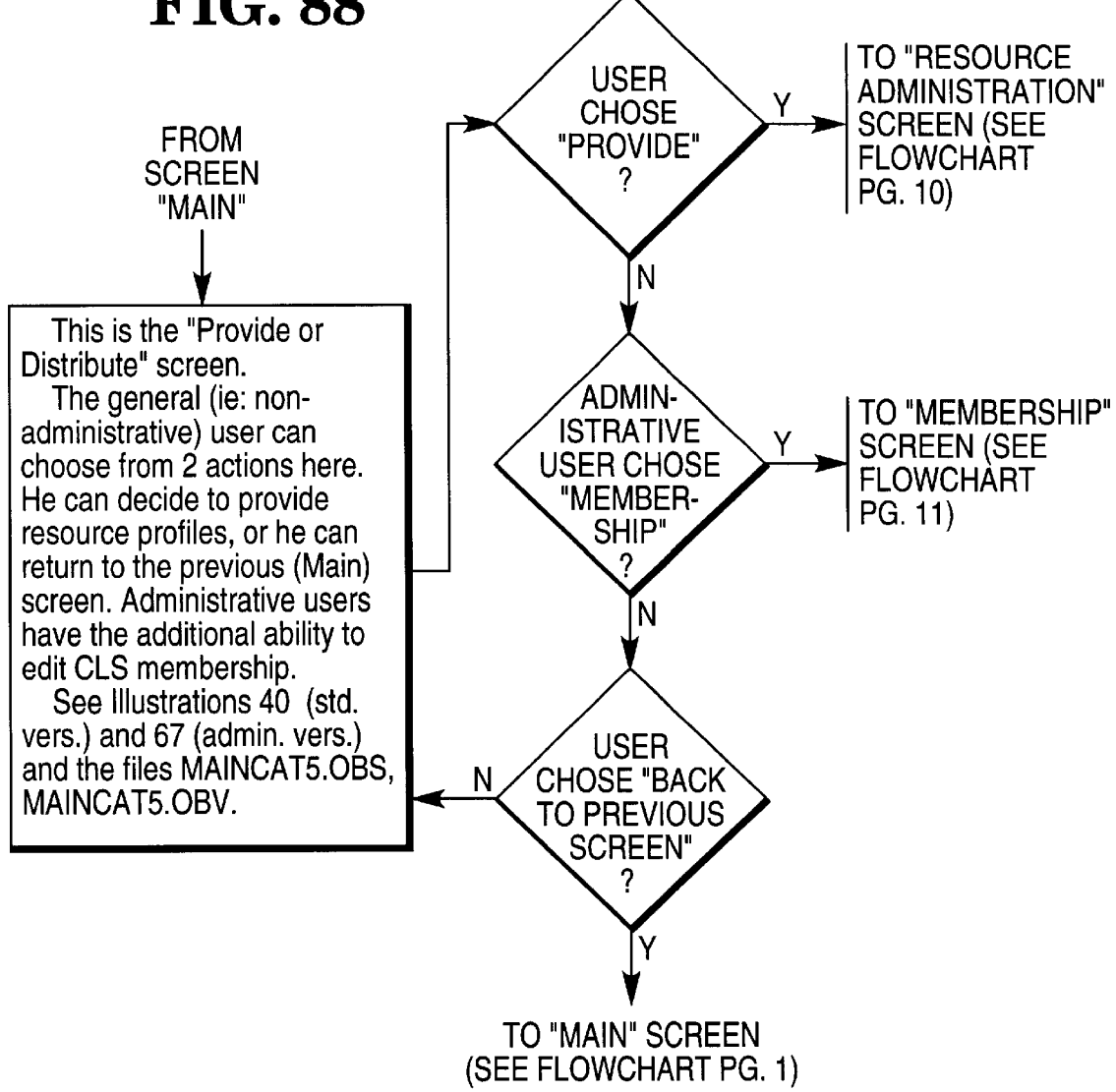
Figure 89:
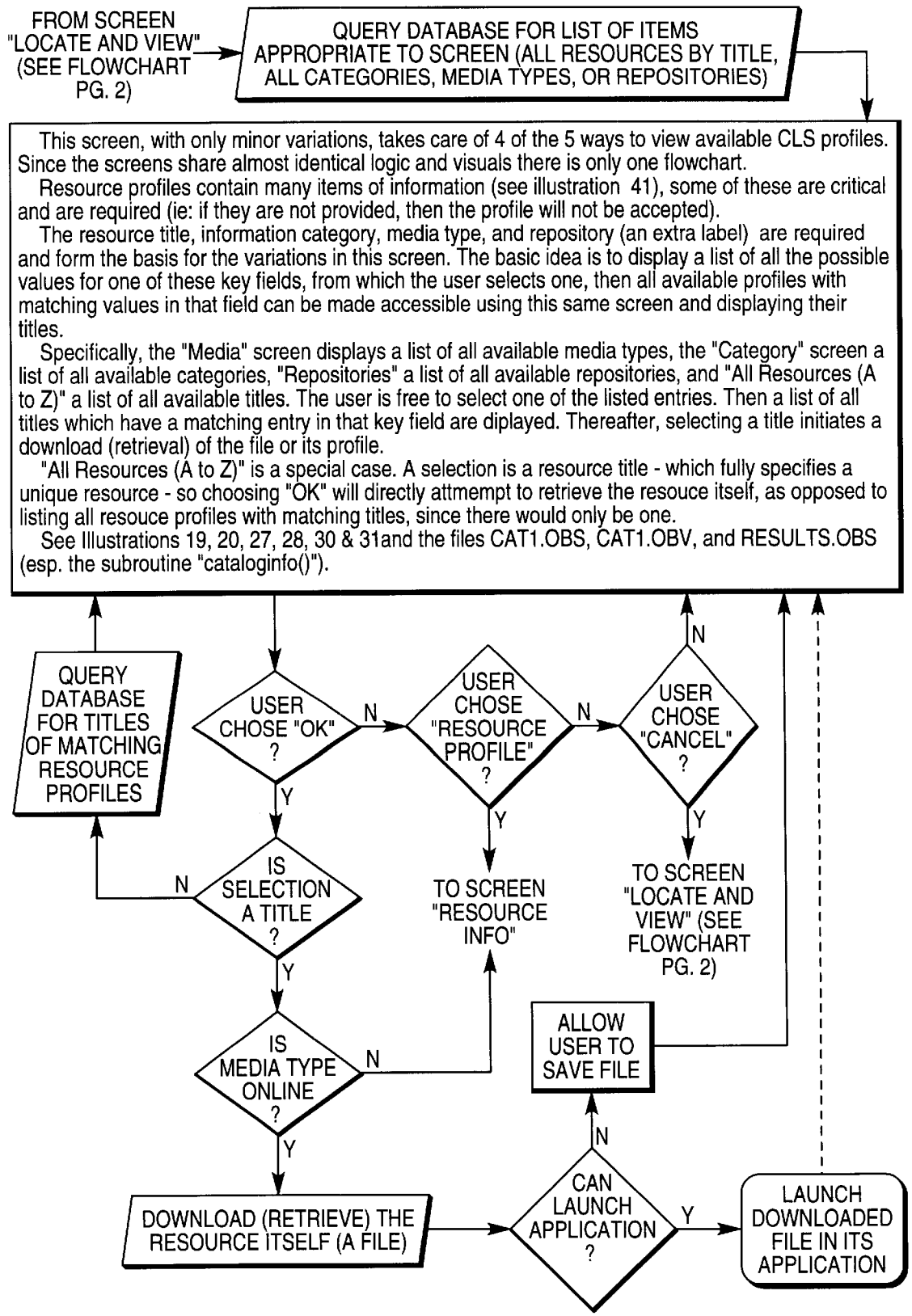
Figure 90:
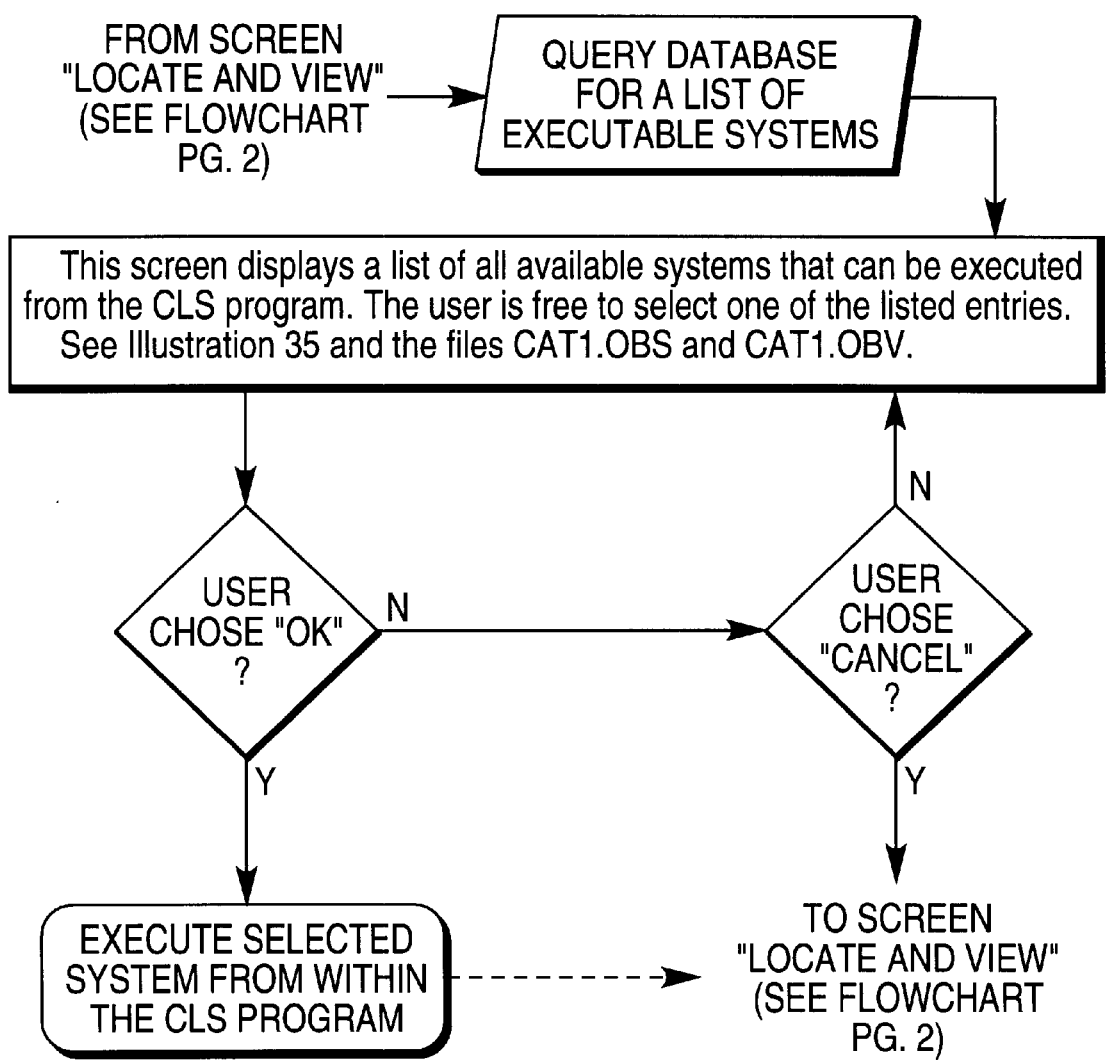
Figure 91:
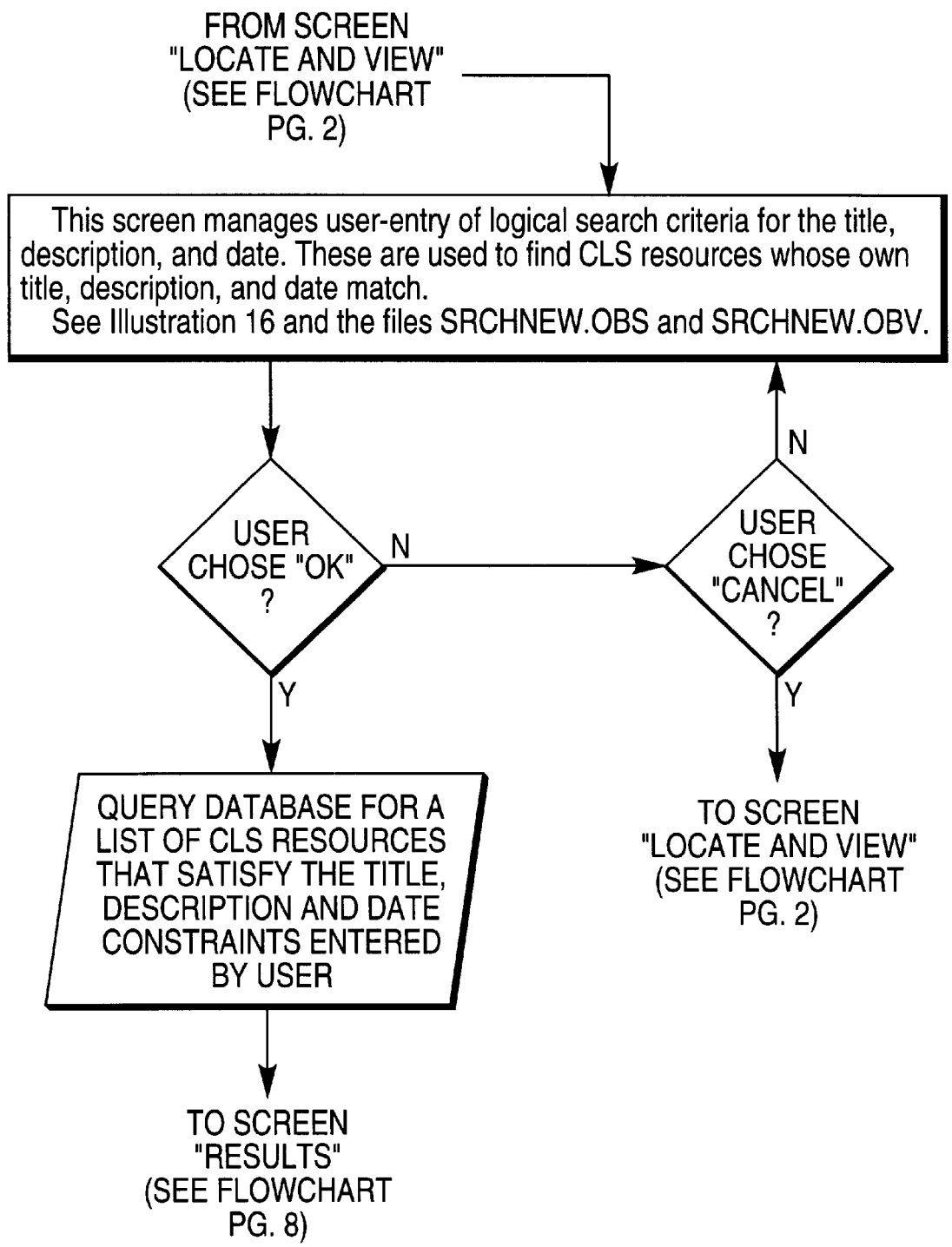
Figure 92:
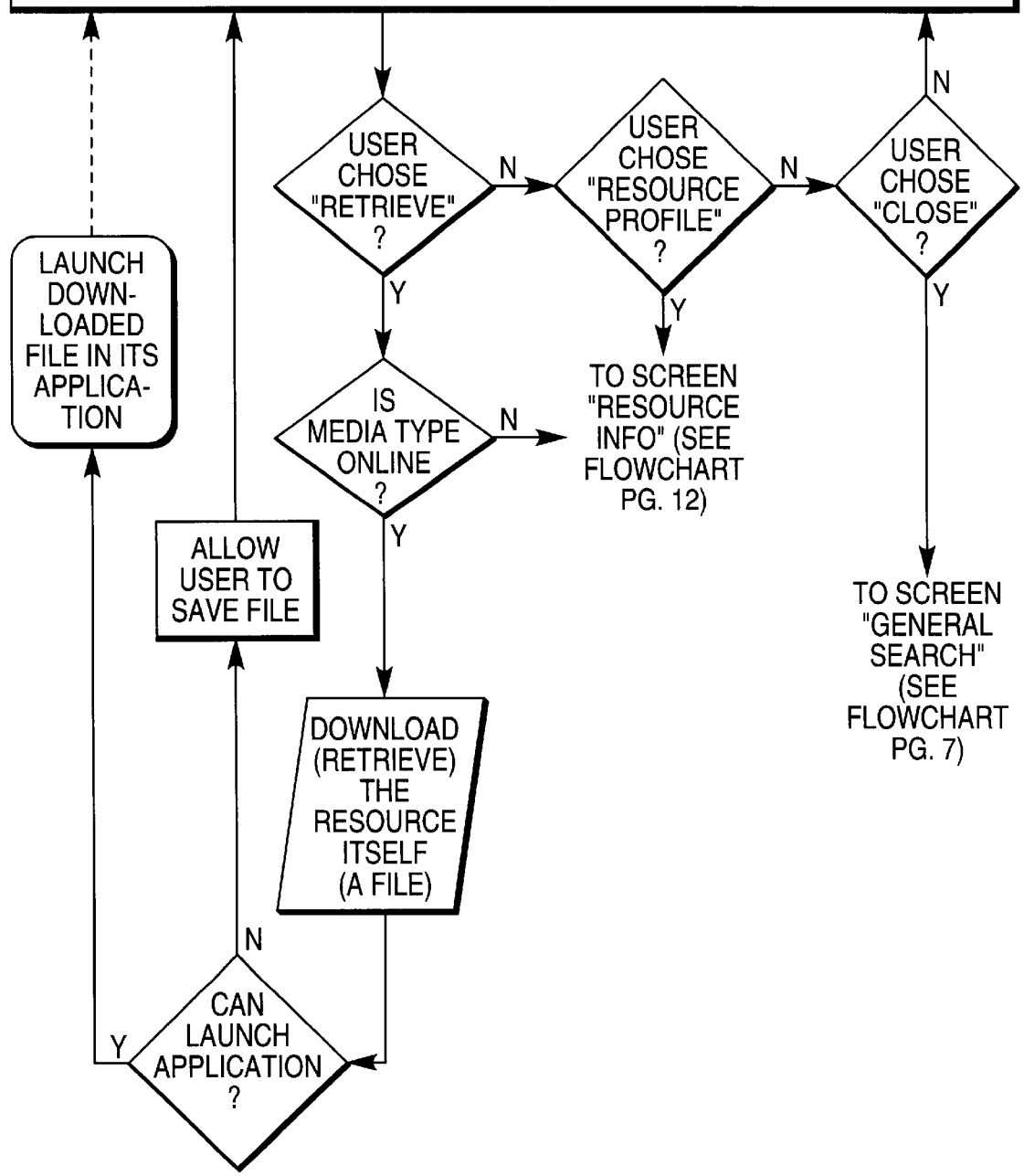
Figure 93:
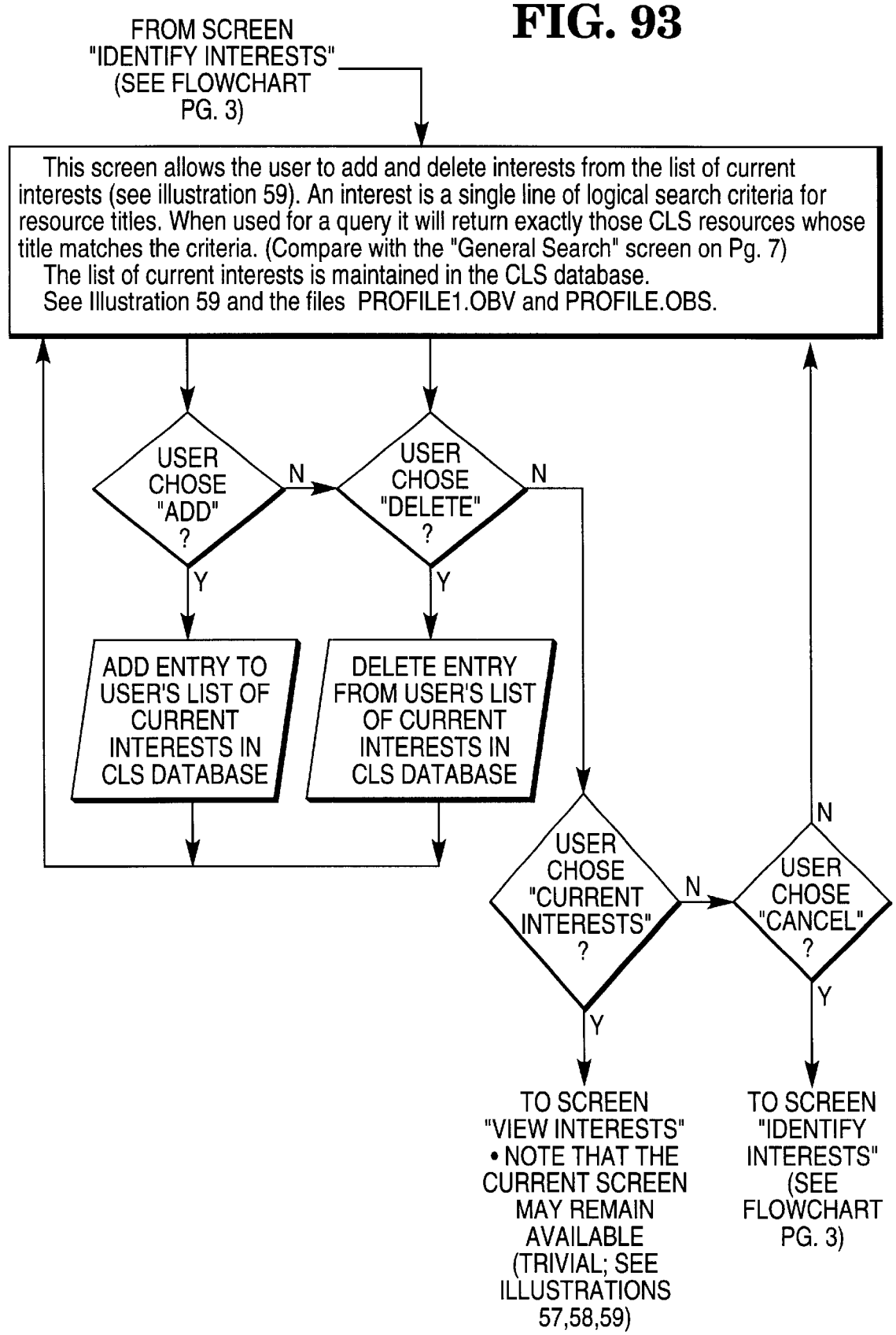
Figure 94:
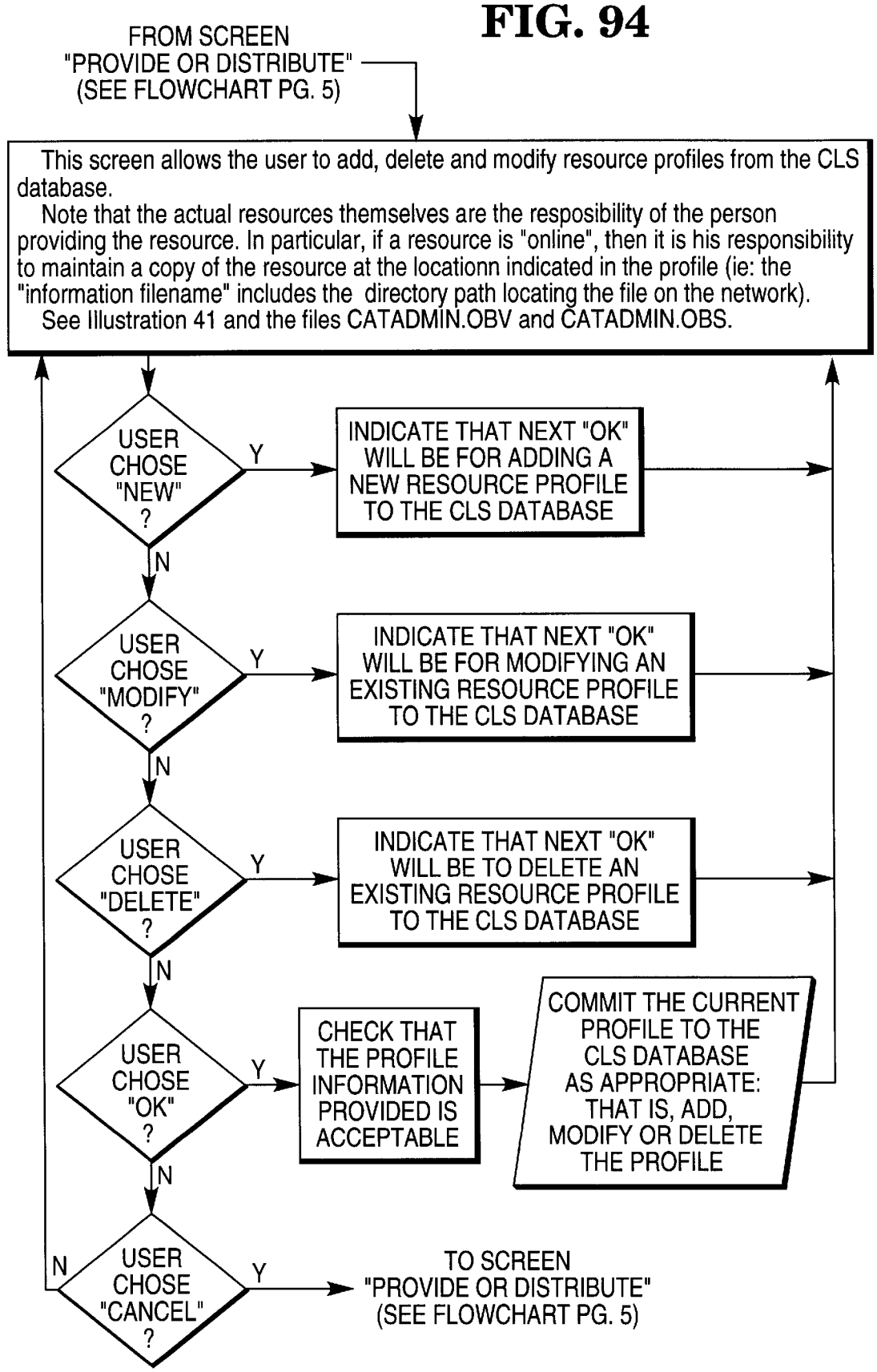

Then, as explained in FIG. 80, the Administrator simulates a search run by a user who is not a member of any team which has been granted access to this "CONFIDENTIAL REPORT . . . " As indicated by FIGS. 80 and 81, the non-TEAM member performs a search which would, ordinarily, locate the "CONFIDENTIAL REPORT . . . " However, FIG. 83 shows the search results, which omit the "CONFIDENTIAL REPORT . . . " from the list of RESOURCES available to this user.

This sequence illustrates the fact that the creator of a RESOURCE controls the access to the RESOURCE, by identifying the TEAMS which can gain access to the RESOURCE.

Flow Chart of Programs

FIGS. 84–96 illustrate a flow chart of the logic followed by the program contained in the microfiche appendix. This program was written to run on computers using the 80X86 family of microprocessors, available from Intel Corporation. The microfiche appendix, together with the flow chart, will allow a user to write code which can run on other processors.

In the flow chart, the word "illustration" refers to the patent Figures. For example, in flow chart FIG. 84, the fourth paragraph in the large box states: "See illustration 6 . . . " "Illustration 6" refers to FIG. 6.

Brief Description of Files

The files identified in the flow chart are summarized as follows.

1. MAINCAT1.OBS—Purpose: main screen.
    Generates four icon-buttons, namely,
    (1) Locate & View (refers to MAINCAT2),
    (2) Identify Interests (refers to MAINCAT3),
    (3) Personal Information (refers to MAINCAT), and
    (4) Provide or Distribute (refers to MAINCAT5).
    Subscription Alert, Checks & Button
2. MAINCAT2.OBS—Locate & View screen
    Generates eight icon-buttons, namely,
    (1) Resource Catalog (A to Z) (refers to MAINCAT1),
    (2) Search (refers to SRCHNEW),
    (3) Resource Catalog—Categories (refers to MAINCAT1),
    (4) Media, Search by (refers to MAINCAT1),
    (5) Repositories, Search by (refers to MAINCAT1),
    (6) Systems (refers to MAINCAT1),
    (7) Save as Interest (refers to PROFILE), and
    (8) Return to Main Menu.

3. MAINCAT3.OBS—Identify interests screen. Generates two icon-buttons, namely,
   (1) View Interests (refers to PROFILE), and
   (2) Interests Administration (refers to PROFILE).
4. MAINCAT4.OBS—Personal information screen. Generates two icon-buttons, namely,
   (1) View Personal Profile (refers to USER2), and
   (2) Change Password (refers to PWDCHG).
5. MAINCAT.OBS—Provide or Distribute System. Generates two icon-buttons, namely,
   (1) Provide (refers to CATADMIN), and
   (2) Membership (Administration Only) (refers to MEMBERS N/A).
6. CAT1.OBS—Interactive screen to Locate & View by "A to Z," Category, Media, Repository, and also for viewing alternate Systems reachable from CLS (refers to RESULTS.OBS).
7. SRCHNEW.OBS—General search screen; user-interactive screen for search of the CLS database by logical combinations of title, description, and date (refers to RESULTS.OBS).
8. RESULTS.OBS—Results screen (includes number of entries found in search, list of entries, "more info" button, OK, and Cancel buttons). Key function cataloginfo( ): gets profile information and, if needed, retrieves the corresponding file and opens it locally in appropriate application; may call CATDBF1 to display profile.
9. PROFILE.OBS, PROFILE1.OBS—Screen to add or delete interests.
10. CATADMIN.OBS—Screen to administer accessible resource profiles (especially New, Modify, Delete). (Refers also to NCRCAT.INC (especially Getinfo( ) function, called by Modify( ). Also refers to DIALOG.OBS.)
    Important subroutines: Commit( ) (OK), Modify( ), and FID206( ) (Delete).
11. MEMBERS.OBS—Screen lists all members of teams, and allows Administrator to add, modify, and delete members. (Refers to USERADM.OBS.)
12. CATDBF1.OBS—Shows profile data and also information on contact and functions to request more information directly from contact. Can also retrieve corresponding "On-Line" file and open it locally in appropriate application, in manner similar to RESULTS.OBS. (Refers to QTY.OBV.)
13. USERADM.OBS—Screen to add, modify, or delete members from the CLS. (Refers to NEWORG.OBS.)
14. CLNSIGN1.OBS—Purpose: initial sign-on for the CLS. See FIG. 3. Verify( ) performs the single logon to the SERVER. (Server$ appears only here.)
15. PWDCHG.OBS—Screen to allow users to change their own passwords.
16. USER2.OBS—Screen to allow user to view his or her personal information profile (eg, name, e-mail address, user environment). The information is maintained and edited only by the Administrator.
17. NEWORG.OBS—Screen for use by CLS Administrator to define "organization" (as used in CATADMIN for "IPD Only"/"Organization" checkbox.)
18. DIALOG.OBS—For adding "Bitmap"/"Preview" from SUB FID257 in CATADMIN.OBS.
19. ABOUT.OBS—Screen gives CLS version and system information, and access to CREDITS.OBV.
20. ADVISOR.OBS—Activated from MAINCAT1.OBS, lines 593 and 616. This module executes the display of the list of supplemental operating instructions, described in point number 7, below.
21. ALERT.OBS—Activated from MAINCAT1.OBS, line 590. This module allows an ADMINISTRATOR to privately communicate with a selected user, as described in point number 8, below.
22. CLNSAVE.OBS—Screen for saving files from CLS.
23. CLSINTRO.OBS—Relates to a screen displayed before CLS runs.
24. CREDITS.OBS—Credits for CLS product.

Additional Considerations

1. Each REPOSITORY takes the form of mass memory which is associated with a computer, which is called a SERVER. (Alternately, the REPOSITORY can include both the SERVER and the mass memory.)

The REPOSITORIEs hold the PROFILEs of the RESOURCEs. Some RESOURCEs are downloadable, and are stored in the mass memory. Other RESOURCEs are not downloadable, and will be stored at a location designated on their respective PROFILEs.

The invention links all REPOSITORIEs together, in a manner which is transparent to the user. For example, as discussed above, a user can request a listing of the titles of all RESOURCEs, no matter which REPOSITORIEs hold the RESOURCEs.

The listing appears, to the user, as though all RESOURCEs are located in a single REPOSITORY, although, in general, such is not the case: multiple REPOSITORIEs are involved.

Of course, if the user calls for a particular PROFILE whose title appears in the listing, the PROFILE identifies the REPOSITORY. If the user examines several PROFILEs, it will become clear that multiple REPOSITORIEs are involved.

From another point of view, every user can obtain access to the PROFILEs contained in all REPOSITORIEs (subject to the access/security restrictions discussed above.) These PROFILEs can be searched presently (or as they are created, by establishing an INTEREST), without regard to the fact that multiple REPOSITORIEs hold the PROFILEs.

In addition, every user can obtain any RESOURCE, identified in a PROFILE, no matter which REPOSITORY holds it (subject, again, to the security restrictions.)

Thus, despite the fact that the RESOURCEs and their PROFILEs are distributed over multiple REPOSITORIEs, which themselves can be distributed world-wide geographically, the user deals with them as though they were located in a single place.

As stated earlier, the soft RESOURCEs are located at local SERVERs. The PROFILEs are located in REGIONAL SERVERs.

2. When a RESOURCE is downloaded to a SERVER, the invention examines the RESOURCE iii an attempt to identify whether a computer program should be launched, or other actions taken, in order to properly display the RESOURCE. One type of examination involves looking at the file name of the RESOURCE. For example, the file name "Letter.doc" is interpreted as having been created by a word processor which customarily adds the suffix "doc" to its files.

When the invention finds this suffix "doc", the invention consults a look-up table, finds the program which uses the suffix "doc", and then attempts to locate the program, launch it, and load the RESOURCE into it.

Another type of examination involves examining data contained in a header of the RESOURCE. These examinations can collectively be described as looking for indicia which identify the program which generated the RESOURCE.

3. One significant feature of the invention is that all possible options available to a user are displayed on the screens generated by the invention. Selecting an option is self-explanatory: a pointing device is used (for example).

Figure 45:
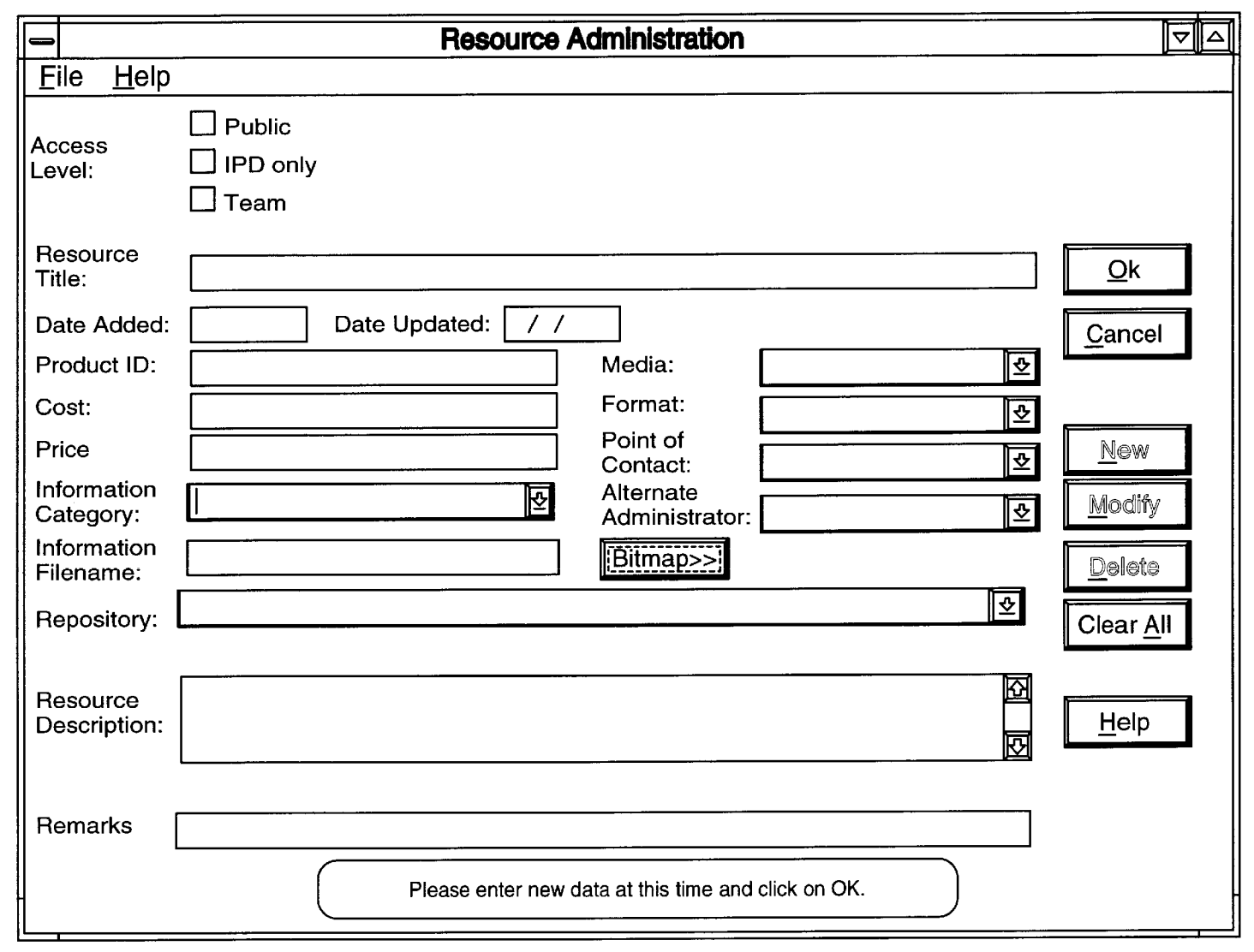

Providing information which the option requires is also self-explanatory: the user fills in blanks, such as those shown in FIG. 45 (which relate to PROFILEs), using a keyboard.

This feature eliminates a need for the user to remember arcane computer commands, and reduces time required to learn how to use the invention.

4. As discussed above, the PROFILEs are stored in REGIONAL SERVERs, while the downloadable RESOURCEs are stored in LOCAL SERVERs. A physical RESOURCE, described by a PROFILE stored in a REGIONAL SERVER, can be stored at any convenient location.

Multiple REGIONAL SERVERs, all storing identical collections of PROFILEs, in order to enhance performance. That is, multiple REGIONAL SERVERs can provide faster response to numerous users than can a single REGIONAL SERVER.

5. FIG. 95 indicates that the files MEMBERSHIP.OBV and MEMBERSHIP.OBS are not included in the microfiche appendix. The reason is that these files contain the actual membership lists. These lists are created by the user of CLS.

6. FIG. 2 contains the phrase, in faint grey lettering, "CLS Overview." This represents an option for the user to view a six-screen tutorial which explains how to use the CLS system. The tutorial automatically is shown when a user logs on for the first time. The user can de-activate the tutorial, which causes the option to be displayed in grayed text, as in FIG. 2.

7. It has been found that users pose questions to the ADMINISTRATOR regarding operation of the system. These questions are delivered to the ADMINISTRATOR in any convenient manner, such as by telephone, letter, electronic mail, etc.

The invention allows the ADMINISTRATOR to provide to the users a list of these questions, together with answers to the questions (or any selected group of questions-and-answers). The users obtain access to these questions by the button in FIG. 5 labeled "CLS Advisor."

In practice, the ADMINISTRATOR will continually update the list of questions, thus providing a continually updated list of instructions for operating the system.

8. CLS makes provision for the ADMINISTRATORs to send private messages to single users. When the message arrives, an icon appears on the user's screen, informing the user of the message.

Definitions. The terms used herein have established meanings in the art. Some additional definitions are the following:

The term "Personal Computer," or PC, has been used. It is to be understood that this term is not limited to the specific set of microcomputers having an architecture designed around the 8XX86 microprocessor manufactured by Intel Corporation. Rather, the term refers to microcomputers generically, and includes, for example, desktop computers, laptop computers, workstations, and terminals. The term includes machines designed according to different architectures and using different processors.

SERVERs are computers, and frequently take the form of large, mainframes. However, as computer technology evolves, the power of mainframes is becoming available in much smaller devices.

A significant feature of the invention is that the invention allows a given PC to act as either a SERVER or as a CLIENT of a SERVER.

RESOURCEs have been described above. RESOURCEs are located in REPOSITORIEs. If a RESOURCE takes the form of downloadable data, then such a RESOURCE will most likely be stored in mass storage (eg, disc drives or tape systems) of a SERVER.

However, it is not required that this mass storage be directly "on-line." That is, for example, a given RESOURCE may be stored on magnetic media, such as magnetic tape or floppy diskettes, which are kept on storage racks. While the media are located on the racks, they cannot be read by a computer, and are not considered "on-line." To obtain access to the data, the tapes or discs must be loaded onto appropriate drives.

If a RESOURCE takes the form of a physical object, then the RESOURCE is stored in the same manner as others of its type, as in a warehouse.

PROFILEs are collections of information which describe RESOURCEs.

Numerous substitutions and modifications can be undertaken without departing from the true spirit and scope of the invention. What is desired to be secured by Letters Patent is the invention as defined in the following claims.

What is claimed is:

1. A method of retrieving a physical object, comprising the following steps:

(a) enabling access to a PROFILE describing the physical object;

(b) enabling the physical object to be listed in response to a request made by a user;

(c) enabling the user to select the listed physical object and view the PROFILE;

(d) enabling the user to place an order for delivery of the selected physical object;

(e) enabling notification of a custodian of the physical object when the order is placed; and (f) enabling use of the notification to initiate automated record keeping for the transaction.

2. The method of claim 1 in which the notification includes information added to a data file and retrieved by the custodian into a system handling the custodian's order entry system.

3. The method of claim 1 in which the notification includes an electronic mail message.

4. The method of claim 3 in which a computer program searches the message for ordering information and automatically loads found information into an order filling software system of the custodian.

5. The method of claim 3 in which the message automatically triggers initiation of an ordering process.

6. A method, comprising:
a) maintaining a plurality of servers at different locations;
b) in association with each server, maintaining a repository containing resources which include (i) downloadable data and (ii) physical objects which are not downloadable;
c) in each server, maintaining a collection of profiles, each of which describes a resource within the server's repository;
d) receiving a request from a user to generate a list of resources;
e) generating a list in response to the request, and presenting the list to the user;
f) receiving a designation from the user of a resource on the list and, in response, displaying a profile for that resource to the user; and
g) receiving an order from the user for delivery of a resource on the list and, in response, notifying a custodian of the resource of the order.

7. Method according to claim 6, wherein the request of paragraph (d) comprises a designation of resources.

8. Method according to claim 6, wherein the request of paragraph (d) comprises a query containing key words and wherein the list of paragraph (e) is generated by performing a key-word search on profiles, to locate profiles containing said key words.

9. Method according to claim 8, wherein the profiles searched are contained in more than one server.

* * * * *